United States Patent [19]

Yamagata et al.

[11] Patent Number: 5,719,984

[45] Date of Patent: Feb. 17, 1998

[54] VIDEO SIGNAL RECORDING APPARATUS WITH FACILITY FOR DISPLAYING OF IDENTIFICATION INFORMATION RELATING TO THE VIDEO SIGNAL

[75] Inventors: Shigeo Yamagata; Tokihiko Ogura; Masahiro Takei; Yasutomo Suzuki, all of Kanagawa-ken, Japan

[73] Assignee: Canon Kabushiki Kaisha, Tokyo, Japan

[21] Appl. No.: 271,230

[22] Filed: Jul. 6, 1994

Related U.S. Application Data

[63] Continuation of Ser. No. 777,486, Oct. 15, 1991, abandoned, which is a continuation of Ser. No. 474,667, Feb. 5, 1990, abandoned, which is a continuation of Ser. No. 33,104, Mar. 31, 1987, abandoned.

[30] Foreign Application Priority Data

| Apr. 3, 1986 | [JP] | Japan | 61-77020 |
| Apr. 3, 1986 | [JP] | Japan | 61-77021 |
| Apr. 3, 1986 | [JP] | Japan | 61-77022 |

[51] Int. Cl.⁶ ............................................. H04N 5/91
[52] U.S. Cl. ........................... 386/95; 360/18; 360/31
[58] Field of Search .................... 360/33.1, 31, 18, 360/27, 14.1, 14.2; 358/906, 909, 224, 209, 181, 183, 142, 335; 340/748, 750; 386/95

[56] References Cited

U.S. PATENT DOCUMENTS

| 4,288,809 | 9/1981 | Yabe | 358/183 X |
| 4,423,444 | 12/1983 | Humphreys | 360/33.1 X |
| 4,488,180 | 12/1984 | Rabinowitz | 358/181 X |
| 4,519,008 | 5/1985 | Takenouchi et al. | 360/33.1 X |
| 4,574,319 | 3/1986 | Konishi | 358/906 X |
| 4,575,772 | 3/1986 | Shimada et al. | 360/19.1 |
| 4,591,913 | 5/1986 | Pohl | 358/183 |
| 4,769,722 | 9/1988 | Itoh et al. | 360/27 |
| 4,821,102 | 4/1989 | Ichikawa et al. | 358/142 X |
| 4,849,832 | 7/1989 | Yamagata et al. | 360/33.1 X |
| 5,055,938 | 10/1991 | Misumi et al. | 360/33.1 X |
| 5,175,629 | 12/1992 | Lee et al. | 360/18 X |

FOREIGN PATENT DOCUMENTS

| 54-154219 | 12/1979 | Japan | 358/906 |
| 0078591 | 5/1982 | Japan . | |
| 58-133082 | 8/1983 | Japan | 358/224 |
| 1254295 | 11/1971 | United Kingdom | 360/14.3 |

*Primary Examiner*—Andrew L. Sniezek
*Attorney, Agent, or Firm*—Robin, Blecker, Daley and Driscoll

[57] ABSTRACT

A recording apparatus for recording a video signal on a recording medium together with data signals relative to the video signal comprises a first signal processing channel in which the data signals are supplied to a monitor in a state of being superimposed on the video signal, a second signal processing channel in which the data signals are supplied to the monitor without being superimposed on the video signal and a selector which selectively renders the first signal processing channel or the second signal processing channel operative. Where a display of the recording video signal on the monitor is excessively covered and hidden by that of the data signal, the second signal processing channel is selected and operated to permit adequate visual confirmation on the monitor of the video signal to be recorded.

2 Claims, 29 Drawing Sheets

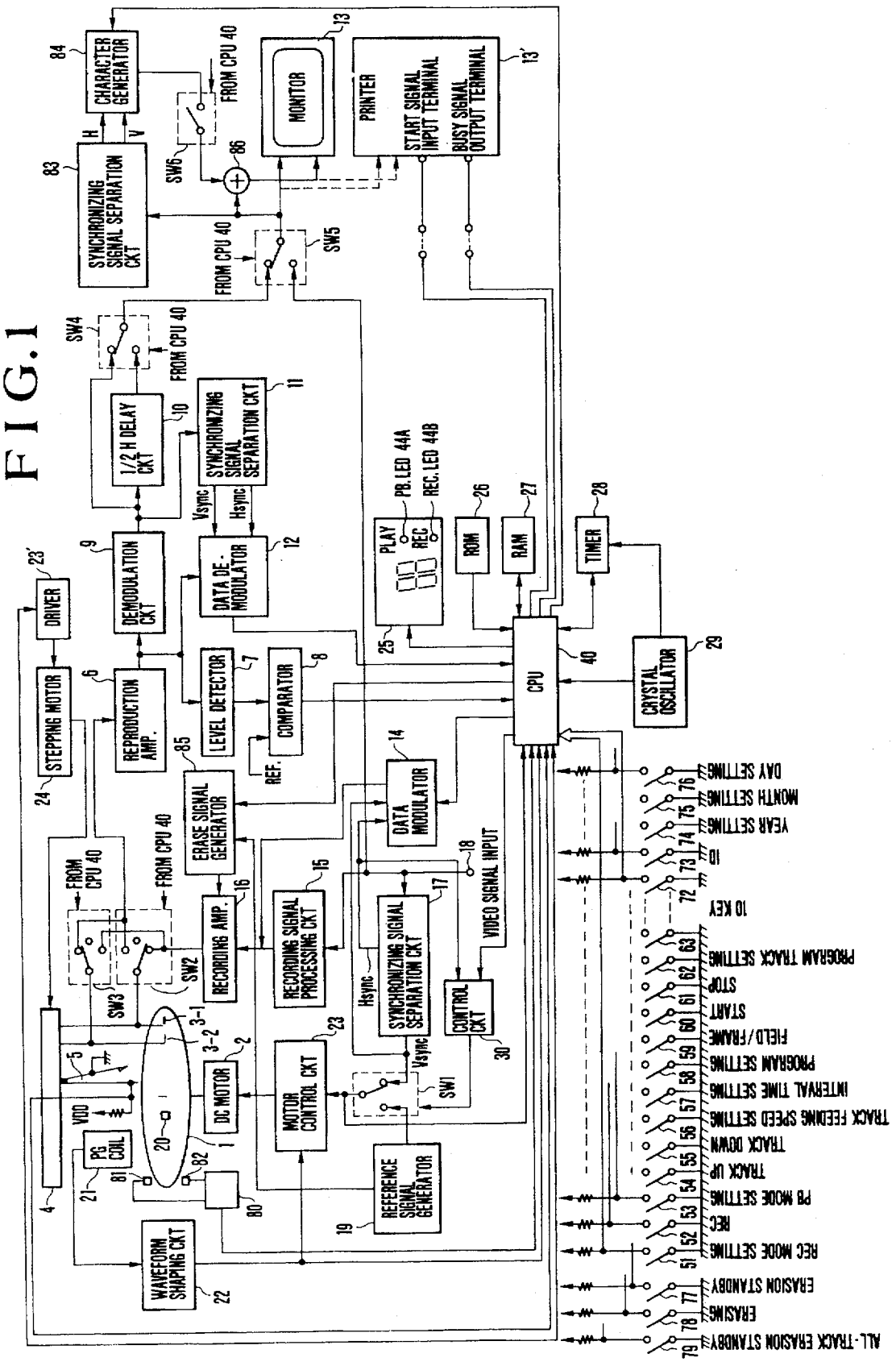

FIG. 2

| | | SW2 | SW3 | SW4 | SW5 |
|---|---|---|---|---|---|
| FIELD REPRODUCTION | ODD FIELD | CONNECT HEAD 3-1 TO REPRODUCTION AMP. 6 | INTERMEDIATE POSITION | OUTPUT FROM DEMODULATION CKT 9 | CONNECT MONITOR 13 TO SWITCH SW4 |
| | EVEN FIELD | | | OUTPUT VIA 1/2 H DELAY CKT 10 | |
| FRAME REPRODUCTION | ODD FIELD | CONNECT HEAD 3-1 TO REPRODUCTION AMP. 6 | INTERMEDIATE POSITION | OUTPUT FROM DEMODULATION CKT 9 | |
| | EVEN FIELD | INTERMEDIATE POSITION | CONNECT HEAD 3-2 TO REPRODUCTION AMP. 6 | | |
| FIELD RECORDING | ODD FIELD | CONNECT HEAD 3-1 TO RECORDING AMP. 16 | INTERMEDIATE POSITION | | CONNECT MONITOR 13 TO VIDEO SIGNAL INPUT TERMINAL 18 |
| | EVEN FIELD | | | | |
| FRAME RECORDING | ODD FIELD | CONNECT HEAD 3-1 TO RECORDING AMP. 16 | INTERMEDIATE POSITION | | |
| | EVEN FIELD | INTERMEDIATE POSITION | CONNECT HEAD 3-2 TO RECORDING AMP. 16 | | |
| WHEN EXECUTING FIELD ERASION | | CONNECT HEAD 3-1 TO RECORDING AMP 16 | INTERMEDIATE POSITION | | |
| WHEN EXECUTING FRAME ERASION | | CONNECT HEAD 3-1 TO RECORDING AMP 16 | CONNECT HEAD 3-2 TO RECORDING AMP 16 | | |

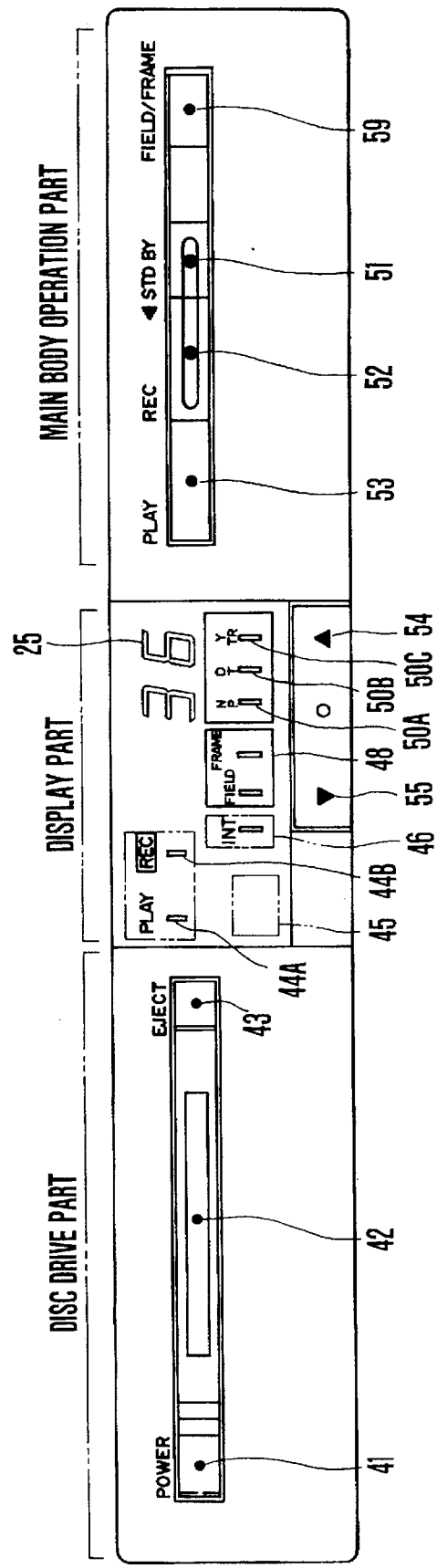

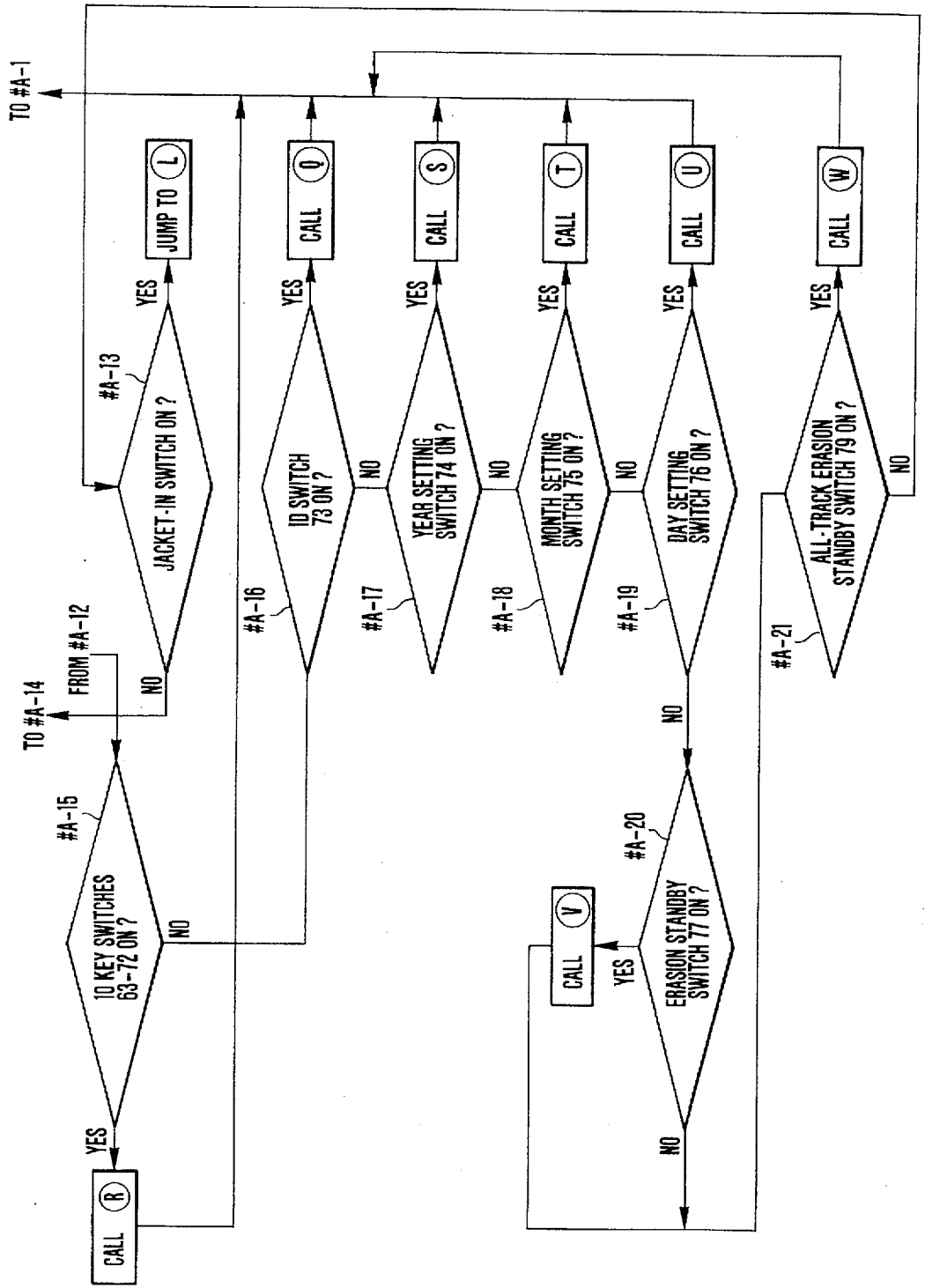

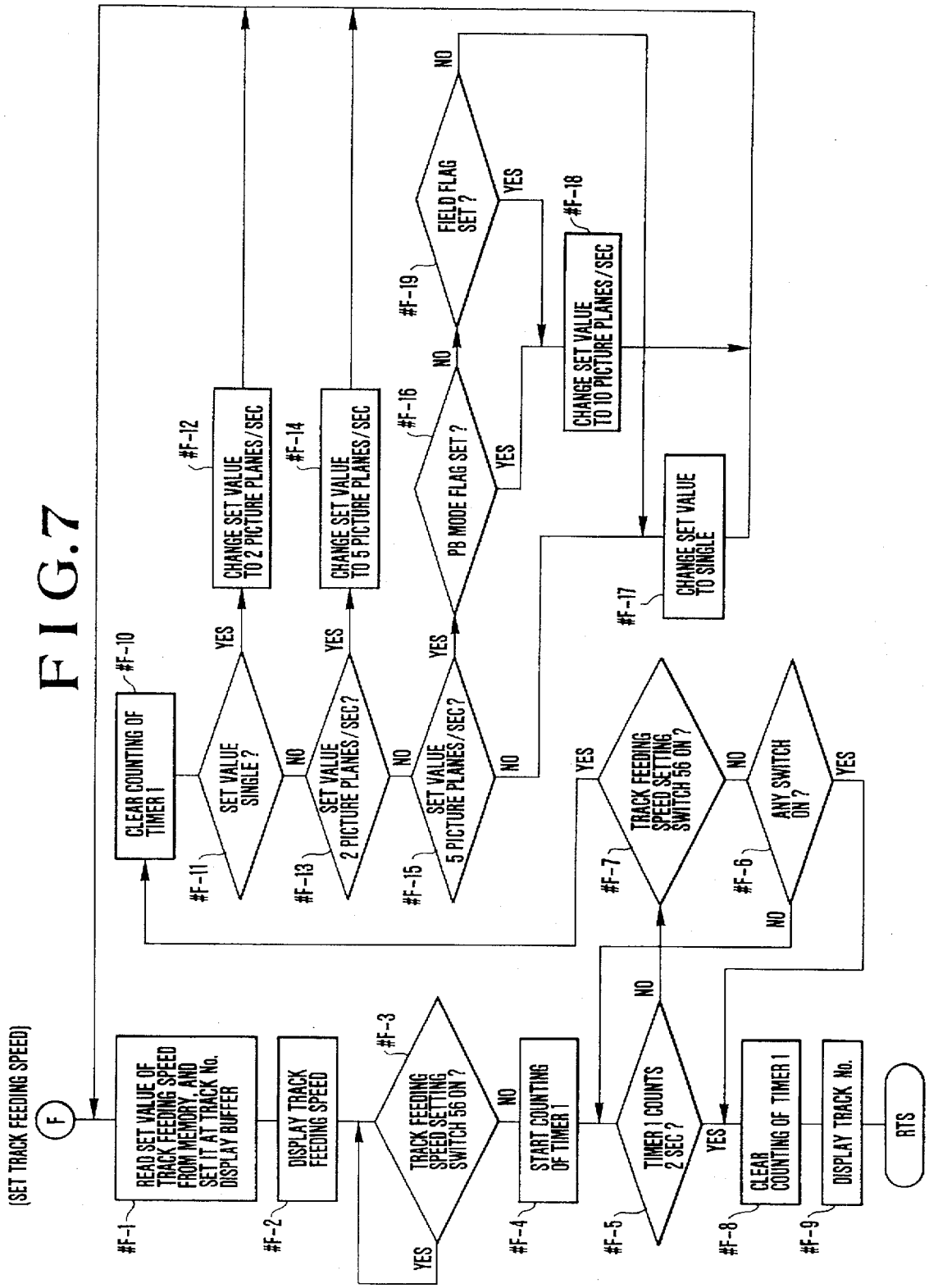

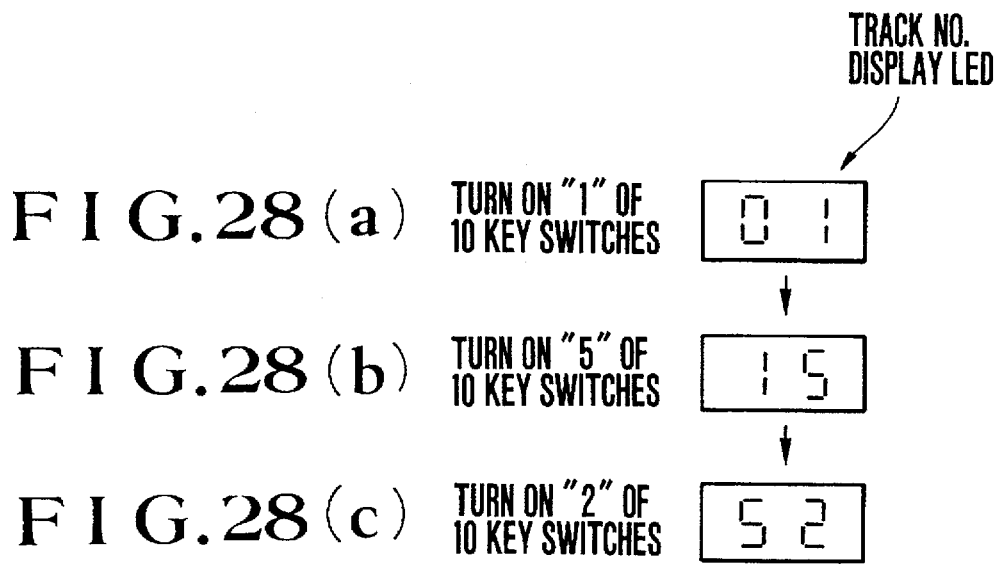
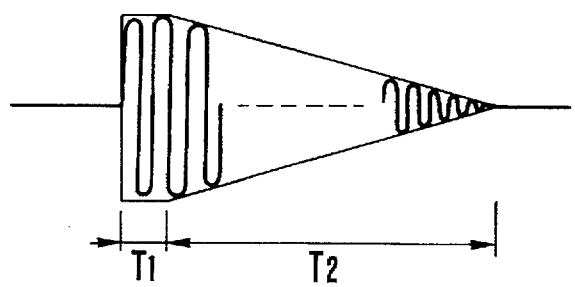
FIG.32

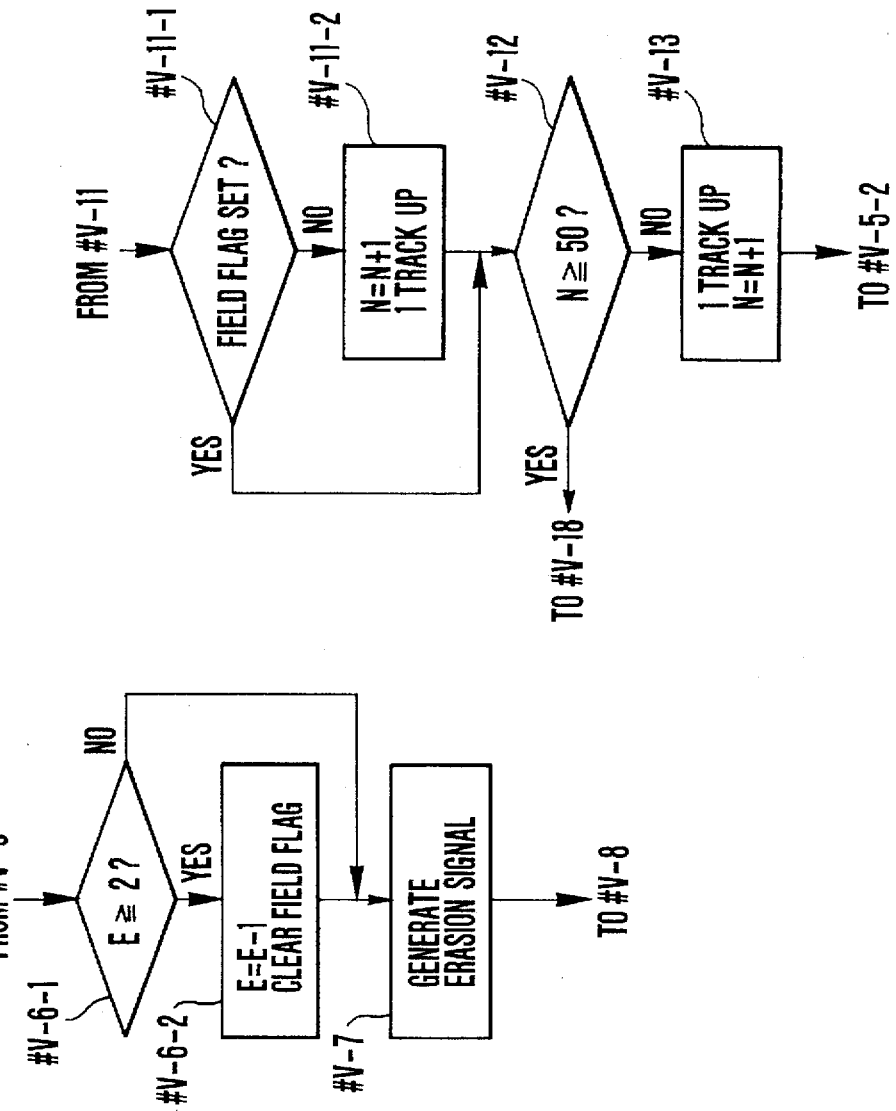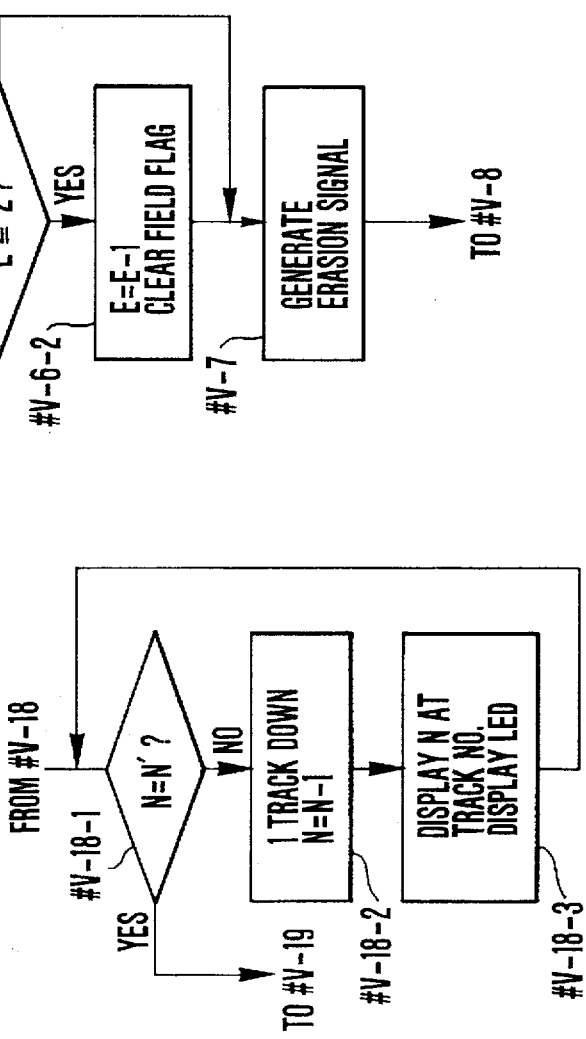

VIDEO SIGNAL RECORDING APPARATUS WITH FACILITY FOR DISPLAYING OF IDENTIFICATION INFORMATION RELATING TO THE VIDEO SIGNAL

This is a continuation application under 37 CFR 1.62 of prior application Ser. No. 07/777,486, filed Oct. 15, 1991, now abandoned, which is a continuation application under 37 CFR 1.62 of prior application Ser. No. 474,667, filed Feb. 5, 1990 now abandoned, which is a continuation of application Ser. No. 033,104, filed Mar. 31, 1987, now abandoned.

BACKGROUND OF THE INVENTION

1. Field of the Invention

This invention relates to a video signal recording apparatus which records, along with a video signal, some data signals relative to the video signal on recording means such as a recording medium.

2. Description of the Related Art

The conventional apparatus for recording and/or reproducing a plurality of data signals on and from a recording medium along with a video signal has been arranged to put the video signal and the data signals in a superimposed state confirmable on a monitor and to record them in that state on the recording medium in response to some recording trigger signal.

However, with the conventional apparatus arranged in this manner to have the data signals superimposed on the video signal for confirmation on the monitor, the video signal displayed on the monitor in recording it is hidden by the data signal over an excessively wide area on the monitor in cases where the data signals are to be recorded in many different kinds. This has presented a problem.

SUMMARY OF THE INVENTION

It is a first object of this invention to provide a video signal recording apparatus which is arranged to be free from the above stated problem of the prior art.

It is a second object of this invention to provide a video signal recording apparatus which is arranged to have a recording video signal adequately confirmable on a monitor.

To attain this object, a video signal recording apparatus arranged to have a video signal and data signals relative to the video signal recorded together on a recording medium comprises: first means for supplying a monitor with the data signal in a state of being superimposed on the video signal; second means for supplying the monitor with the data signal not in a state of being superimposed on the video signal; and selection means for selectively causing the first or second means to operate. The selection means is arranged such that the second means is caused to operate in case where a video signal to be recorded would be excessively hidden by the data signals, so that the video signal to be recorded can be always adequately confirmed on the monitor.

It is another object of this invention to provide an apparatus which is of the kind recording and reproducing a video signal together with a plurality of data signals related to the video signal on and from recording means and is arranged to permit adequate confirmation of the video signal on a monitor when the plurality of data signals are reproduced and supplied to the monitor along with the video signal.

Under this object, a recording and/or reproducing apparatus arranged as a preferred embodiment of this invention to record and reproduce a video signal together with a plurality of data signals related to the video signal on and from a recording medium comprises: selecting means for determining whether at least some of the data signals is to be set or not; and control means for varying, according to selection made by the selecting means, the position of the data signal in which the data signal is to be displayed in a state of being superimposed on the video signal during a reproducing operation.

It is a further object of this invention to provide a reproducing apparatus which facilitates observation of reproduced data signals on a monitor in reviewing recorded data signals by reproducing them.

It is a further object of this invention to provide a recording apparatus which is of the kind recording a video signal and data signals related to the video signal together on a recording medium and is arranged to permit recording on the medium with adequate timing while reviewing the video signal on a monitor and to permit confirmation of the recording through the monitor.

Under that object, a recording apparatus which is arranged as another preferred embodiment of this invention to display on a monitor the execution of a video signal recording operation on a recording medium comprises: means for supplying the monitor with a video signal to be recorded; means for generating a trigger signal for causing the video signal to be recorded; means for supplying the monitor with the video signal by at least partially varying the video signal to have the monitor display that the video signal is recorded.

It is a still further object of this invention to provide a recording apparatus arranged to enable the operator to correctly and adequately set data signals in setting the data signals which are to be recorded along with a video signal.

These and further objects and features of this invention will become apparent from the following detailed description of embodiments thereof taken in connection with the accompanying drawings.

BRIEF DESCRIPTION OF THE DRAWINGS

FIG. 1 is a block diagram showing the arrangement of an embodiment of this invention.

FIG. 2 shows combinations of the switching positions of switches SW2 to SW5 shown in FIG. 1.

FIG. 3 is a front view showing an apparatus arranged as the same embodiment.

FIGS. 5 to 20, 23, 25 to 27 and 29 to 31 are flow charts showing the operation of a CPU 40.

FIGS. 28(a) to 28(c) are illustrations of a flow of operation shown in FIG. 27.

FIG. 32 is an illustration of signals generated from an erasion signal generator 85 shown in FIG. 1.

DETAILED DESCRIPTION OF THE PREFERRED EMBODIMENTS

In an embodiment described below, this invention is applied to a recording and/or reproducing apparatus which is of the kind arranged to record and/or reproduce a still picture video signal on or from a disc shaped recording medium, i.e., a disc-shaped magnetic sheet. However, it should be noted that the application of this invention is not limited by the kind of recording mediums, as described below.

Hereinafter, the embodiment of the invention will be described in the following order. Furthermore, the correspondence of the various items with the figures is as follows:

Arrangement of the embodiment . . . FIGS. 1 to 4.

Figure 5:
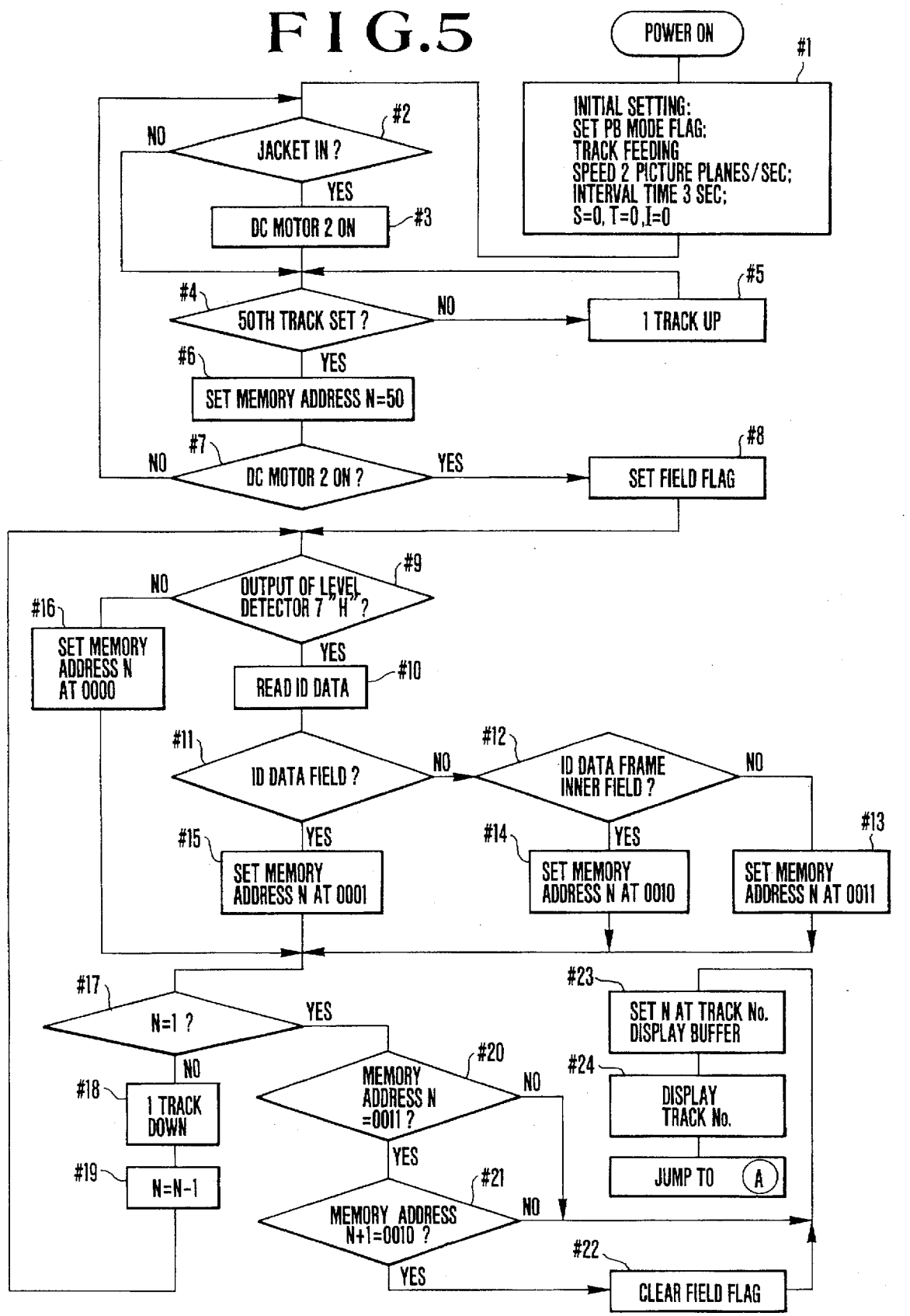
Figure 6A:
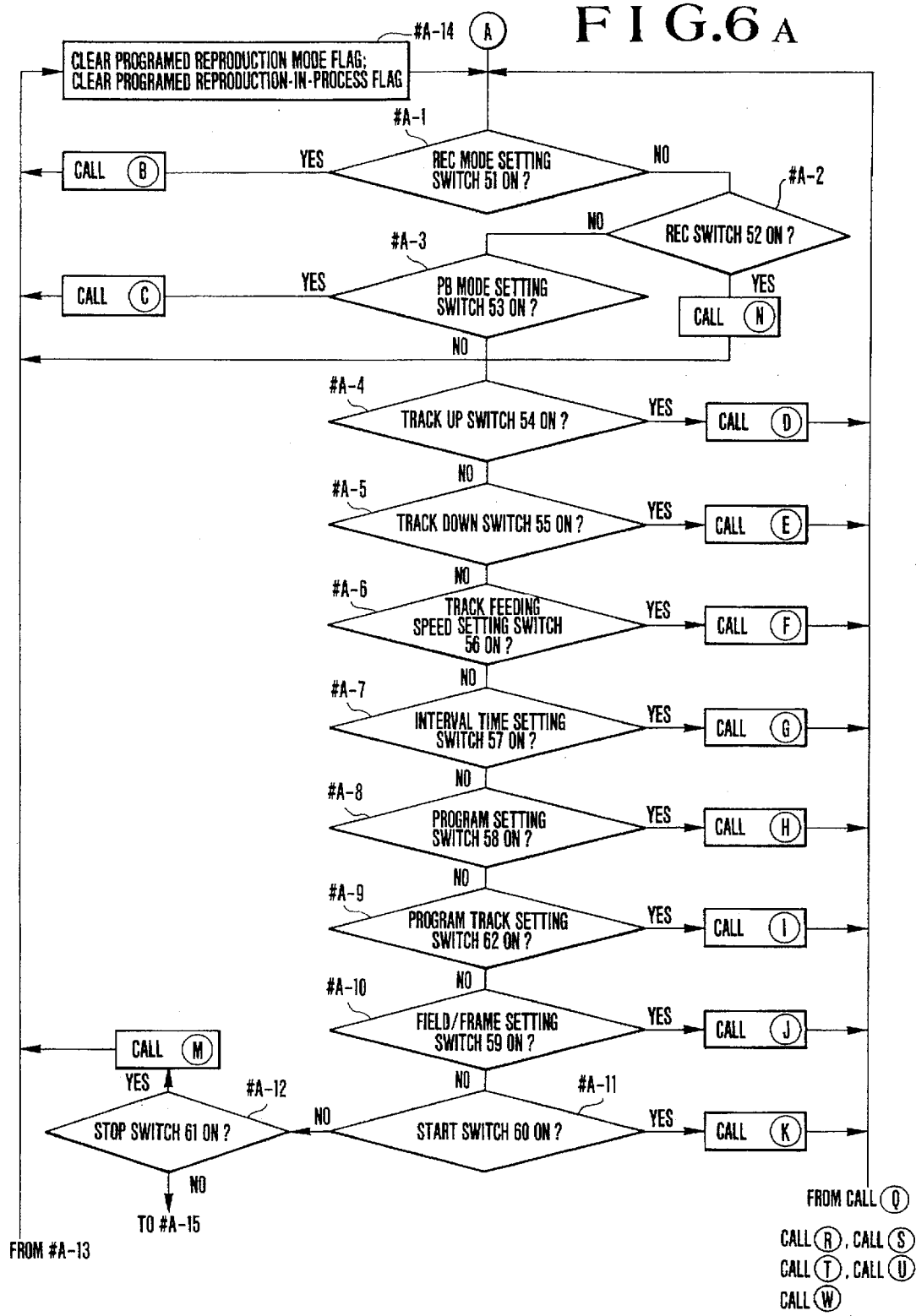

Main flow . . . FIGS. 5, 6A and 6B.

Subroutine (F) . . . FIG. 7 (contents: renewal of track feed speed).

Figure 8A:
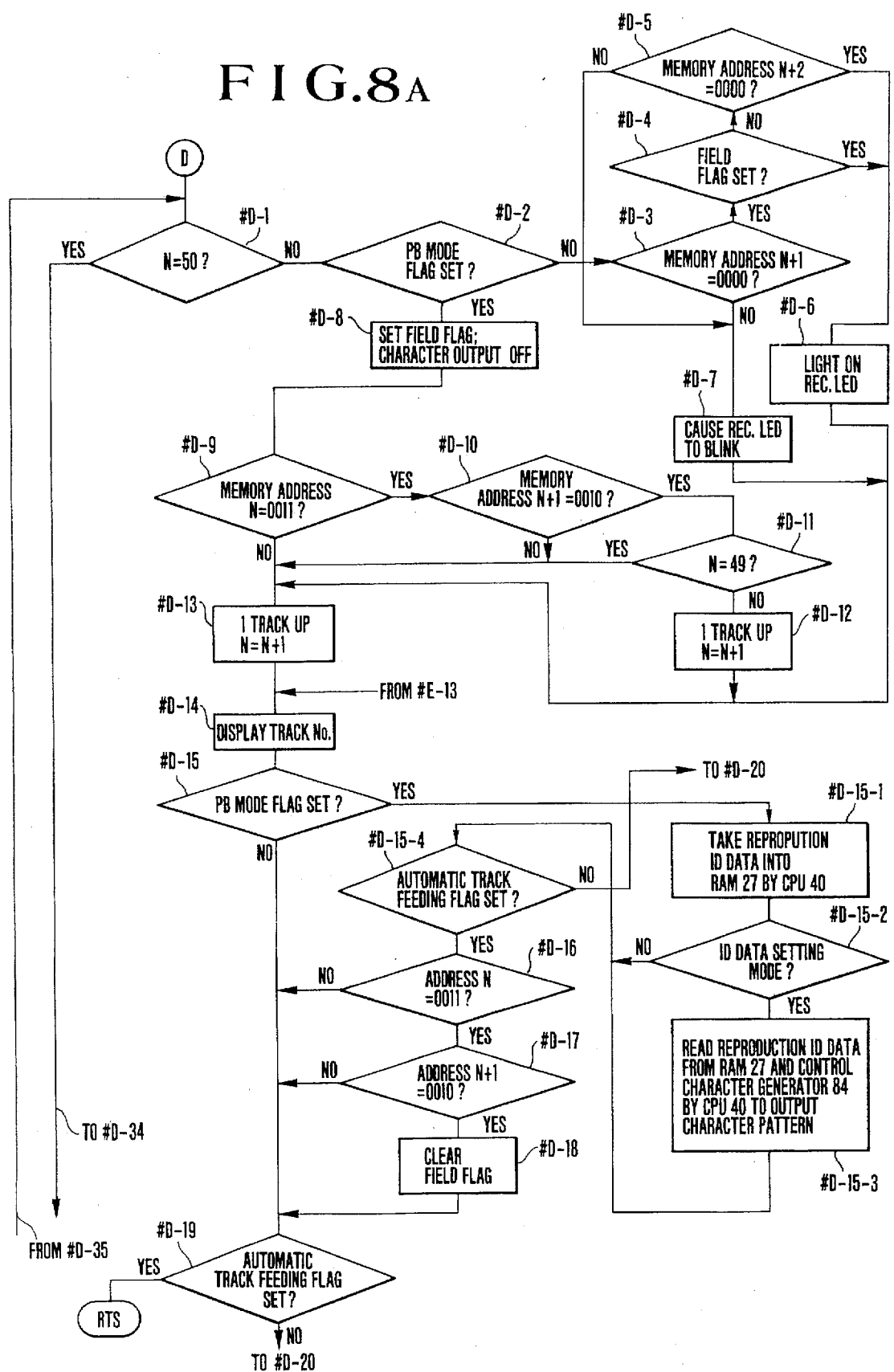
Figure 8B:
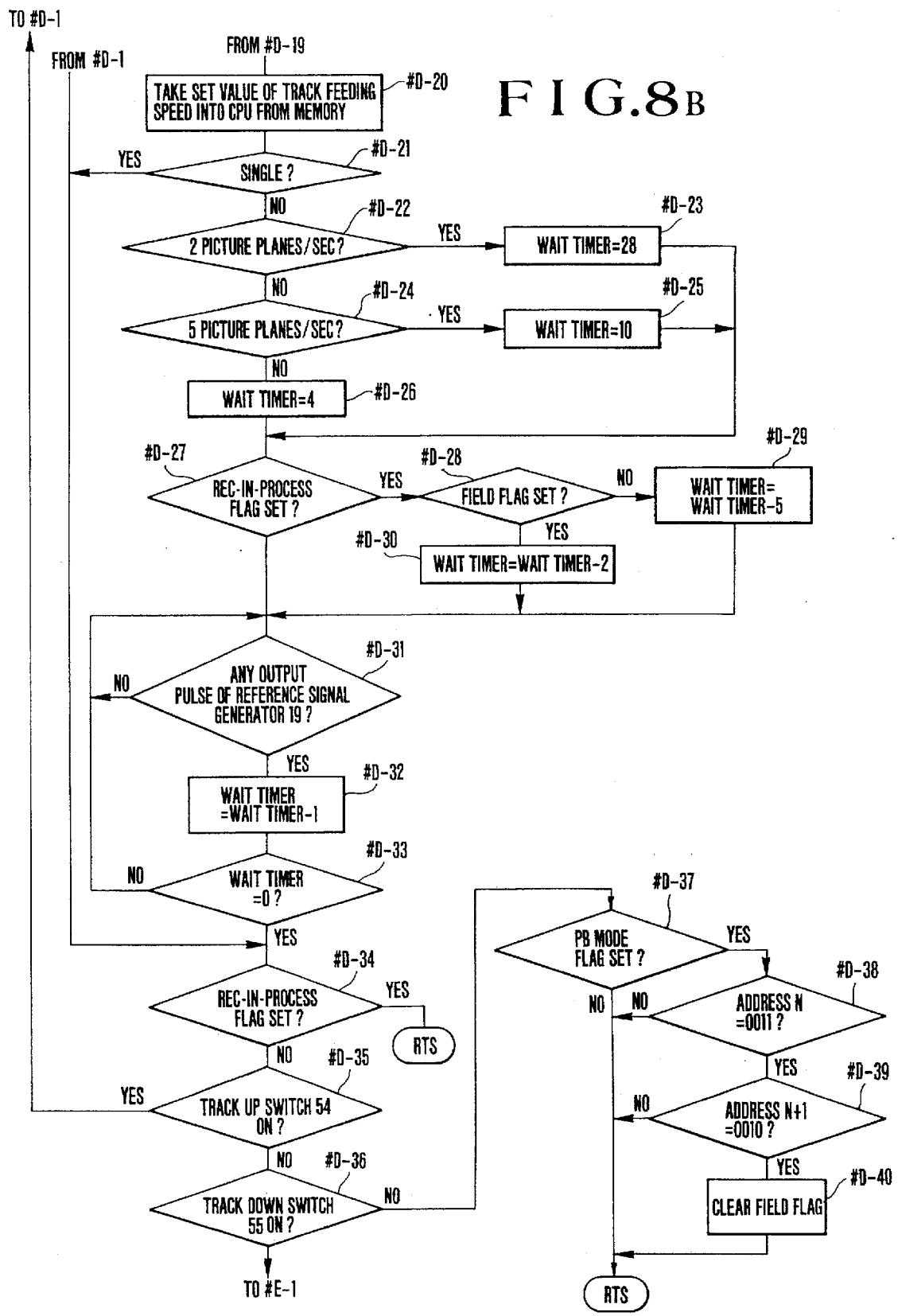
Figure 8C:
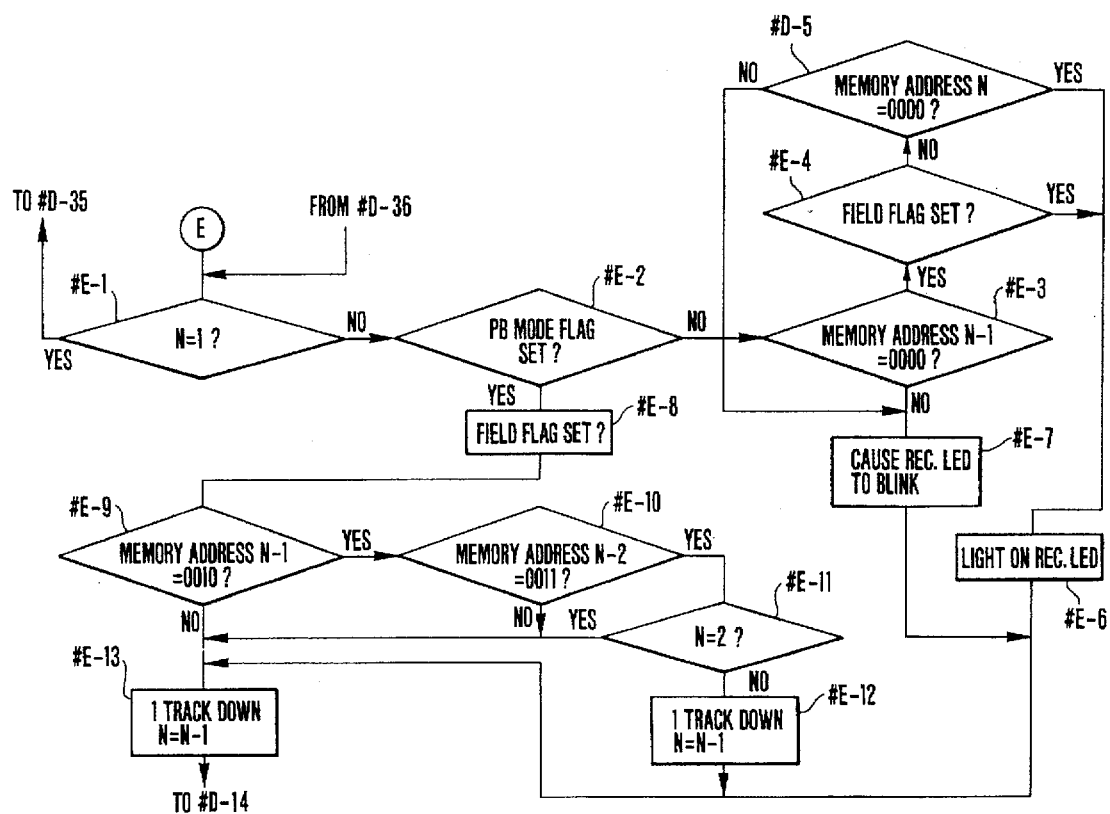

Subroutines (D) and (E) . . . FIGS. 8A, 8B and 8C (contents: track UP and track DOWN).

Figure 9:
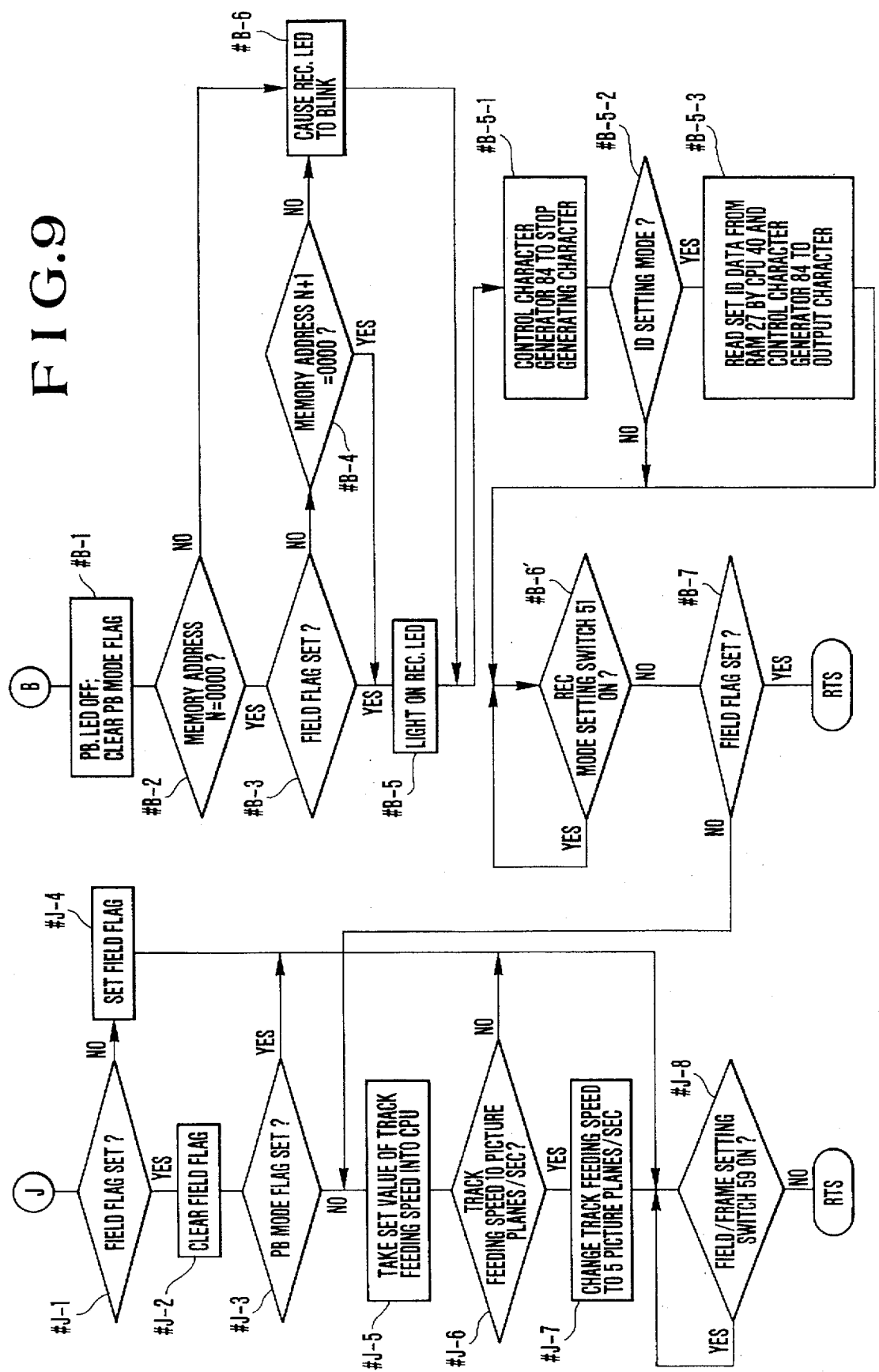

Subroutines (J) and (B) . . . FIG. 9 (contents: field/frame selection).

Figure 10:
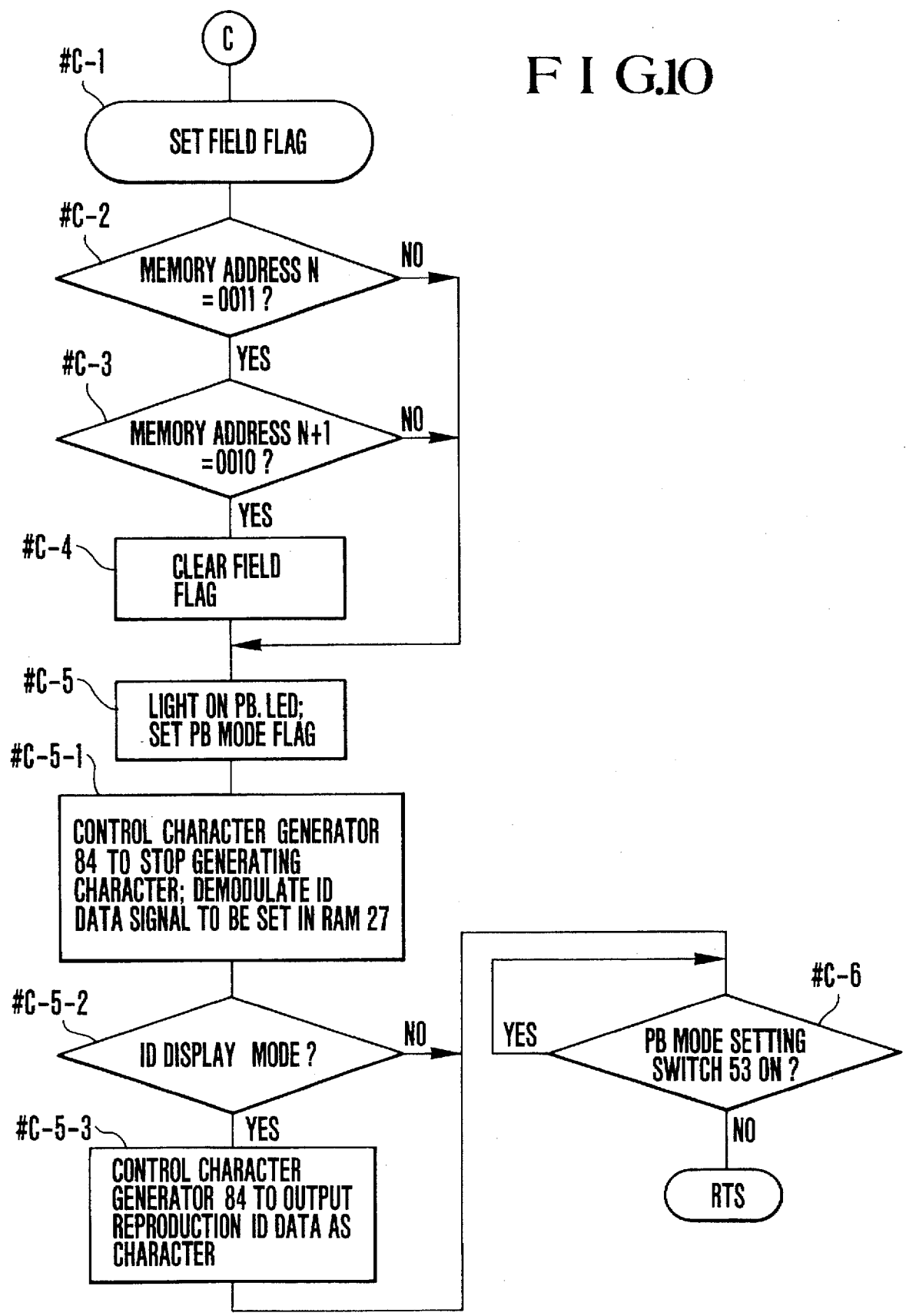

Subroutine (C) . . . FIG. 10 (contents: PB mode setting).

Figure 11:
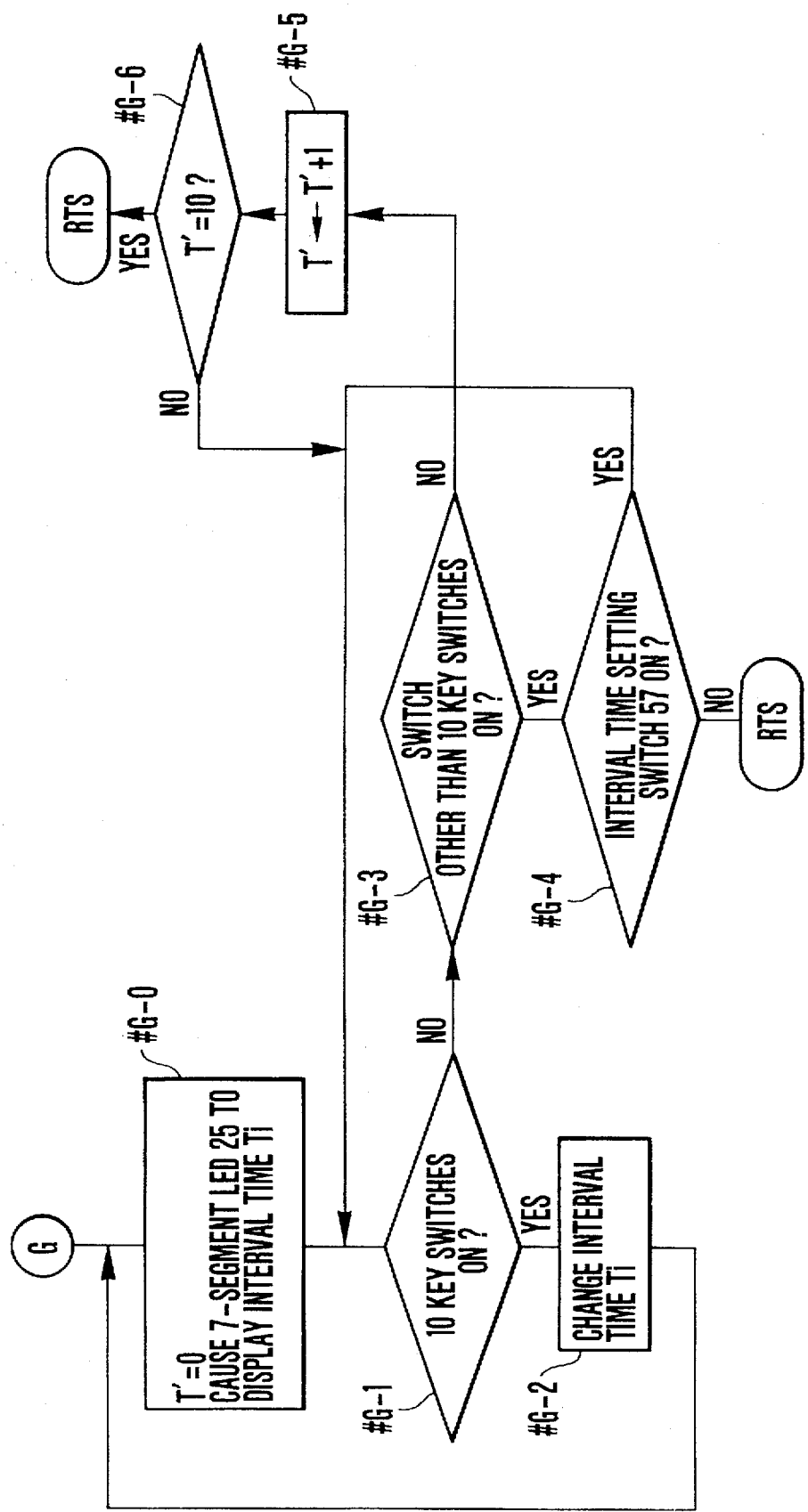

Subroutine (G) . . . FIG. 11 (contents: interval time setting).

Figure 12:
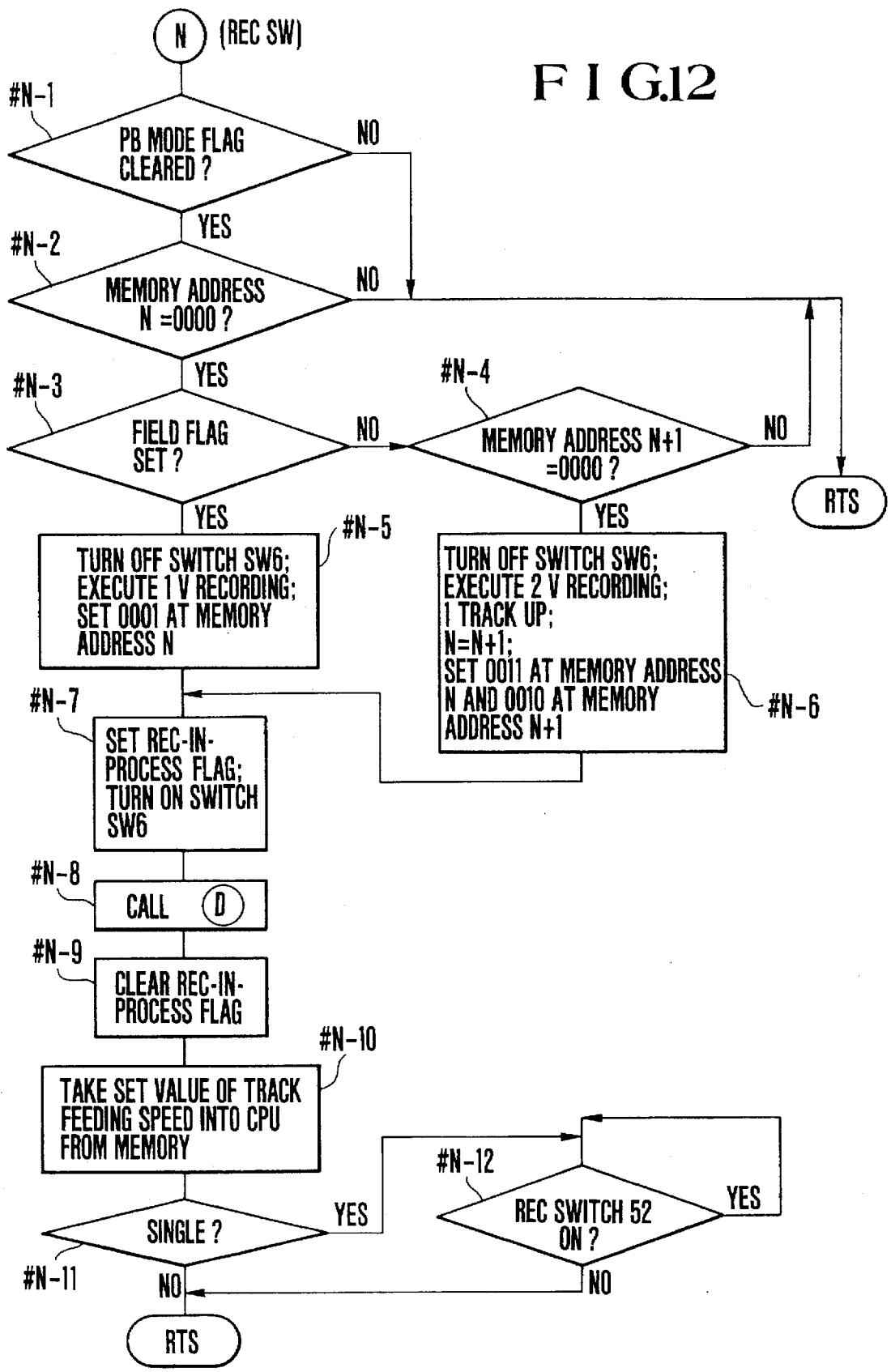

Subroutine (N) . . . FIG. 12 (contents: REC operation).

Figure 13:
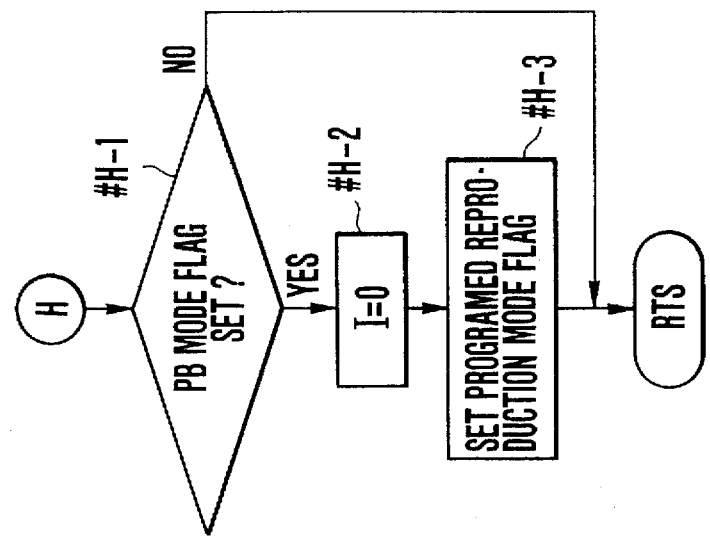

Subroutine (H) . . . FIG. 13 (contents: program setting mode).

Figure 15:
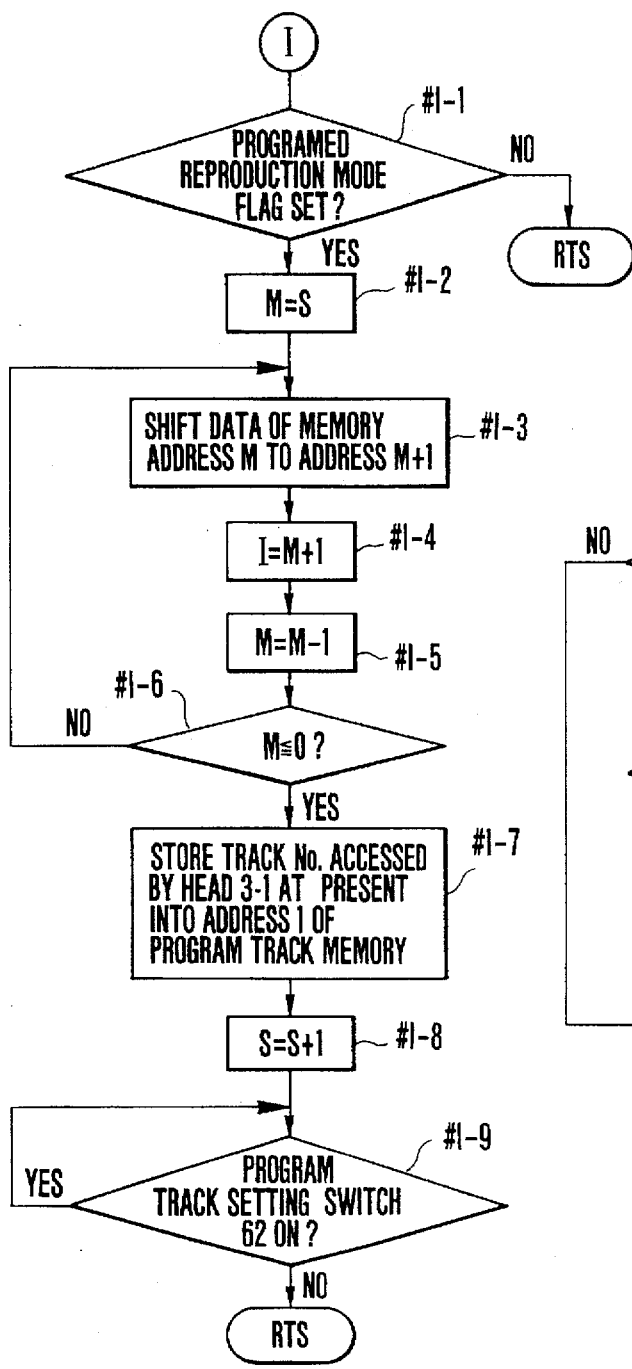

Subroutine (I) . . . FIG. 15 (contents: program setting process).

Figure 17:
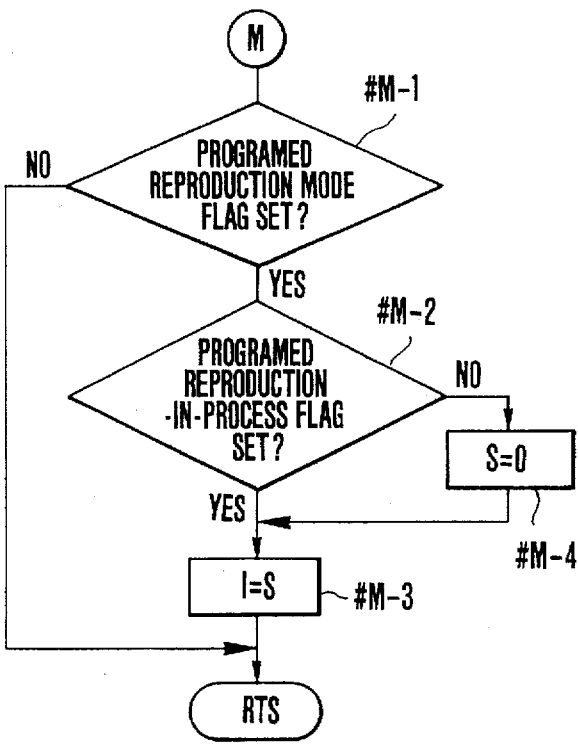
Figure 16:
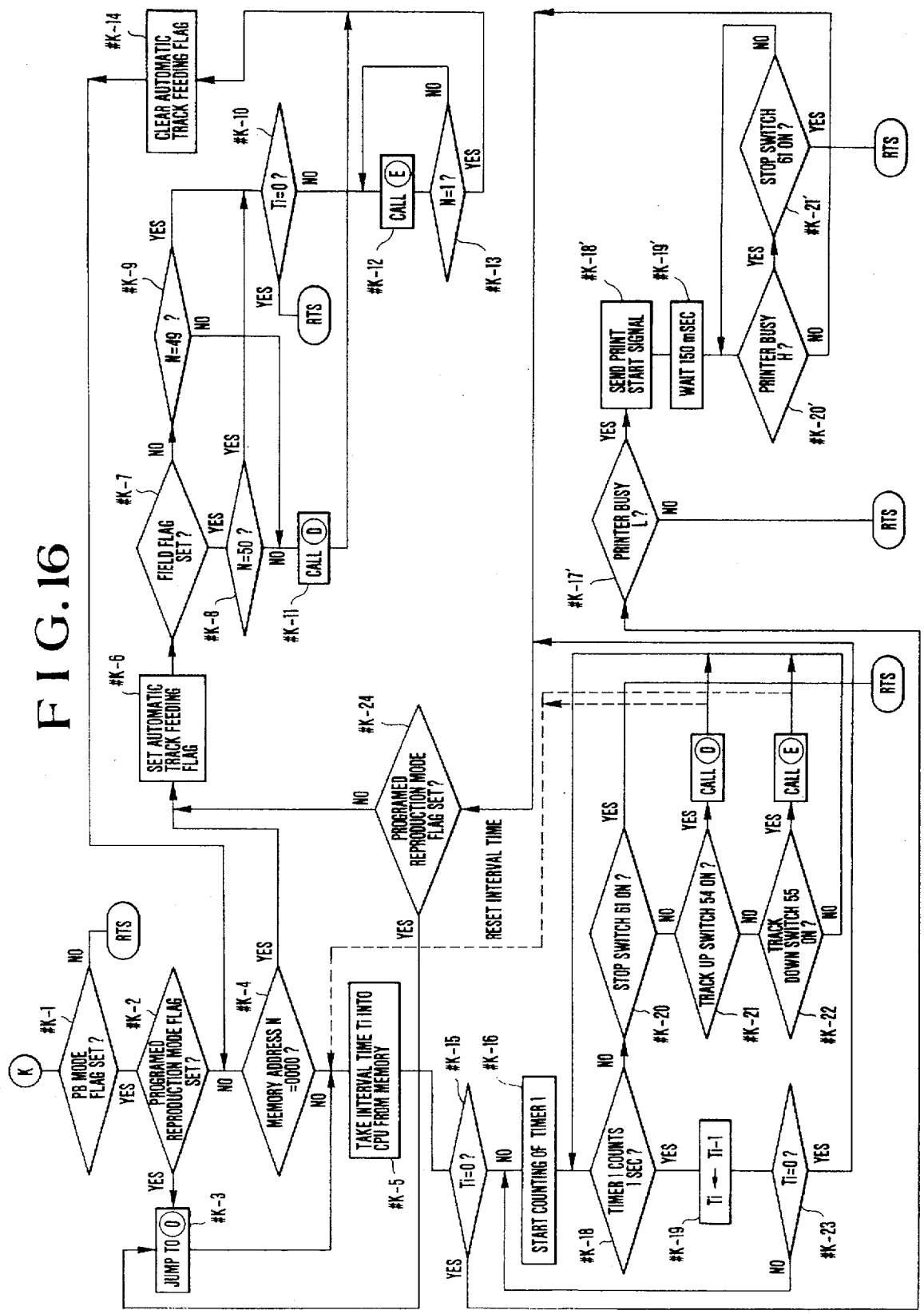
Figure 18:
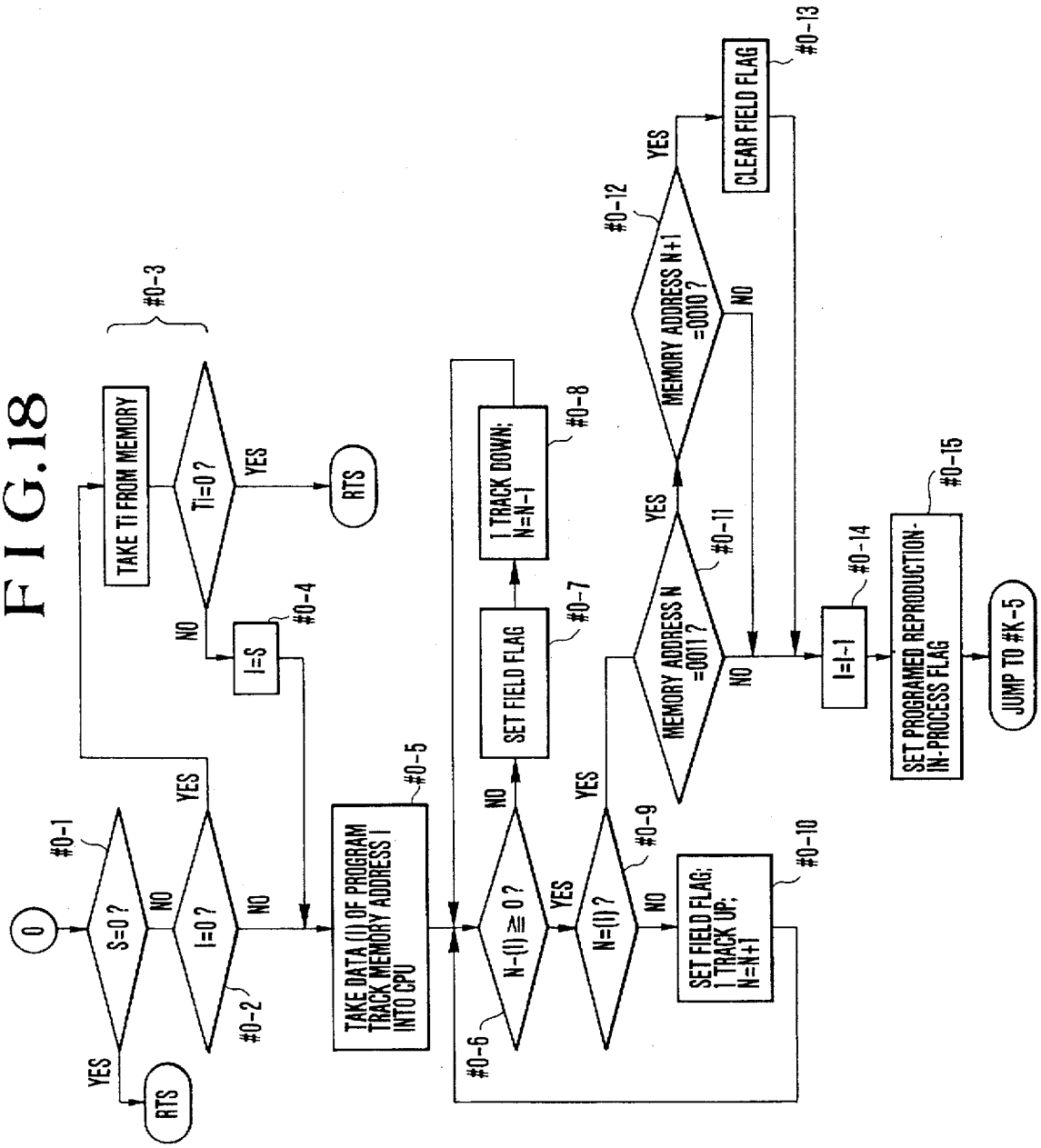

Subroutines (K), (M) and (0) . . . FIGS. 16 to 18 (contents: interval reproduction and programed reproduction).

Figure 19:
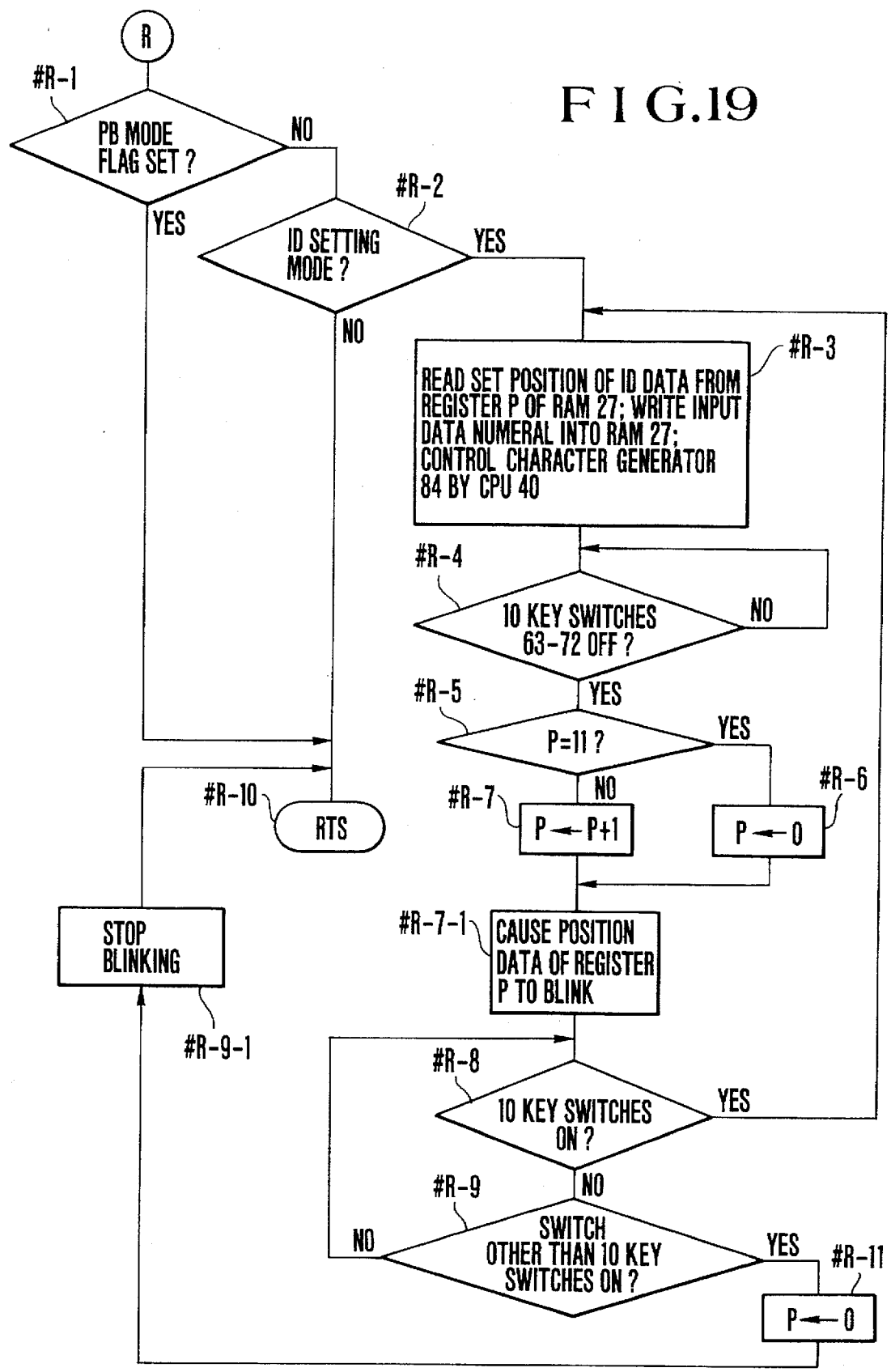

Subroutine (R) . . . FIG. 19 (contents: ID setting).

Subroutine (Q) . . . FIGS. 20 to 22(b) (contents: ID display).

Subroutines (S), (T) and (U) . . . FIGS. 23 to 26 (contents: year, month, day setting as ID).

Subroutine (V) . . . FIGS. 27 to 30(b) (contents: erasing operation).

Figure 31:
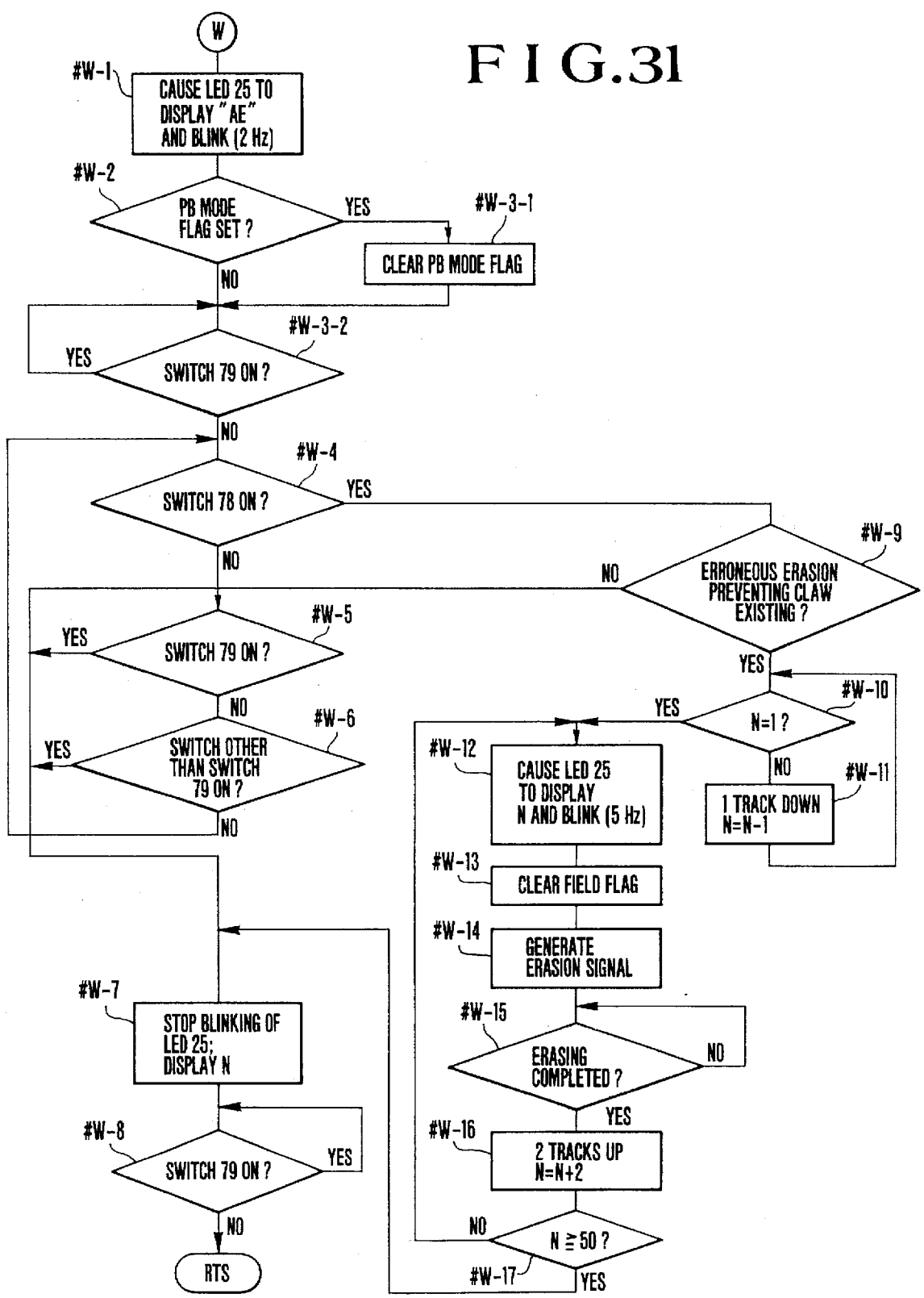

Subroutine (W) . . . FIG. 31 (contents: all track erasing operation).

Arrangement of the Embodiment:

FIG. 1 shows the arrangement of the embodiment in a block diagram. The magnetic sheet 1 has the positions of video signal recording or reproducing tracks and the track pitch predetermined thereon. These tracks are concentrically formed. In the case of a frame video signal which has one field portion of the video signal recorded in one track, one-field video signals recorded in two adjacent tracks jointly form one frame video signal. The magnetic sheet 1 is obtained in a state of having been placed within a jacket which is not shown. The jacket 1 is provided with an erroneous erasion preventing claw. An erasing action can be prevented by breaking off the claw beforehand in the same manner as in the case of an audio cassette. A DC motor 2 is arranged to cause the magnetic sheet 1 to rotate at a constant speed. In-line type heads 3-1 and 3-2 are arranged to have access to two adjacent tracks. The head 3-1 is having access to the track on the outer circumferential side of the magnetic sheet 1 and the head 3-2 to the other track on the inner circumferential side. A magnetic head shifting device 4 is arranged to shift the positions of the magnetic heads 3-1 and 3-2 to bring them to the tracks formed on the magnetic sheet 1. An innermost track detection switch 5 shifts from an OFF state to an ON state when the magnetic head 3-2 has access to the innermost track on the magnetic sheet 1 and then produces a low level signal which is supplied to a microcomputer (hereinafter referred to as CPU) 40. A reproduction amplifier 6 is arranged to amplify signals detected by the magnetic heads 3-1 and 3-2. A level detector 7 is arranged to detect a mean level value of the output signal of the reproduction amplifier 6. A comparator 8 is arranged to detect whether the output of the level detector 7 is higher than a threshold value set at a reference voltage source which is not shown. A demodulation circuit 9 is arranged to demodulate the output signal of the reproduction amplifier 6. A ½ H delay circuit 10 is arranged to delay the output of the demodulation circuit 9 as much as ½ horizontal scanning period (hereinafter referred to as ½ H). A synchronizing signal separation circuit 11 is arranged to separate synchronizing signals such as a horizontal synchronizing signal Hsync and a vertical synchronizing signal Vsync, etc. from the output of the demodulation circuit 9. A data demodulator 12 is arranged to detect a predetermined data signal from the output of the reproduction amplifier 6 and to demodulate the data signal according to the timing of the synchronizing signal separated by the separation circuit 11. The data signal can be set as desired in 11 digits by the operator. This signal permits discrimination of the kind of information recorded in the track. For example, it permits making a discrimination between a field video signal and a frame video signal or represents an year, a month and a day set by the operator. The data signal is recorded in a predetermined position relative to the synchronizing signal of the track and is within a frequency band lower than the video signal. The demodulation circuit 9 and the data demodulator 12 are separately arranged for the following reason: The video signal recorded on the magnetic sheet 1 is frequency modulated. Whereas, for the data signals other than the video signal, a DPSK (differential phase shift keying) modulation method which differs from the frequency modulation is employed. While the demodulation circuit 9 is arranged to frequency demodulate, the data demodulator 12 is arranged to DPSK demodulate.

A monitor 13 is arranged to permit observation of a reproduced video signal. A printer 13' is connected to the apparatus for the purpose of printing the video signal. The printer 13' is arranged to begin to operate when the level of a signal coming to a start signal input terminal becomes high and to make the level of a busy signal output terminal low while it is in operation. A modulator 14 is arranged, contrarily to the data demodulator 12, to DPSK modulate data produced from the CPU 40 and to supply a recording amplifier 16 with data which is modulated at timing according to the synchronizing signals Hsync and Vsync separated by a synchronizing signal separation circuit 17 from the video signal coming to a video signal input terminal 18.

A recording signal processing circuit 15 is arranged to perform frequency modulation and other processes necessary for recording on the video signal coming via the input terminal 18 and to supply its output to the recording amplifier 16. A reference signal generator 19 is arranged to generate accurate reference pulses (60 Hz) required for rotating the magnetic sheet 1 and an erasing AC signal. A magnetized piece 20 is provided on the magnetic sheet 1. As will be further described later, the magnetized piece 20 produces a signal which is used in performing rotation control over a DC motor 2 in synchronism with the reference signal produced from the reference signal generator 19. A PG coil 21 is arranged for detecting the signal from the magnetized piece 20 when the magnetic sheet 1 is rotated by the DC motor 2.

A wave form shaping circuit 22 is arranged to shape the wave form of a signal produced from the PG coil 21. The output of the wave form shaping circuit 22 is supplied to the CPU 40 and a motor control circuit 23.

The motor control circuit 23 is arranged to control the rotation of the DC motor 2. The rotation of the DC motor 2 is controlled in such a manner that the synchronizing signal Vsync from the synchronizing signal separation circuit 17 or the signal produced from the reference signal generator 19 and the signal produced from the magnetized piece 20 provided on the magnetic sheet 1 are always in a predetermined phasic relation to each other. For example, the rotation of the motor 2 is controlled to keep the phases of the two deviating by 7 H from each other. When the magnetic heads 3-1 and 3-2 are performing a recording action, a switch SW1 is shifted beforehand to its connecting position on the side of the synchronizing signal separation circuit 17. Then, the rotation of the DC motor 2 is controlled on the basis of the signal Vsync and a signal supplied from the wave form shaping circuit 22, i.e., a signal coming from the magnetized piece 20 provided on the magnetic sheet 1. In case of reproduction by the magnetic heads 3-1 and 3-2, the connecting position of the switch SW1 is shifted beforehand for the reference signal generator 19. In this instance, the rotation of the DC motor 2 is controlled on the basis of the reference signal from the generator 19 and the signal produced from the magnetized piece 20 and coming via the wave form shaping circuit 22.

A driver 23' is arranged to drive a stepping motor 24 according to a signal produced from the CPU 40 for the purpose of controlling the position of the heads 3-1 and 3-2. The stepping motor 24 is thus arranged to shift the position of the heads 3-1 and 3-2 via the above stated head shifting device 4. A display circuit 25 is arranged to be driven by a signal from the CPU 40. The display circuit 25 is composed of display elements including, as shown in FIG. 3, seven-segment display elements which are arranged to display a number assigned to the track to which the head 3-1 has access in a two-place number and a speed at which the head is being shifted; a PB (play back) LED arranged to display a reproduction mode; a REC (recording) LED arranged to display a recording mode; a FRAME LED arranged to display a frame mode; and a FIELD LED arranged to display a field mode. A ROM 26 stores the program of the CPU 40. A RAM 27 is arranged to temporarily store the data of the CPU 40. A timer 28 is arranged to be driven by the CPU 40. A crystal oscillator 29 is arranged to generate reference clock pulses for the CPU 40. A detecting circuit 80 is connected to photo-couplers 81 and 82 which form a detection switch for detecting whether the magnetic sheet 1 is inserted in the apparatus. Elements 83 and 84 and a switch SW6 are provided for displaying at the monitor 13 and a printer 13' a data signal (hereinafter referred to as ID signal) indicative of information on the year, the month, the day, etc. set as desired by the operator. More specifically, a synchronizing signal separation circuit 83 is arranged similarly to the synchronizing signal separation circuit 17 to separte synchronizing signals Vsync and Hsync from the video signal coming via a switch SW5 which is provided for adjustment of the timing of a data character to be generated. A character generator 84 is arranged to generate a character corresponding to data in synchronism with the synchronizing signals Vsync and Hsync Separated by the circuit 83. In case where the ID signal is to be displayed in a state of being superimposed on the video signal at the monitor 13 or the printer 13', the CPU 40 produces a control signal to turn on the switch SW6. Then an adder 86 applies the synchronizing signals and the ID signal to the video signal to have the character displayed in a specific position on the monitor 13 or the printer 13'.

An erase signal generator 85 is arranged to erase a signal recorded in any desired track on the magnetic sheet 1. An AC current to be used for erasion is obtained from a reference signal generator 19. The erase signal generator 85 generates an attenuation signal which is composed of, for example, a constant amplitude period T1 and an ensuing attenuating period T2 as shown in FIG. 32. The circuit 85 is connected to the recording amplifier 16. The wave form of the attenuation signal is arranged to be suitable for magnetic recording medium. However, any other suitable wave form is of course usable even if the medium is a magnetic recording medium.

A switch SW1 is arranged to have its connecting position shifted by a signal from a control circuit 30 which is driven by a signal from the CPU 40. The switch SW1 connects the synchronizing signal separation circuit 17 to the motor control circuit 23 when a recording mode indicating signal is received from the CPU 40 while the synchronizing signal Hsync is produced from the synchronizing signal separation circuit 17. The switch SW1 connects the reference signal generator 19 to the motor control circuit 23 when a reproducing mode indicating signal is received from the CPU 40 or when the signal Hsync is not produced from the synchronizing signal separation circuit 17 or when the apparatus is in an erasing mode. A switch SW2 shifts its connecting position on the basis of a signal from the CPU 40. The switch SW2 has a position in which the head 3-1 is connected to the recording amplifier 16; a position connecting the head 3-1 to the reproduction amplifier 6; and an intermediate position connecting the head neither to the recording amplifier 16 nor to the reproduction amplifier 6. A switch SW3 operates on the basis of a signal from the CPU 40 to shift its position among a position connecting the head 3-2 to the recording amplifier 16, another position connecting the same head to the reproduction amplifier 6 and an intermediate position connecting the same head neither to the recording amplifier 16 nor to the reproduction amplifier 6. A switch SW4 is also operated by the CPU 40 to shift its position as follows: In reproducing a frame video signal from the magnetic sheet 1 using both the heads 3-1 and 3-2, the position of the switch is shifted upward as viewed on FIG. 1 thus connecting them to the demodulation circuit 9. In reproducing a field video signal using only the head 3-1, the switch SW4 shifts between the upward shifted position and a downward shifted position. In other words, in that instance, the switch SW4 connects the head alternately to the demodulation circuit 9 and the ½ H delay circuit 10 for every field. A switch SW5 is driven by the CPU 40 to connect the monitor 13 to the video signal input terminal 18 for recording and to the switch SW4 for reproduction.

As mentioned in the foregoing, the video signal recorded or reproduced on and from the magnetic sheet 1 is sometimes a field video signal consisting of only one field or sometimes a frame video signal consisting of a pair of fields. The change-over of the connecting positions of the switches SW2, SW3, SW4 and SW5 for the field video signal and the frame video signal is as described below with reference to FIG. 2, which shows in combination the change-over states of the switches SW2, SW3, SW4 and SW5:

In the field reproduction, the switch SW2 connects the head 3-1 to the reproduction amplifier 6. The switch SW3 is in the intermediate position thus connecting the head 3-2 neither to the reproduction amplifier 6 nor to the recording amplifier 16. The switch SW4 allows a signal supplied from the demodulation circuit 9 to be supplied directly to the monitor 13 in the case of an odd number field and to be supplied via the ½ H delay circuit 10 to the monitor 13 if the field is an even number field. The position of the switch SW4 thus changes from one position over to the other every time the field changes. This prevents occurrence of a skew distortion.

In frame reproduction, the switch SW2 connects the head 3-1 to the reproduction amplifier 6 for an odd number field and shifts to the intermediate position thereof for an even number field. The switch SW3 is in the intermediate position thereof for an odd number field and connects the head 3-2 to the reproduction amplifier 6 for an even number field. Therefore, in the case of frame reproduction, the signal of either the head 3-1 or the head 3-2 is alternately supplied to the reproduction amplifier 6 for every field. In this instance, the position of the switch SW4 is shifted upward to allow the signal of the demodulation circuit 9 to be supplied directly to the monitor 13.

In either case of field reproduction or frame reproduction, the switch SW5 is driven to connect the monitor 13 to the switch SW4.

In field recording, the switch SW2 connects the head 3-1 to the recording amplifier 16 and the switch SW3 shifts to its intermediate position. Therefore, recording is performed by the head 3-1 in that instance.

Further, in frame recording, the switch SW2 connects the head 3-1 to the recording amplifier 16 for an odd number field and takes its intermediate position for an even number field. The switch SW3 takes its intermediate position for an odd number field and connects the head 3-2 to the recording amplifier 16 for an even number field. The combination of the positions of these switches for the heads 3-1 and 3-2 may be reversed for frame recording. In either case of field or frame recording, the switch SW5 shifts its position to connect the monitor 13 to the video signal input terminal 18 to enable the operator to observe the video signal to be recorded. Meanwhile, in any of these cases, the switch SW4 can be in any position thereof.

The operation of the embodiment in an erasing mode is as follows: Under an erasion standby condition which will be described later, the switch SW1 has its connecting position on its side for a reference signal generator 19 and the switch SW5 on its upper side as viewed on FIG. 1. In other words, they are in exactly the same state as in the case of the reproduction mode. In the case of field erasion for erasing the record of, for example, only the track being reproduced by the magnetic head 3-1, the embodiment operates as follows: In this case, the CPU 40 produces a control signal to shift the position of the switch SW2 to its side for the recording amplifier 16 and that of the switch SW3 to its intermediate position. An erasion signal trigger pulse is supplied from the CPU 40 to the erase signal generator 85. As a result, an erasion signal is applied only to the head 3-1.

In the event of frame erasion for simultaneously erasing the records of tracks to which the heads 3-1 and 3-2 have access, the embodiment operates as follows: The CPU 40 produces a control signal to shifts the switches SW2 and SW3 to their positions on the side of the recording amplifier 16 for allowing the erasion signal to be applied simultaneously to the heads 3-1 and 3-2. Then, the erasion signal is generated in response to a trigger pulse produced from the CPU 40 and is allowed to flow to both the heads via the recording amplifier 16.

In this specific embodiment, the field erasion is arranged to be performed by means of the head 3-1. In case that the other head 3-2 is to be used for that purpose instead of the head 3-1, the switch control must be changed to shift the switch SW2 to its intermediate position and the switch SW3 to its position on the side of the recording amplifier 16.

Figure 4:
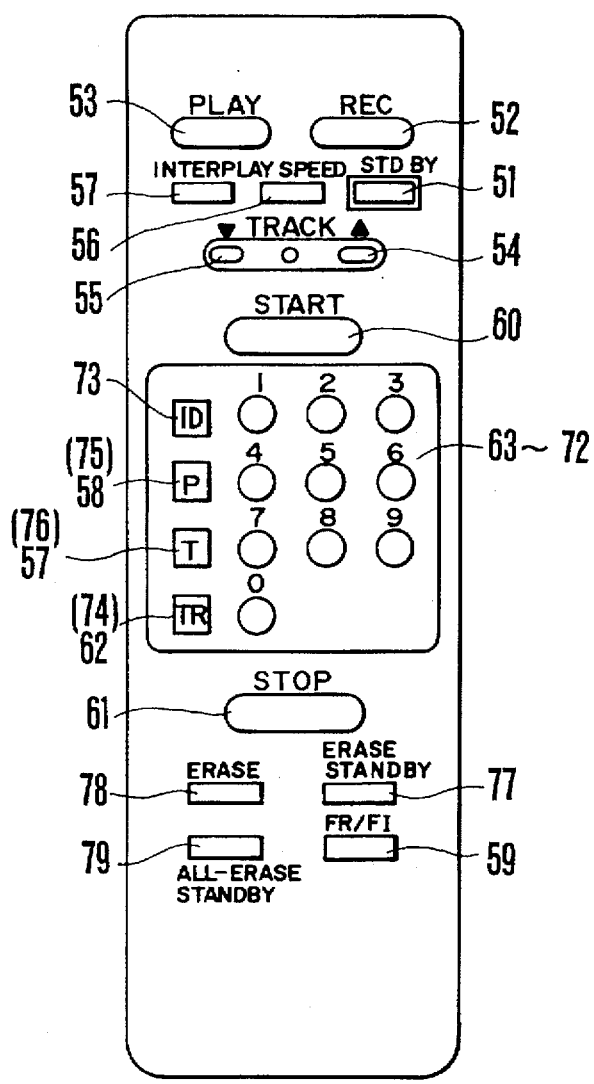
FIG. 4 is a front view of a remote control device to be used in combination with the same apparatus.

Next, the switches 51 to 79 shown in FIG. 1 are arranged as described in the following with reference to FIGS. 3 and 4 which are showing the appearance of this embodiment: FIG. 3 is a front view of the apparatus and FIG. 4 a front view of a remote control device. The switches 51 to 79 shown in FIG. 1 are divided into groups including a group of switches shown in FIG. 3, a group provided on the remote control device of FIG. 4 and a group disposed in both the apparatus of FIG. 3 and the remote control device of FIG. 4. In FIGS. 1 to 4, the switches performing the same functions are indicated by the same reference numerals. Among the switches shown in FIG. 3, those disposed only on the remote control device of FIG. 4 are shown in the circuit arrangement of FIG. 1 as connected through lines to the CPU 40 for the sake of illustration. In actuality, however, each of signals generated by operating the switches disposed on the remote control device is converted into infrared rays by the remote control device and is supplied to the CPU 40 via a remote control light receiving part 45 which is provided on the apparatus shown in FIG. 3.

The switches 51 to 79 may be arranged in various manners and their arrangement is not limited to the arrangement of this embodiment.

Referring to FIGS. 1 to 4, these illustrations include a power supply switch 41; a slot 42 for inserting the magnetic sheet 1; an ejection button 43 which is arranged to automatically eject the magnetic sheet 1 when it is turned on with the magnetic sheet 1 in the inserted state; the above stated PB LED and REC LED 44A and 44B; the remote control light receiving part 45 which is arranged to receive the signal of the remote control device shown in FIG. 4; an interval mode display LED 46 which lights up when an interval reproduction mode is selected; a display LED 48 which is arranged to show selection of field reproduction or recording or selection or frame reproduction or recording; the above stated two-place seven-segment LED 25; and LEDs 50A, 50B and 50C arranged to display the operated states of a programed reproduction setting switch 58, an interval time setting switch 57 and a programed track setting switch 62 respectively.

A REC mode setting switch 51 is arranged to set a recording mode and to find whether the head is having access to a recorded track or non-recorded track. With this switch 51 turned on, when a track to which the head has access has some existing record, the REC LED makes a flickering display to show an unrecordable state of the track. The head mentioned here is the head 3-1 in the case of field recording and is at least one of the heads 3-1 and 3-2 in the case of frame recording. When the track has no existing record, or when the control circuit 30 has detected that a video signal is not supplied, the REC LED lights up to show the recordable state of the track in question.

A REC switch 52 is arranged to determine timing for recording operation. With a recording mode selected by means of the REC mode setting switch 51, the recording operation is performed on the magnetic sheet 1 when this switch 52 is turned on. In case that a continuous recording mode has been selected by means of a track feed speed setting switch 56, a continuous recording operation is performed with the use of the heads 3-1 and 3-2 being automatically changed from one head over to the other as long as this switch 52 remains in an ON state. A PB (play back) mode setting switch 53 is arranged to set the apparatus in a reproduction mode. When the switch 53 turns on, the PB LED lights up to show the selection of the reproduction mode. A track UP switch 54 is arranged to cause the driver 23' to rotate the stepping motor 24 when the switch 54 is operated. Then, the rotation of the stepping motor 24 causes the head shifting device 4 to shift the heads 3-1 and 3-2 from one track to another track located on the inner side of the magnetic sheet 1. Further, in case that frame recording or frame reproduction has been selected by means of a field/frame setting switch 59, the heads 3-1 and 3-2 are shifted to an extent corresponding to two tracks respectively every time the track UP switch 54 is turned on. In that event, the seven-segment LED 25 displays a two-track shifted track number instead of a one-track shifted track number. In the event of selection of field recording or field reproduction, the heads 3-1 and 3-2 are shifted inward to an extent corresponding to one track when the track UP switch 54 is turned on. Then, the seven-segment LED 25 display a one-track shifted track number. Further, when the heads 3-1 and 3-2 are shifted by the operation of the track UP switch 54 after selection of the recording mode, if the track to which the head 3-1 or 3-2 has access has existing records therein, the REC LED 44B makes a flickering display. A track DOWN switch 55 is arranged to shift the heads 3-1 and 3-2 in the direction of the outer circumference of the magnetic sheet (outward) instead of its inner circumference (inward).

The switch 55 is arranged in a manner similar to the track UP switch 54. When the switch 55 is operated with frame recording or frame reproduction selected, the seven-segment LED 25 displays a two-track-shifted track number instead of a one-track-shifted track number. In case that the switch 55 is operated with field recording or field reproduction selected, the heads are shifted by one track at a time and a one-track-shifted track number is displayed. Further, in the same manner as in the case of the track UP switch 54, when the heads 3-1 and 3-2 are shifted by the operation of the track DOWN switch 55 in the recording mode, the REC LED 44B makes a flickering display as necessary showing that the tracks to which the heads 3-1 and 3-2 gained access have existing records therein.

A track feed speed setting switch 56 is arranged to make a selection between a recording or reproducing operation to be performed with the positions of the heads automatically and continuously shifted and a recording or reproducing operation to be performed with the head shifted in a non-continuous manner and is also arranged to set a track feeding speed to determine how often recording or reproduction is to be performed per sec in the event of the continuous operation.

When the switch 56 is turned on from an OFF state by pushing it once, the seven-segment LED 25 comes to display a track feeding speed instead of a track number. If, under this condition, the track feed speed setting switch 56 is again turned on within a predetermined period of time counted by the timer 28, the seven-segment LED 25 cyclically makes displays every time the switch 56 is turned on including, for example, a display of "2" indicating continuous recording or reproduction of two picture planes per sec; a display of "5" indicating continuous recording or reproduction of five picture planes per sec; and a display of "10" indicating continuous recording or reproduction of 10 picture planes per sec or makes a display of "0" indicating recording or reproduction of a single picture plane. Further, with the switch 56 turned on after it has been turned off to cause the seven-segment LED 25 to display a track feeding speed in place of a track number, if after that the switch 56 is not turned on again before expiration of the predetermined time counted by the timer 28, the display by the LED 25 comes back from the display of the track feeding speed to the normal track number display.

In case that the track feeding speed is changed by the switch 56 while the frame image recording mode has been already selected by the field/frame setting switch 59 and the REC mode setting switch 51, selection of continuous recording of ten picture planes per sec becomes impossible.

An interval time setting switch 57 is provided for setting a relatively long interval time in a continuous reproducing operation and also for setting a track feeding interval time in the event of a programed reproduction mode set by means of a programed track setting switch 58 which will be described later. The interval time is set by means of the switches 63 to 72 of the ten-key switch arrangement before the lapse of 10 sec after the switch 57 is turned on. In the event that a switch other than the ten key switches 63 to 72 is turned on after the interval time setting switch 57 is turned on, the interval time setting is automatically cancelled. A programed reproduction setting switch 58 is provided for setting the programed reproduction mode. This mode is set by programing beforehand a sequence in which tracks are to be reproduced and is continuously performed at intervals of a length of time set by means of the interval time setting switch 57.

In designating the sequence of reproducing tracks, the programed reproduction mode is first set by turning the switch 58 on. Next, the track UP and track DOWN switches 54 and 55 are operated to shift the track access positions of them and to have the video signal of a desired track reproduced on the monitor 13 for confirmation. While performing this confirmation process, a programed track setting switch 62 is turned on to store the track number of each track confirmed by the monitor 13. The field/frame setting switch 59 is arranged such that change-over takes place from the field-recording or -reproduction mode to the frame-recording or -reproduction mode and vice versa every time this switch 59 turns on.

In the event that the continuous recording mode has been set for 10 picture planes per sec by means of the REC mode setting switch 51 and the track feed speed setting switch 56, the track feeding speed is automatically changed to a continuous recording mode for five picture planes per sec when frame recording is selected by the field/frame setting switch 59, because:

In the case of frame recording, unlike field recording, the heads 3-1 and 3-2 must be shifted to an extent corresponding to two tracks at a time. In the event of recording 10 picture planes per sec, therefore, the heads must be shifted to a total extent corresponding to 20 tracks per sec, i.e., two tracks per $\frac{1}{60}$ sec taking a time for recording a video signal into consideration. However, it is difficult to carry out such a high speed head shift. In this particular embodiment of this invention, therefore, continuous frame recording for 10 picture planes per sec is inhibited.

A start switch 60 is provided for continuous reproduction with intervals or programed reproduction. When the start switch 60 is turned on in the interval reproduction mode, reproduction is performed on the tracks one after another beginning with the first track at intervals set by the interval time setting switch 57 and the ten-key switches 63 to 72, and programed reproduction begins with programed reproduction selected.

A stop switch 61 is provided for bringing to a stop the reproducing operation started by the start switch 60. In case that the stop switch 61 is turned on during programed reproduction, the programed reproduction is brought to a stop with the track which is then under the reproducing operation left in that state. A reference numeral 62 denotes the program track setting switch which is mentioned in the foregoing.

A switch 73 is provided for selection as to whether an ID signal setting action is to be allowed to begin in the recording mode and as to whether the contents of the ID signal are to be displayed in the event of the reproduction mode. In other words, in the recording mode, there obtains an ID signal setting mode with this switch 73 turned on. In the reproduction mode, the switch 73 permits selection as to whether the contents of the ID signal are to be displayed. In case where a date is to be set as the ID signal with the ID signal setting mode selected by the switch 73, switches 74, 75 and 76 are used. The switch 74 turns on when the year is set. The switch 75 turns on when the month is set. The switch 76 turns on when the day is set. In FIG. 1, these switches 74, 75 and 76 are expediently shown for the sake of illustration independently of the above stated switches 57, 58 and 62. In the case of this embodiment, however, the switches 58, 57 and 62 are arranged to perform combined functions as the switches 74, 75 and 76 as shown in FIG. 4 which shows a remote control device. In other words, since the interval time setting action by the switch 57, the program setting action by the switch 58 and the program track setting action by the switch 62 are to be performed independently of the year, month and day setting actions on the ID signal, the embodiment is arranged to reduce the number of switches for improvement in the operability and reliability of the apparatus.

The combined use of the switches is not limited to the above stated arrangement but various different combinations are conceivable and acceptable.

An erasion standby switch 77 is arranged to be used for temporarily bringing the apparatus into a standby state for erasion in erasing information recorded on the magnetic sheet 1. An erasing switch 78 is provided for having an erasing action performed in the erasion standby state. An all track erasion standby switch 79 is arranged to be used in bringing the apparatus into a mode of erasing information recorded in all the tracks.

In erasing the information recorded on the sheet 1, the erasion standby state obtains with the switch 77 first turned on. Under this condition, the apparatus is automatically set into the reproduction mode. Therefore, while the apparatus is in the erasion standby state, i.e. before carrying out the erasion, the images recorded in the erasing tracks can be confirmed on the monitor 13 or the printer 13'. Further, under the standby condition, the numbers of tracks to be erased can be continuously designated by operating the ten-key switches 63–72. After that, when the erasing switch 78 is turned on, at least one of the heads 3-1 and 3-2 is connected to the recording amplifier 16. Then, the erasion signal generator 85 produces an erasion signal as shown in FIG. 32. In response to this signal, information recorded in the applicable track is erased. Further, information recorded in all the tracks can be automatically erased by turning on the erasing switch 78 after the all track erasion standby switch 79 is turned on.

The embodiment of this invention operates as described below with reference to flow charts shown in FIGS. 5 to 20, 23 and 25 to 27.

Main Flow:

When the power supply switch 41 shown in FIG. 3 is pushed in, the power supply to the apparatus shown in FIG. 1 turns on. Electric energy begins to be supplied to each of applicable circuit parts.

Step #1: With the power supply thus switched on, registers I and S, etc. which will be described later with reference to FIG. 15 are reset to "0". A PB (play-back) mode flag is set. Then, the track feeding speed is initially set for two picture planes per sec and the interval time at three seconds. In other words, the continuous reproduction mode is automatically set when the power supply is switched on. Step #2: A check is made to see if a jacket having the magnetic sheet 1 is inserted. If so, the flow of operation proceeds to a step #3. If not, it comes to a step #4 skipping the step #3. Step #3: With the jacket having the magnetic sheet 1 found to be inserted at the step #2, the DC motor 3 is driven. Step #4: A check is made to see if the head 3-1 has gained access to the 50th track by detecting whether the switch 5 shown in FIG. 1 is in an ON state. If the heads are found to have gained access to the 50th track, the flow of operation comes to a step #6. If not, the flow branches out to a step #5 to drive the stepping motor 24 shown in FIG. 1 to bring the head 3-1 to the 50th track by repeating the loop of steps #4 and #5. Step #6: With the head 3-1 having gained access to the 50th track, the flow of operation comes to this step to set a register N at a value of 50 for having access to a memory (RAM 27). Step #7: A check is made for the driving operation of the DC motor 2. With the above stated jacket inserted, the DC motor 2 has been caused to drive the magnetic sheet 1 by the step #3. In this event, the flow of operation proceeds to a step #8 to set a field flag. If the jacket is not inserted, the DC motor 2 has not been operated as the step #3 has been skipped. In that event, therefore, the flow of operation comes back to the step #2 to see whether the jacket is inserted or not.

Step #8: The field flag is set if the DC motor 4 is found to be performing a driving operation at the step #7. Accordingly, the field mode indicating LED 44A which is shown in FIG. 3 lights up to show the field mode. In other words, in the case of this embodiment, the field mode is automatically selected with the power supply switched on and the jacket inserted. Step #9: The output of the level detector 7 shown in FIG. 1 is detected to find whether the track accessed by the head 3-1 is recorded or nonrecorded. The output level of the level detector 7 becomes high if the accessed track has already been recorded. In that event, the flow of operation proceeds to a step #10. If the output level of the level detector 7 is low, the flow of operation comes to a step #16. Let us here first described the step #16. Step #16: Data "0000" is set at an address N of the memory. The data "0000" indicates that the track corresponding to this particular address is nonrecorded (has no previous or exsisting record).

The flow of operation at a step #10 and subsequent steps is as follows:

Step #10: With the output of the level detector 7 having been found to be at a high level at the step #9, a signal recorded in the track is reproduced. Then, an ID (identification) signal is taken in from the data demodulator 12. Step #11: The content of the ID signal is detected to discriminate the video signal recorded in the track between a field video signal and a frame video signal. If it is a field video signal, the flow of operation shifts to a step #15. If it is a frame video signal, the flow proceeds to a step #12. Step #12: The video signal recorded in the track accessed by the head 3-1 is checked to find whether the signal is recorded in the inner side track of the frame video signal or in the outer side track thereof. The flow of operation comes to a step #14 if the track is located on the inner side or proceeds to a step #13 if it is located on the outer side. Step #13: With the video signal of the track accessed by the head 3-1 found to be in the outer track of the frame video signal, the address N of the memory is set at "0011" In case that the flow of operation comes from the step #1 to this step for the first time, the address N has been set to 50 at the step #6. Step #14: In the event of the inner track of the frame video signal, the address N of the memory is set at "0010". Step #17: The head 3-1 is shifted to a first track. Then, if a state of N=1 is detected, the flow of operation comes to a step #20. If not, the flow of operation proceeds to a step #18. Step #18: With the state of N=1 not detected at the step #17, the head 3-1 is shifted outward to an extent corresponding to one track pitch. Step #19: With the head 3-1 shifted outward at the step #18, 1 is subtracted from the value N to renew it. Step #20: With the state of N=1 detected at the step #17 indicating that the head 3-1 has gained access to the first track which is located outermost on the magnetic sheet, when information on the presence or absence of any record there is set at the memory, the data of the address N, i.e. the first address, of the memory is read out. If the data is "0011" thus indicating that the first track is the outer side track of two tracks forming a frame video signal, the flow of operation proceeds to a step #21. If not, the flow of operation comes to a step #23. Step #21: With the first track having been found at the step #20 to be the outer track of the two tracks forming a frame video signal, the data of an address N+1, i.e. a second address of the memory is read out. If the data is "0010" thus indicating that a second track is the inner track of the two tracks forming the frame video signal, the flow of operation proceeds to a step #22. Step #22: With the frame video signal having been found to be recorded in the first and second tracks, the field flag which is set at the step #8 is cleared to change the field mode over to a frame mode. The field/frame display LED 48 which is shown in FIG. 3 lights up to show the frame mode. Steps #23 and #24: The register N showing the above stated memory address is displayed by the two-place seven segment LED 25 shown in FIGS. 1 and 3. This display enables the operator to know the track number to which the head 3-1 has gained access. Upon completion of this step, the flow of operation jumps to another flow (A), which is as shown in FIGS. 6A and 6B.

Step #A-1: A check is made to see if the REC mode setting switch 51 is in an ON state. If so, the flow of operation calls a subroutine (B) to set the recording mode. If not, the flow proceeds to a step #A-2. Step #A-2: A check is made to see if the REC switch 52 has been turned on. If so, a subroutine (N) is called. If not, the flow proceeds to a step #A-3. Step #A-3: A check is made to find if the PB mode setting switch 53 has been turned on. If so, a subroutine (C) is called. If not, the flow proceeds to a step #A-4. Step #A-4: If the track UP switch 54 is turned on, the flow of operation calls a subroutine (D). If the switch 54 is not turned on, the flow proceeds to a step #A-5. Step #A-5: If the track DOWN switch 55 is turned on, the flow of operation calls a subroutine (E). If not, it proceeds to a step #A-6. Step #A-6: If the track feed speed setting switch 56 is turned on, the flow of operation calls a subroutine (F). If not, it proceeds to a step #A-7. Step #A-7: If the interval time setting switch 57 has been turned on, the flow of operation calls a subroutine (G). If not, it proceeds to a step #A-8. Step #A-8: If the program setting switch 58 has been turned on, the flow of operation calls a subroutine (H). If not, it proceeds to a step #A-9. Step #A-9: If the program track setting switch 62 has been turned on, the flow of operation calls a subroutine (I). If not, it proceeds to a step #A-10. Step #A-10: If the field/frame setting switch 59 has been turned on, the flow of operation calls a subroutine (J). If not, it proceeds to a step #A-11. Step #A-11: If the start switch 60 has been turned on, the flow of operation calls a subroutine (K). If not, it proceeds to a step #A-12. Step #A-12: If the stop switch 61 has been turned on, a subroutine (M) is called. If not, the flow of operation proceeds to a step #A-13. Step #A-13: If a jacket detection switch (corresponding to the detection circuit 80 of FIG. 1) has been turned on, the flow of operation jumps to a subroutine (L). If not, it proceeds to a step #A-14.

Step #A-14: A programed reproduction mode flag and a programed reproduction in-process flag are cleared.

Step #A-15: A subroutine (R) is called if any one of the ten-key switches 63–72 is in an ON state. If not, the operation proceeds to a step #A-16. Step #A-16: If the ID switch 73 is in an ON state, a subroutine (Q) is called. If not, the operation proceeds to a step #A-17. Step #A-17: If the year setting switch 74 is in an ON state, a subroutine (S) is called. If not, the operation proceeds to a step #A-18. Step #A-18: If the month setting switch 75 is in an ON state, a subroutine (T) is called. If not, the operation proceeds to a step #A-19. Step #A-19: If the day setting switch 76 is in an ON state, a subroutine (U) is called. If not, the operation proceeds to a step #A-20. Step #A-20: If the erasion standby switch 77 is in an ON state, a subroutine (V) is called. If not, the operation proceeds to a step #A-21. Step #A-21: If the all track erasion standby switch 79 is in an ON state, a subroutine (W) is called. If not, the operation comes to the step #A-13.

After the head 3-1 is allowed to gain access to the first track on the magnetic sheet with the flow of operation carried out as shown in FIG. 5, the operation jumps to the flow (A) shown in FIGS. 6A and 6B. The flow (A) of operation is repeatedly performed while checking the switches shown in FIGS. 1, 3 and 4 for their states until the state of each of these switches comes to change over to the other state. A subroutine corresponding to each of these operated switches is called.

Subroutine (F):

The subroutine (F) which is called when the track feed speed setting switch 56 is turned on is as described below with reference to FIG. 7:

FIG. 7 is a flow chart showing the subroutine (F) to be carried out when the switch 56 which is provided for changing a track feeding speed. Steps #F-1 and #F-2: A setting value of track feeding speed is read out from the memory. The setting value thus read out is set at a track number displaying buffer which is not shown. Therefore, a track feeding speed is displayed at the two-place, seven-segment LED 25 shown in FIG. 3. When the flow of operation comes to the step #F-1, a track feeding speed has been set at a value for two picture planes per sec and the LED 25 displays "2" accordingly. Step #F-3: If the track feeding speed setting switch 56 is in an ON state, the flow of operation respectively performs the step #F-3. If not, the flow of operation comes to a step #F-4.

As mentioned in the foregoing, the two-place, seven-segment LED 15 is arranged to change its track number display over to a track feeding speed display when the track feed speed setting switch 56 turns on for once. After that, when the switch 56 again turns on, the track feeding speed is changed over to another value. The step #F-3 is arranged to have the track feeding speed changed when the switch 56 comes again to turn on after it is turned off from the initial turned-on state as mentioned above.

Steps #F-4 to #F-7: With the display by the two-place, seven-segment LED 25 of FIG. 3 changed from the track number display over to the track feed speed display by turning on the track feed speed setting switch 56, if the switch 56 or any other switch is not turned on before the lapse of a predetermined period of time (two seconds) after the change-over, the track feeding speed setting action is cancelled through these steps #F-4 to #F-7. When the track feed speed setting switch 56 is turned on before the lapse of the predetermined period of time (two seconds) after the start of time count by the timer 1, the flow of operation comes from the step #F-7 to a step #F-10. If the switch is turned on after completion of the time count by the timer 1 or when another switch is turned on, the flow of operation proceeds from the step #F-6 to a step #F-8. Step #F-8: The count value of the timer 1 is cleared. Step #F-9: Contrarily to the step #F-1, the display by the two-place, seven-segment LED 25 is brought back to the track number display. Step F-10: The count value of the timer 1 is cleared. Step F-11: A check is made to find if the set value of the track feeding speed is for a single performance, which means that the head is shifted after one performance of recording or reproduction to an extent corresponding to one track in the field mode or to an extent corresponding to two tracks and then the recording or reproduction comes to a stop in the frame mode. The flow of operation proceeds to a step #F-12 in the case of a single performance or comes to a step #F-13 if the set value is not for a single performance. Further, after the power supply switch 41 is turned on, the track feeding speed has been set for two picture planes per sec at the step #1 before the flow of operation comes to this step. Step #F-12: In the event of the track feed speed setting value for a single performance, the set value is changed to a value for two picture planes per sec and then the flow of operation comes back to the step #F-1. Then, the renewed track feed speed is displayed and the above stated steps #F-3 to #F-7 are performed. Step #F-13: A check is made to find if the track feed speed setting value is for two picture planes per sec. If so, the flow of operation proceeds to a step #F-14. If not, the flow comes to a step #F-15. Step #F-14: The track feed speed setting value is changed to a value for five picture planes per sec. The flow of operation then comes back to the step #F-1. The renewed track feed speed value is displayed and the steps #F-3 to #F-7 are carried out.

Step #F-15: A check is made to find if the track feed speed setting value is for five picture planes per sec. If so, the flow of operation proceeds to a step #F-16. If the set value is found not for five picture planes per sec but for ten picture planes per sec, the flow of operation comes to a step #F-17. Step #F-16: A check is made to find if the PB mode flag is set indicating that the reproduction mode has already been set. If so, the flow of operation comes to a step #F-18. If not, it comes to a step #F-19. Step #F-17: The track feed speed setting value is changed to a value for a single performance and the flow of operation comes back to the step #F-1. A new track feed speed value thus set is displayed and the steps #F-3 to #F-7 are carried out. Step #F-18: In a continuous reproduction mode, field reproduction is performed irrespective as to whether the video signal recorded in the tracks of the magnetic sheet 1 is a field video signal or a frame video signal. In this instance, the track feed speed setting value is changed to a value for ten picture planes per sec and then the flow of operation comes back to the step #F-1. Step #F-19: A check is made to see if the field flag is set thus indicating the field recording mode with the track feed speed set for ten picture planes per sec. If so, the flow of operation branches out to a step #F-18. If not, the flow comes to the step #F-17 to change the track feed speed setting value to a value for a single performance.

In the subroutine (F) described above, the two-place, seven-segment LED 25 displays the track feed speed when the track feed speed setting switch 56 is turned on. Then, after that, the track feeding speed can be changed by again turning the switch 56 on within a predetermined period of time (two seconds). The range of selectable track feeding speeds includes the following three speeds in the frame recording mode: A speed for a single performance, a speed for two picture planes per sec and a speed for five picture planes per sec. In a mode other than the frame recording mode, the selectable track feeding speed range includes the following four speeds: A speed for a single performance, a speed for two picture planes per sec, a speed for five picture planes per sec and a speed for ten picture planes per sec. The selectable speed range depends on the track shifting capability of the arrangement including the device for shifting the heads 3-1 and 3-2, etc., shown in FIG. 1. Therefore, the range of selectable track feeding speed is set at a suitable range according to the track shifting capability.

Subroutines (D) and (E):

Referring now to FIGS. 8A, 8B and 8C, the subroutines (D) and (E) which are to be called out when the track UP switch 54 or the track DOWN switch 55 is turned on during the process of the subroutine (A) shown in FIGS. 6A and 6B are as follows:

The flow of operation to be performed when the track UP switch 54 is turned on is first described. Step #D-1: When the flow of operation comes to this step, the register N is checked to see if it is at a value 50 for the purpose of finding whether the track to which the head 3-1 has gained access is the innermost track of the magnetic sheet. If the register N is found not at 50, the flow of operation proceeds to a step #D-2. If it is found to be at 50, the flow comes to a step #D-34. Step #D-2: A check is made to find if the PB mode flag has been set thus indicating the reproduction mode. If so, the flow of operation comes to a step #D-8. If not, the flow proceeds to a step #D-3. Step #D-3: A check is made to see if the address N+1 of the memory is at "0000" thus indicating that a No. N+1 track contains no record. If so, the flow of operation proceeds to a step #D-4. If not, the flow branches out to a step #D-7. Step #D-4: With the No. N+1 track having been found to be not recorded at the step #D-3, a check is made to see if the field flag is set. If so, the flow of operation comes to a step #D-6. If not, the flow proceeds to a step #D-5. Step #D-5: With the field flag found not set at the step #D-4 thus indicating the frame mode, a check is made to see if the content of the memory at an address N+2 is at "0000" thus indicating that the No. N+2 track of the magnetic sheet has no existing record (unrecorded). If so, the flow of operation proceeds to a step #D-6. If not, it comes to a step #D-7.

With the steps #D-3 to #D-5 carried out, the flow of operation comes to the step #D-6 if two consecutive tracks are both unrecorded in the case of the frame mode. If one of the two tracks is recorded, the flow of operation comes to the step #D-7.

Step #D-6: The flow of operation comes to this step when a track accessed by the head 3-1 in the field mode or a track accessed by the head 3-1 and a track which is accessed by the head 3-2 and is located on the inner side of the former in the case of the frame mode are unrecorded and are recordable. In this case, the REC LED 44B shown in FIG. 3 lights up. Step #D-7: Contrarily to the step #D-6, if the tracks accessed by the heads 3-1 and 3-2 are recorded and unrecordable, the REC LED 44B shown in FIG. 3 is caused to blink (flicker) to inform the operator of the unrecordable state of the track. Step #D-8: With the PB mode flag found to have been set at the step #D-2, the field flag is set. This step #D-8 will be further described later along with further steps #D-9, #D-10 and #D-13. Step #D-9: A check is made to see if the address N of the memory is at "0011" indicating that a track being accessed by the head 3-1 is one of two tracks located on the outer side as mentioned in the description of the step #13. If so, the flow of operation proceeds to the step #D-10. If not, it comes to the step #D-13. Step #D-10: A check is made to see if the address N+1 of the memory is at "0010" thus indicating that a track being accessed by the head 3-2 is one of two tracks located on the inner side. If so, the flow of operation proceeds to a step #D-11. If not, it comes to the step #D-13.

In case that one of two frame video signal forming tracks which is located on the inner side is either erased or has a video signal newly recorded after erasing, even if a track accessed by the head 3-1 is located on the outer side of the two tracks forming the frame video signal, another track accessed by the other head 3-2 might not be one of the two tracks which is located on the inner side. In that event therefore, in shifting the heads 3-1 and 3-2 inward, these heads must be shifted only to an extent of one track instead of two for erasing or for reproducing the video signal newly recorded after erasing. However, under the condition of having the heads 3-1 and 3-2 shifted inward to the extent of only one track, the tracks being accessed by these heads do not always have a frame video signal recorded therein. These tracks might have different field video signals recorded therein. In the latter case, if the field flag is in a reset state, the two different field video signals would be reproduced as a frame video signal. This embodiment solves that problem by the provision of the step #D-8 mentioned in the foregoing. In other words, the field flag is set to obtain the field mode before these heads are shifted inward as mentioned above. Therefore, the possibility of having completely different field video signals reproduced as a frame video signal can be eliminated.

Step #D-11: A check is made to see if the register N is at 49. If so, the flow of operation comes to a step #D-13. If not, it comes to a step #D-12. Step #D-12: With a frame video signal recorded in two adjacent tracks accessed by the heads 3-1 and 3-2, the flow of operation comes to this step. Under this condition, if the track UP switch 54 is turned on, the driver 23 is operated to have the heads 3-1 and 3-2 shifted to the extent of just one track at this step. Following that, at the step #D-13, the heads 3-1 and 3-2 are further shifted to the extent of one track. Meanwhile the content of the register N is renewed and changed by one every time the heads 3-1 and 3-2 are thus shifted. Step #D-13: The heads 3-1 and 3-2 are shifted to the extent of one track in the same manner as in the preceding step #D-12. Step #D-14: The two place, seven-segment LED 25 shown in FIG. 3 is caused to display the content of the register N in the same manner as in the step #23.

Since the step #D-14 is subsequent to the steps #D-12 and #D-13 in this embodiment, the track number displayed by the LED 25 is changed by two at a time when a frame video signal is recorded in the tracks to which the heads 3-1 and 3-2 gain access. In case that a field video signal is recorded, the track number display of the LED 25 is changed by one at a time. Therefore, the display shows which of the field and frame video signals is recorded on the magnetic sheet 1.

Further, if this step is provided also in between the steps #D-12 and #D-13, the track number display of the LED 25 is renewed and changed by one at a time in response to the closing of the track UP switch 54 even in cases where a frame video signal is recorded in two adjacent tracks accessed by the heads 3-1 and 3-2.

Step #D-15: A check is made to see if the PB mode flag is set. If so, the flow of operation comes to a step #D-15-1. If not, it comes to a step #D-19.

Step #D-15-1: At this stop, the CPU 40 takes the reproduced ID signal produced from the data demodulator 12 into the RAM 27. The flow of operation then proceeds to a step #D-15-2. Step #D-15-2: A check is made to find if the apparatus is in the mode in which the ID signal is superimposed on the video signal for monitoring. The details of this mode will be later described with reference to FIG. 20. If the apparatus is in that mode, the operation proceeds to a step #D-15-3. If not, it comes to a step #D-15-4. Step #D-15-3: Since the apparatus is in the mode of having the ID signal monitored in the state of being superimposed on the video signal when the flow of operation comes to this step, the CPU 40 reads out the reproduced ID signal from the RAM 27 and causes the character generator 84 to generate a character pattern. Then, the character pattern is displayed on the monitor 13 in a state of being superimposed on the video signal. The flow then proceeds to the step #D-15-4. In other words, at this point of time, an ID data signal recorded in the track presently accessed by the head is displayed on the monitor 13. Step #D-15-4: If the automatic track feeding flag is not set, the flow comes to a step #D-20. If the flag is set, the flow branches off to a step #D-16. Step #D-16: A check is made to see if the address N of the memory is at "0011" thus indicating that the track accessed by the head 3-1 is the outer side track of two tracks having a frame video signal recorded. The content of the address N corresponds to the number assigned to the track to which the head 3-1 has gained access as repeatedly mentioned in foregoing. If the content of the address N is found to be "0011", the flow of operation proceeds to a step #D-17. If not, the flow branches out to a step #D-19. Step #D-17: A check is made to find if the content of the address N+1 of the memory is "0010" thus indicating that the head 3-1 has gained access to the inner side track of two adjacent tracks in which a frame video signal is recorded. If so, the flow of operation proceeds to a step #D-18. If not, it branches out to the step #D-19.

Step #D-18: When the flow of operation comes to this step through the steps #D-16 and #D-17, a frame video signal is recorded in two adjacent tracks to which the heads 3-1 and 3-2 has gained access after a shift of their positions. Therefore, the field flag which has been set at the step #D-8 is cleared to obtain a frame reproducing mode. Further, this step is carried out only in case that the automatic track feeding flag is set. (If this flag is not set, the flow branches off from the step #D-15-4 to the step #D-20. In that event, field reproduction is performed as the field flag is left in the state of being set at the step #D-8). Step #D-19: A check is made to see if an automatic track feed flag is set. If so, the flow of operation proceeds to a step #D-20. If not, the flow comes back from this subroutine (RTS). The automatic track feed flag is arranged to be set in another subroutine (K). This flag is arranged to enable the flow of operation to pull out from the subroutine (D) or from another subroutine (E) when the subroutine (D) or (E) is called during execution of a program for repeating a reproducing action while automatically feeding the tracks.

Step #D-20: A track feed speed setting value is taken in from the memory. Step #D-21: a check is made to see if the track feed speed setting value is for a single performance. If so, the flow of operation comes to a step #D-34. If not, it proceeds to a step #D-22. Step #D-22: A check is made to see if the track feed speed setting value is for two picture planes per sec. If so, the flow of operation proceeds to a step #D-23. If not, it comes to a step #D-24. Step #D-23: A wait timer register which is disposed within the CPU 40 is set at 28. Step #D-24: A check is made to see if the track feed speed setting value is for five picture planes per sec. If so, the flow of operation proceeds to a step #D-25. If not, it comes to a step #D-26. Step #D-25: The wait timer register is set at 10. Step #D-26: In case that the track feed speed setting value is for ten picture planes per sec, the flow of operation comes to this step. The wait timer register is set at 4. Further, the wait timer register the value of which is set at the above stated steps #D-23, #D-25 and #D-26 is arranged to control the track feeding speed. The content of the timer register is arranged to be decreased every time the magnetic sheet 1 is caused to make one turn by the DC motor 2 at step #D-31 and #D-32 which will be described later. Step #D-27: A check is made to see if the REC-in-process flag is set. If so, the flow of operation proceeds to a step #D-28. If not, it branches out to a step #D-31. The REC-in-process flag is arranged to be set in a subroutine (N). When the subroutine (D) is called out while a program of repetitively performing a recording action by automatically feeding tracks is in process, this flag gives a period of time necessary for recording by setting a length of time at the wait timer register when the subroutine (D) is called and by subtracting 2 or 5 from the content of the register at a step #D-29 or #D-30. In other words, the REC-in-process flag is provided for the purpose of determining a timing for recording in a predetermined position on the magnetic sheet 1 a signal which is obtained by detecting the rotating state of the magnetic sheet 1 from the PG coil 21 and also for recording the signal on the magnetic sheet 1.

Steps #D-28, #D-29 and #D-30: The field flag is checked to find if it has been set. If so, 2 is subtracted from the content of the wait timer register. If not, 5 is subtracted from the content of the register. In this instance, the wait timer register is set at 4 if the track feeding speed is set for ten picture planes per sec. However, such setting is possible only for the field mode. Therefore, in that event, the wait timer register never has 5 subtracted from its content.

Step #D-31: A check is made to see if pulses are produced from the reference signal generator 19 shown in FIG. 1. If so, the flow of operation proceeds to a step #D-32. If not, it repeats the step #D-31. Step #D-32: One is subtracted from the content of the wait timer register. Step #D-33: A check is made to see if the content of the wait timer register has become 0. If so, the flow of operation comes to a step #D-34. If not, it comes to the step #D-31.

At the steps #D-32 and #D-33, the wait timer register and the reference signal generator 19 are used as a timer for controlling the track feeding speed. Compared with a method of forming a timer by performing subtraction from the content of the wait timer register according to the output of the wave form shaping circuit 22 which is arranged to shape the wave form of the output of the PG coil 21, the method of the steps #D-32 and #D-33 permits a more stable and accurate time counting action, because: While the output of the PG coil 21 is likely to include some error resulting from unevenness of rotation of the magnetic sheet 1, the output of the reference signal generator 19 is substantially free from such error. Further, in the event of reproduction or recording with intervals, the DC motor 2 is preferably stopped from rotating during the interval time. In that event, the method of performing subtraction from the wait timer register according to the output of the wave form shaping circuit 22 is incapable of including the interval time. Whereas, in accordance with the method of this embodiment, the time counting action can be stably carried out even in that event.

Step #D-34: A check is made to see if the REC-in-process flag has been set. If so, the flow of operation comes back to the program (RTS) carried on before calling the subroutine (D). If not, it comes to a step #D-35. Step #D-35: A check is made for the ON state of the track UP switch 54. If the switch 54 is found to be on, the flow of operation comes to the step #D-1 to have the track access position of the heads 3-1 and 3-2 shifted inward. If not, the flow of operation comes to a step #D-36. Step #D-36: A check is made for the ON state of the track DOWN switch 55. If the switch 55 is on, the flow of operation shifts to a step #D-37 of the subroutine (E) for shifting outward the track access position of the heads 3-1 and 3-2. If not, the flow branches to a step #D-37.

Step #D-37: If the PB mode flag is set, the flow of operation proceeds to a step #D-38. If not, it comes back to the program in which the subroutine (D) is called. Steps #D-38, #D-39 and #D-40: Like in the case of the steps D-16, #D-17 and #D-18, the field flag is cleared for frame reproduction in the event of a frame recorded video signal. After that, the flow comes back to the program in which the subroutine (D) is called.

In the example described, above, the value set at the wait timer is not changed at the steps #D-23, #D-25 and #D-26 irrespective as to whether or not the flow of operation passes through the step #D-12 in the PB mode. Therefore, in the case of passing through the step #D-12, the track feeding speed delays as much as a length of time required for feeding one track. However, this problem can be solved with the track feeding speed adjusted for this delay by subtracting the same length of time from the value set at the wait timer in the event of passing through the step #D-12.

Subroutine (E):

The subroutine (E) which is to be carried out when the track DOWN switch 55 is turned on is as described in the following: In the subroutine (E), steps #E-1 to #E-13 are similar to the steps #D-1 to #D-13 and therefore the details of these steps are omitted here. In the subroutine (E), when the track DOWN switch 55 is turned on, the register N is checked for a state of N=1 at the step #E-1, for example, for shifting outward the track access position of the heads 3-1 and 3-2. At the step #E-9, a check is made to find if a memory address N-1 is at "0010" thus indicating the inner side track of two tracks forming a frame video signal. At the step #E-10, a check is made to find if a memory address N-2 is at "0011" indicating the outer side track of the two tracks forming the frame video signal. At the step #E-11, a check is made for a state of N=2. At the steps E-12 and #E-13, the heads 3-1 and 3-2 are shifted outward to the extent of one track.

Subroutines (J) and (B):

Referring to FIG. 9, the subroutines (J) and (B) which are to be called when the field/frame selection switch 59 and the REC mode setting switch 51 are turned on are as described below:

Step #J-1: When the field/frame selection switch 59 is found to be turned on at the step #A-10 shown in FIG. 6A, the flow of operation comes to the step #J-1. At this step, if the field flag is set, the flow of operation proceeds to a step #J-2. If not, it branches out to a step #J-4. Step #J-2: With the field flag found to be set at the step #J-1, the flag is cleared at the step #J-2. Step #J-3: A check is made to see if the PB mode flag is set. If so, the flow of operation comes to a step #J-8. If not, it branches out to a step #J-5.

Step #J-4: With the field flag found not set at the step #J-1, the field flag is set at the step #J-4.

When the field flag is cleared at the step #J-2 in the recording mode with the PB mode not set, there obtains a frame recording mode. Then, as mentioned in the description of the subroutines (D), (E) and (F), continuous recording at a speed for ten picture planes per sec is impossible. Therefore, in the subroutine (J), if the track feed speed has been set for ten picture planes per sec at the time of change-over from the field mode to the frame mode, the change-over must be inhibited. In view of that, this embodiment is arranged to have the track feed speed setting value automatically changed at steps #J-6 and #J-7 to a speed for five picture planes per sec if it has been set at a speed for ten picture planes per sec.

Step #J-5: Data of a track feed speed setting value is taken into the CPU 40. Step #J-6: If the track feed speed setting value taken in at the step #J-5 is for ten picture planes per sec, the flow of operation proceeds to a step #J-7. If not, it branches out to a step #J-8. Step #J-7: The track feed speed setting value is changed to a value for five picture planes per sec. Step #J-8: This step is repeated as long as the field/frame selection switch 59 is kept in an ON state. When the switch 59 turns off, the flow of operation comes back to the step #A-1 of FIG. 6A.

The subroutine (B) which is called when the REC mode setting switch 51 is turned on is as described below:

Step #B-1: When the REC mode setting switch 51 is found to have turned on at the step #A-1 of FIG. 6A, the flow of operation comes to this step #B-1. Then, the light of the PB LED 44A is put out and the PB mode flag is cleared. Steps #B-2, #B-3, #B-4, #B-5 and #B-6: These five steps are similar to the steps #D-3 to #D-7 respectively and, therefore, omitted from description given here.

Step #B-5-1: The CPU 40 controls the character generator 84 to cause it to suspend its character generating action. Step #B-5-2: A check is made to see if there obtains the ID signal setting mode. If so, the flow proceeds to a step #B-5-3. If not, it comes to a step #B-6'. Step #B-5-3: The CPU 40 reads out the set ID signal from the RAM 27 and causes the character generator 84 to generate a character pattern. As a result, the ID signal is displayed on the monitor 13 in a state of being superimposed on the video signal. Following that, the flow of operation proceeds to the step #B-6'.

Step #B-6': This step is repeated as long as the REC mode setting switch 51 is kept in an ON state. The flow of operation proceeds to a step #B-7 when the switch 51 is turned off. Step #B-7: With the REC mode setting switch 51 having been turned off, a check is made to find if the field flag is set. If so, the flow of operation comes back to the step #A-1 of FIG. 6A. If not, it jumps to the step #J-5 of the subroutine (J). Then, if the track feed speed setting value is for ten picture planes per sec, the set value is automatically changed to a speed for five picture planes per sec by carrying out the steps #J-6 to #J-8. Therefore, in the event of a frame mode with the REC mode set by the REC mode setting switch 51, the track feed speed setting value is limited to a speed for five picture planes per sec.

Subroutine (C):

Referring to FIG. 10, the subroutine (C) which is to be called when the PB mode setting switch 53 is turned on is as described below:

Step #C-1: The flow of operation branches out to this step upon detection that the PB mode setting switch 53 is turned on at the step #A-3 of FIG. 6A. At the step #C-1, the REC LED 44 is turned off and the field flag is temporarily set. In case that the frame recording mode has been set by resetting the field flag with the PB mode flag cleared while different field video signals are recorded in two tracks accessed by the heads 3-1 and 3-2, the different field video signals would be reproduced in an interlaced state if a reproducing action is immediately performed on the tracks accessed by the heads 3-1 and 3-2 when the PB mode setting switch 53 is found to have turned on. The step #C-1 is provided for preventing this inconvenience.

Step #C-2: A check is made to see if an applicable memory address is at "0011" thus indicating that the head 3-1 has gained access to a track which is one of two tracks having a frame video signal recorded therein and is located on the outer side of the other. If so, the flow of operation proceeds to a step #C-3. If not, it branches out to a step #C-5.

Step #C-3: A check is made to see if a memory address N+1 is at "0010" thus indicating that a track to which the head 3-2 has gained access is one of the two frame signal recorded tracks and is located on the inner side. If so, the flow of operation proceeds to a step #C-4. If not, it branches out to the step #C-5.

Step #C-4: The flow of operation comes to this step upon detection of that a frame video signal is recorded in two adjacent tracks to which the heads 3-1 and 3-2 have gained access in the steps #C-2 and #C-3. A field flag is cleared and the frame mode is set.

Step #C-5: The PB LED 44A shown in FIG. 3 lights up. The PB mode flag is set. A reproducing action begins.

Step #C-5-1: The CPU 40 causes the character generator 84 to suspend its character generating action. The CPU 40 also stores at the RAM 27 the ID signal data demodulated by the data demodulator 12. Step #C-5-2: A check is made to see if there obtains a mode of displaying the ID signal. If so, the flow of operation proceeds to a step #C-5-3. It not, it comes to a step #C-6. Step #C-5-3: The CPU 40 reads out the ID data demodulated by the data demodulator 12 and causes the character generator 84 to generate a character pattern. Therefore, the ID data is displayed on the monitor 13 in a state of being superimposed on the reproduced video signal. The flow then proceeds to the step #C-6.

Step #C-6: In the event of a continuous ON state of the PB mode setting switch 53, this step is repeated. the flow of operation comes back to the step #A-1 through the step #A-14 of FIG. 6A when the switch 53 is turned off.

Subroutine (G):

The subroutine (G) which is to be called out when the interval time setting switch 57 is turned on is as described below with reference to FIG. 11. At the step #G-0 of the subroutine (G), the timer T' is first initialized and an interval time Ti is displayed at the 7-segment LED 25.

Step #G-1: The timer T' is initialized to zero with the interval time setting switch 57 having been found to be turned on at the step #A-7 of FIG. 6A before the flow of operation comes to this step #G-1. Then, if the ten-key switch arrangement 63–72 is turned on, the flow proceeds to a step #G-2. If not, it branches out to a step #G-3.

Step #G-2: The interval time Ti is changed to another interval time value Ti set by the ten-key switch arrangement 63–72.

Step #G-3: A check is made to find if any switch other than the ten-key switch arrangement 63–72 is turned on. If so, the flow of operation proceeds to a step #G-4. If not, it branches to a step #G-5.

Step #G-4: A check is made for the ON state of the interval time setting switch 57. If the switch 57 is found on, the flow of operation comes to the step #G-1. If not, it branches to the step #A-1 shown in FIG. 6A.

Step #G-5: The value of the timer T' is increased by one and the flow of operation shifts to a step #G-6 after one second. The timer T' is arranged to be incremented every sec by one. No addition is performed before the lapse of one sec.

Step #G-6: The timer T' is checked to find if it is at a value 10. If so, the flow of operation comes to the step #A-1 of FIG. 6A. If not, it comes to the step #G-1 to repeat the loop of steps #G-1, #G-3, #G-5 and #G-6. When the value of the timer T' becomes 10, the flow comes back to the step #A-1. Therefore, in the subroutine (G), if no other switch turns on in ten seconds after the interval time setting switch 57 is turned on, the flow of operation comes back to the step #A-1 of FIG. 6A and the interval time setting is cancelled.

While the subroutine (G) is in the process of execution, the interval time Ti is of course displayed at the 7-segment LED 25. However, this display comes to a stop when the flow of operation comes back to the step #A-1 from the step #G-6.

Further, with the interval time Ti set at "0" in the subroutine (G), there obtains an external trigger mode in which, for example, the embodiment is connected to an external device such as a printer as will be described later as a reproducing action in a subroutine (K).

Subroutine (N):

Referring now to FIG. 12, a subroutine (N) which is called when the REC switch 52 is turned on is arranged as follows:

Step #N-1: The flow of operation comes to this step when the ON state of the REC switch 52 is detected at the step #A-2 of FIG. 6A. A check is made for the cleared state of the PB mode flag. If the flag is not cleared thus indicating the existence of the reproduction mode, the flow comes back to the step #A-14 of FIG. 6A (RTS). If the flag is found to have been cleared, it proceeds to a step #N-2. Therefore, if the REC (recording) mode is not set, no recording action is performed even if the REC switch 52 is on.

Step #N-2: A check is made for "0000" of the memory address N which indicates that the head 3-1 has gained access to an unrecorded track. If the track accessed is found recorded, the flow of operation comes back to the step #A-14 of FIG. 6A. If the track is unrecorded, the flow comes to a step #N-3.

Step #N-3: A check is made to see if the field flag is set. If so, the flow of operation comes to a step #N-5. If not, it proceeds to a step #N-4.

Step #N-4: The flow of operation comes to this step when the frame recording mode has been set. At this step, a check is made to find if the address N+1 of the memory is at "0000" thus indicating that the track accessed by the head 3-2 is unrecorded. If the track is not unrecorded, the flow of operation comes back to the step #A-14 of FIG. 6A. If the track is unrecorded, the REC LED 44B has been flickering. In the case of the unrecorded track, the flow branches out to a step #N-6.

Step #N-5: the head 3-1 records one field portion of the video signal in one track on the magnetic sheet 1. Then, the switch SW6 shown in FIG. 1 is turned off and the output of the character generator 84 ceases to appear on the monitor 13. Meanwhile, "0001" is set at the memory address N. Step #N-6: In case that the flow of operation comes to this step, the apparatus is in the frame recording mode. Therefore, the heads 3-1 and 3-2 respectively record one-field portions of the video signal in two tracks on the magnetic sheet 1. Then, "0011" is set at the memory address N and "0010" at the memory address N+1. The switch SW6 is turned off in the same manner as in the case of the step #N-5. Following this, the stepping motor 24 is driven to shift inward the heads 3-1 and 3-2 to an extent corresponding to one track width.

Figure 21A:
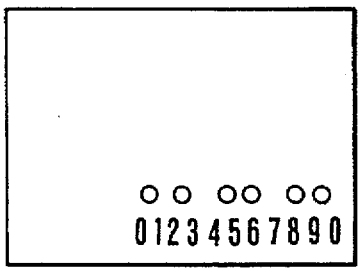
FIGS. 21(a) to 21(c), 22(a) to 22(b) and 24 are illustrations of ID signals to be displayed on a monitor.
Figure 21B:
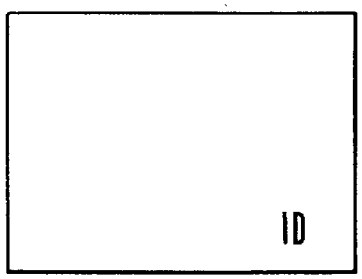

In executing the steps #N-5 and #N-6, the switches SW2 to SW5 are driven as described in the foregoing with reference to FIG. 2. Further, in performing a recording operation at the step #N-6, the CPU 40 reads out the set ID data from the RAM 27 and supplies it to the data modulator 14. The data modulator 14 modulates the ID data into a DPSK signal. The modulated ID data is supplied to the recording amplifier 16 and is then recorded in a state of being superimposed on the video signal. However, in the event of an ID data display mode which will be described later with reference to FIG. 21(c), the ID data (signal) is not recorded. In that instance, however, the data provided for indicating whether the track is on the inner side or on the outer side of a frame is simply recorded together with the video signal. Further, even in a display mode as shown in FIG. 21(a) or 21(b), the ID data signal is not displayed on the monitor 13 with the switch SW6 kept in an OFF state during the recording operation performed by executing the steps #N-5 and #N-6.

Step #N-7: The recording-in-process flag is set. Then, the switch SW6 of FIG. 1 turns on.

With the steps #N-1 to #N-7 executed, the set ID data is produced by the character generator 84 and is superimposed on the video signal. When it is supplied to the monitor 13, the character signal which is produced only during the execution of recording is cut off by the switch SW6 of FIG. 1 and then the character disappears. The monitor 13 again displays the ID data when the switch SW6 is turned on at the step #N-7.

Step #N-8: The subroutine (D) is called. If the head 3-1 has access to a track other than the 50th track, the flow of operation shifts from the steps #D-1 and #D-2 to the step #D-3. Then, the flow shifts from the step #D-3 to the step #D-13 to shift the heads 3-1 and 3-2 inward to the extent of one track. In the case of the frame recording mode, the heads 3-1 and 3-2 have already been shifted inward to the extent of one track at the step #N-6. In that case, therefore, the head 3-1 comes to gain access to a track located next to the track recorded at the step #N-6 although the embodiment is in the frame recording mode. In the event that the tracks to be used for recording by the heads 3-1 and 3-2 already have existing records, the REC LED 44B which is shown in FIG. 3 make a blinking display to give a warning to the operator. After that, the flow of operation branches from the step #D-15 to the step #D-19 and then from the step #D-19 to the steps #D-20 to #D-34 to carry out these steps. More specifically, in case that the track feed speed setting value is for a single performance, the flow branches from the step #D-21 to the step #D-34. Then, in accordance with the REC-in-process flag which has been set at the step #N-7, the flow comes back to the step #N-9. In case that the track feed speed for two picture planes per sec or five picture planes per sec has been set, subtraction is made from the value of the wait timer register as much as a period of time required for recording at the step #D-28. With the value of the wait timer register down counted, when the value of the register becomes zero, the flow of operation comes back from the step #D-33 via the step #D-34 to the step #N-9 according to the REC-in-process flag set at the step #N-7 in the same manner as mentioned above.

Step #N-9: The REC-in-process flag is cleared.

Step #N-10: The step is similar to the step #D-20. Data of the track feed speed setting value is taken in from the memory.

Step #N-11: If the track feed speed setting value is for a single performance, the flow of operation comes to a step #N-12. If not, it comes back to the step #A-14 shown in FIG. 6A.

Step #N-12: With the track feed speed set for the single performance, if the REC switch 52 is in an ON state, this step is repeated to prevent recording from being performed by repeating this step to have the subroutine (N) carried out.

In case that the track feed speed is set at a value not for the single performance and that the REC switch 52 is in an ON state, the flow comes from the step #N-11 via the step #A-14 to the step #A-1. Then, at the step #A-2, the subroutine (N) is called out to carry out the above subroutine. Thus, as long as the REC switch 52 remains in the ON state, recording is continuously performed at the set track feed speed. If the REC switch 52 is in an OFF state, the flow of operation comes from the step #N-12 to the steps #A-14, #A-1 and #A-2. However, the continuous recording comes to an end at the step #A-2 without calling the subroutine (N).

Subroutine (H):

Referring to FIG. 13, a subroutine (H) which is called when the program setting switch 58 is turned on is arranged as described below:

Step #H-1: When the program setting switch 58 is found to have been turned on at the step #A-8 of FIG. 6A, the flow of operation comes to this step. A check is made to find if the PB mode flag has been set. If so, the flow proceeds to a step #H-2. If not, it comes back to the step #A-1 of FIG. 6A (RTS). This step #H-1 is provided for inhibiting program setting in the recording mode. In this embodiment, the reproduction mode must be selected before setting a program. Then, program setting is performed while confirming on a monitor the video signal recorded in the magnetic sheet 1.

The change-over to the reproducing mode can be automatically effected by automatically setting the PB mode flag when the program setting switch 58 is turned on. In that instance, a step is provided in a manner similar to the step shown in the subroutine (C), that is, the step #H-1 is replaced with a step "call (C)" for calling the subroutine (C).

Figure 14:
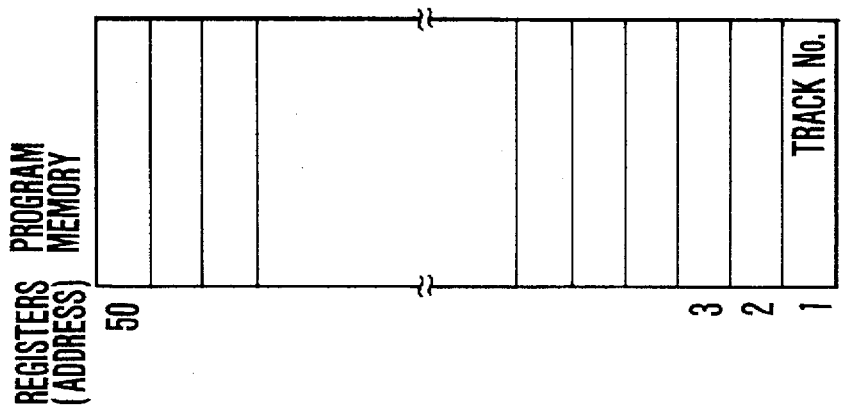

Step #H-2: During the process of programed reproduction using a programed track memory which is arranged to store a program as shown in FIG. 14, the content of a register I showing an address of the programed track number at which the number of a track to be next reproduced is changed to zero.

Step #H-3: A programed reproduction mode flag which indicates selection of the programed reproduction mode is set. The flow then comes back to the step #A-1.

Subroutine (I):

FIG. 15 is a flow chart showing a subroutine (I) which is to be called when the programed track setting switch 62 is turned on after the programed reproduction mode is set by the subroutine (H).

Step #I-1: A check is made to see if the programed reproduction mode flag has been set. If so, the flow of operation proceeds to a step #I-2. If not, it branches out to the step #A-1. Therefore, with the programed reproduction mode not set by the program setting switch 58, no program setting action is performed even when the programed track setting switch 62 is operated.

Step #I-2: a register S which is initially set at a state of S=0 when the power supply is switched on at the step #1 indicates the foremost address storing the program of the above stated programed track memory. At the step #I-2, data which is the same as the content of the register S is written into a register M.

Step #I-3: The data of the programed track memory stored at the register M is stored at an address which is larger by one than the above stated address. In other words, the tracks number indicating data stored at the programed track memory is stored at another address which is larger by one than the address storing the data.

Step #I-4: A value obtained by adding one to the content of the register M is written into a register I.

Step #I-5: One is subtracted from the content of the register M.

Step #I-6: A check is made as to whether or not the content of the register M is not greater than zero. If it is found zero or less than zero, the flow proceeds to a step #I-7. If it is found greater than zero, it branches out to the step #I-3.

The loop of steps #I-3 to #I-6 are repeated until the content of the register becomes zero. When it becomes zero, all the data stored at the addresses of the programed track memory are respectively transferred to addresses larger by one. Therefore, when the flow comes from the step #I-6 to a step #I-7 after repeating the loop of steps, no data is stored at the address 1 of the programed track memory.

Step #I-7: The number of a track to which the head 3-1 has access is stored at the address 1 of the programed track memory. Therefore, with the programed track setting switch 62 turned on, the number of a track having the recorded video signal thereof being reproduced by the head 3-1 is programed.

Step #I-8: One is added to the content of the register S. With this step performed, the foremost address (the largest address) of data of the programed track memory shifted by execution of the loop of steps #I-3 to #I-6 is always stored at the register S.

Step #I-9: This step is repeated while the programed track setting switch 62 is in an ON state. When the switch 62 turns off, the flow of operation comes back to the step #A-1.

In case that the operator further proceeds with program setting, the track UP switch 54 or the track DOWN switch 55 is turned on to change the tracks to which the heads 3-1 and 3-2 are to be shifted. When reproduction is made from a desired track, program setting can be accomplished by turning on the programed track setting switch 62 while confirming a picture thus reproduced.

The data stored at each of addresses of the programed track memory shown in FIG. 14 comes to be stored at a larger address one by one every time the programed track setting switch 62 is turned on. During the process of program setting, the registers S and I have exactly the same content as each other.

With a program set by turning on the program setting switch 58 and the programed track setting switch 62, the program is reproduced by a program reproducing operation. Programs for execution of the programed reproduction and an interval reproducing operation which is carried out by reproducing records at set intervals one after another from recorded tracks accessed by the heads 3-1 are as described below with reference to FIGS. 16 to 18:

Subroutine (K):

FIG. 16 shows a subroutine (K) which is called when the start switch 60 is turned on. The subroutine (K) consists of the following steps:

Step #K-1: With the start switch 60 found to have turned on at the step #A-11 of FIG. 6A, the flow of operation comes to this step to make a check to see if the PB mode flag has been set. If not, the flow comes to the step #A-1. If the flag is set, the flow comes to a step #K-2. In this embodiment, therefore, neither interval reproduction nor programed reproduction are possible if the reproduction mode is not set. Therefore, interval reproduction or program reproduction can be prevented from being accidentally started even if the start switch 60 is turned on by mistake when the embodiment is in the recording mode. This arrangement, however, may be changed to permit starting interval reproduction or programed reproduction immediately by just turning on the start switch 60 without setting the reproduction mode set beforehand. In the case of that modification, the step #K-1 is replaced with a step similar to the step #C-5.

Step #K-2: A check is made to see if the programed reproduction mode flag has been set. If so, the flow proceeds to a step #K-3. If not, it branches to a step #K-4. In the case that the programed reproduction mode flag is not set, i.e. in carrying out interval reproduction, the flow of operation takes place in the following manner:

Step #K-4: A check is made to see if the address N of the memory is at "0000" indicating that the head 3-1 has gained access to an unrecorded track. If so, the flow of operation comes to a step #K-6. If not, it proceeds to a step #K-5. In the case that the track accessed by the head 3-1 is not recorded, the flow of operation from the step #K-6 is as follows:

In the embodiment described below, if the track accessed by the head 3-1 is not the 49th nor 50th track, only recorded tracks are reproduced one after another beginning with the accessed track. If the track is either the 49th or 50th track, recorded tracks are reproduced beginning with the first track.

However, this arrangement can be changed to have the reproduction of recorded tracks begin always from the first track by inserting an additional step of driving the stepping motor 24 to cause the head 3-1 to gain access to the first track in between the steps #K-2 and #K-4.

This arrangement is highly advantageous in carrying out a look-up operation by automatic interval reproduction starting with the first track one after another in the event that the head 3-1 has access to a track other than the first track.

Step #K-6: An automatic track feeding flag is set indicating that an interval reproducing operation is in process.

Step #K-7: A check is made to see if the field flag has been set. If so, the flow of operation proceeds to a step #K-8. If not, it branches to a step #K-9.

Step #K-8: The register N is checked to find if it is at 50 thus indicating that the track accessed by the head 3-1 is the innermost track. If so, the flow of operation comes to a step #K-10. If not, it comes to a step #K-11.

Step #K-9: The register N is checked to find if it is at 49 thus indicating that the track accessed by the head 3-1 is in the innermost position but one. If so, the flow proceeds to the step #K-10. If not, it comes to the step #K-11.

Step #K-10: The interval time Ti which is set by execution of the subroutine (G) is checked to find if it is at "0" thus indicating a mode in which the head 3-1 is to be shifted in accordance with a preset program in response to an external trigger signal as will be described later. If the interval time Ti is set at "0" because of that mode, the flow branches out to the step #A-1. If not, it comes to a step #K-12.

Step #K-11: The subroutine (D) is called to execute steps #D-1 to #D-18. The PB mode flag is set when the subroutine (D) is called during the execution of the subroutine (K). Therefore, the flow of operation branches from the step #D-2 to the step #D-9. Then, the heads 3-1 and 3-2 are shifted inward to an extent of two tracks at steps #D-12 and #D-13 if a track located more inward by one track than the track accessed by the head 3-1 is found to be the inner side track of the two tracks having a frame video signal recorded therein and if the head 3-1 is not having access to the 49th track at the step #K-4. If not, the heads 3-1 and 3-2 are shifted inward to an extent of only one track at the step #D-13. Further, if a frame video signal is recorded in the tracks accessed by the heads 3-1 and 3-2, the field flag is cleared and the flow of operation shifts from the step #D-19 to a step #K-14.

Step #K-12: The subroutine (E) is called. The steps #E-1 to #E-13 and #D-14 to #D-19 are carried out. In case that a frame video signal is found at the step #K-4 to be recorded in two tracks located adjacent to and on the outer side of a track accessed by the head 3-1, the heads 3-1 and 3-2 are shifted outward to the extent of two tracks at steps #E-12 and #E-13. With the exception of this case, the heads are shifted outward to the extent of only one track. Further, like in the case of the step #K-11, if a frame video signal is recorded in the tracks accessed by the heads 3-1 and 3-2, the field flag is cleared and the flow shifts from the step #D-19 to a step #K-13.

Step #K-13: The content of the register N is checked to see if it is 1 thus indicating that the track accessed by the head 3-1 is the outermost track. If so, the flow proceeds to a step #K-14. If not, it branches out to the step #K-12. Therefore, in case that the flow of operation branches to the step #K-12 from the step #K-8 or #K-9 with the head 3-1 gaining access to the 49th or 50th track, the steps #K-12 and #K-13 are repeated to bring the head 3-1 to the first track.

Step #K-14: The automatic track feeding flag is cleared.

As mentioned above, when the flow of operation comes from the step #K-4 to the step #K-5 with the steps #K-4 to #K-14 carried out, the head 3-1 comes to have access to a track having a video signal recorded therein. All the tracks having no video signal recorded therein are skipped over and substantially not reproduced.

Further, when the flow comes from the step #K-4 to the step #K-5 with the steps #K-4 to #K-14 executed, if a frame video signal is recorded in two tracks accessed by the heads 3-1 and 3-2, the field flag has been cleared at the step #D-18 of the subroutine (D). In that event, therefore, a frame reproduction mode is automatically set. Further, if field video signals are recorded in tracks accessed by the heads 3-1 and 3-2, a field reproduction mode is automatically set. In the event of interval reproduction, therefore, the embodiment is automatically set in the optimum reproduction mode according to the manner in which the video signal is recorded.

Step #K-5: The interval time Ti set by the subroutine (G) is taken into the CPU 40 from the memory.

Step #K-15: A check is made to see if the interval time Ti is at "0" in a manner similar to the step #K-10. If so, the flow branches out to a step #K-17'. If not, it comes to a step #K-16. Assuming that no external trigger mode is set in this case, the flow of operation at the step #K-16 and steps ensuing it is as follows:

Step #K-16: The timer 1 begins to count time. The flow comes to a step #K-18.

Step #K-18: A check is made to see if the timer 1 has counted one second. If so, the flow proceeds to a step #K-19. If not, the flow branches out to a step #K-20.

Step #K-20: A check is made to see if the stop switch 61 is in an ON state. If so, the flow branches out to the step #A-1. If not, it comes to a step #K-21. When the flow branches to the step #A-1, the steps #A-1 to #A-12 are executed. Therefore, when the stop switch 61 is turned on under a normal condition, the flow calls a subroutine (M) at the step #A-12.

Subroutine (M):

The subroutine (M) is as described below with reference to FIG. 17:

Step #M-1: A check is made to see if the programed reproduction mode flag is set. If not, the flow comes to the step #A-14. If the flag is set, the flow proceeds to a step #M-2.

Step #M-2: A check is made to see if a programed reproduction-in-process flag is set. If so, the flow proceeds to a step #M-3. If not, it branches out to a step #M-4.

Step #M-3: The content of the register I is equalized with that of the register S.

Step #M-4: The content of the register S is shifted to zero. Then, the step #M-3 is executed.

Further details of the subroutine (M) will be described later along with the programed reproduction mode. The flow of operation at a step #K-21 and steps ensuing it is as follows:

Step #K-21: A check is made to see if the track UP switch 54 is on. If the switch is found to be on, the subroutine (D) is called to shift the heads 3-1 and 3-2 inward. If not, the flow proceeds to a step #K-22.

Step #K-22: The track DOWN switch 55 is checked to see if it is on. If it is, the subroutine (E) is called to shift the heads 3-1 and 3-2 outward. If not, the flow of operation branches out to the step #K-18.

Step #K-19: One is subtracted from the interval time Ti taken in from the memory.

Step #K-23: If the interval time Ti is zero, the flow proceeds to a step #K-24. If not, the flow branches to the step #K-16.

During interval reproduction, images recorded in tracks neighboring the tracks under the reproducing operation thus can be reproduced by turning on the track UP switch 54 and the track DOWN switch 55 with the above stated steps #K-15 to #K-23 carried out. In that instance, the track to be reproduced at the track feeding speed set by the subroutine (F) can be automatically renewed from one track to another by keeping the switch 54 or 55 in its ON state. Therefore, an image preceding by several picture planes can be readily reproduced during the interval reproduction.

Further, in reproducing the images recorded in the tracks neighboring the track under the reproducing operation by turning on the track UP switch 54 and the track DOWN switch 55, if the reproducing operation is performed for the remaining period of the interval time Ti of the track under the reproducing operation, the flow of operation according to the arrangement of this embodiment shifts from the step #K-23 to the step #K-24 to renew the reproducing track. However, this arrangement may be changed to reset the interval time Ti to enable the operator to observe the image renewed by the switch 54 or 55 for a predetermined period of time without fail by allowing the flow of operation to jump to the step #K-5 as indicated by a broken line in FIG. 16.

Step #K-24: At the time of renewal of the reproducing track after the end of the interval time Ti, a check is made to see if the programed reproduction mode has been set. If so, the flow branches to the step #K-3. If not, it branches to the step #K-6.

Subroutine (O):

FIG. 18 shows a subroutine (O) which is called when the programed reproduction mode flag is found to be set at the step #K-2. The subroutine (O) is as described below with reference to FIG. 18:

Step #O-1: The register S is checked to see if its content is "0". If so, the flow comes to the step #A-1. If not, it proceeds to a step #O-2. As mentioned in the foregoing, the foremost address of the programed track memory at which a program is set is stored at the register S. When the content of the register S is "0", it indicates that no program is stored. In this instance, therefore, the flow of operation comes back to the subroutine (A).

Step #O-2: A check is made to see if the content of the register I is "0". If so, the flow proceeds to a step #O-3. If not, the flow branches out to a step #O-5.

As mentioned in the foregoing, the address of the track memory storing the number of a track to be next reproduced during the execution of programed reproduction is stored at the register I. during the programed reproduction, one is subtracted from the register I every time one step of programed reproduction is performed, as described in a step #O-14. Therefore, the fact that the flow comes to the step #O-2 and the register I is found to be at "0" does not indicate that the register S is at "0" with a program set but indicates completion of execution of one round of steps of programed reproduction. In other words, with the programed reproduction having been performed for once, the flow of operation comes to a step #O-3. If the programed reproduction is still in process, the flow branches to a step #O-5.

Step #O-3: The interval time Ti set by the subroutine (G) is taken in. A check is made to see if the interval time Ti is at "0". If so, the flow comes back to the step #A-1 to complete the programed reproduction.

Therefore, in the external trigger mode which is set with the interval time set at "0", a program reproducing operation comes to a stop upon completion of execution of one round of the programed reproduction.

In the case of normal programed reproduction for which the interval time Ti is set at a value other than "0", the flow shifts to a step #O-4.

Step #O-4: The content of the register S is written into the register I. Then, the programed action is resumed.

Step #O-5: The data (I) of an address of the programed track memory which is set at the register I (indicating data written in an address set at the register I of the programed track memory by parenthesizing I) is read out.

Step #O-6: The data (I) is subtracted from the content of the register N indicating the number of a track to which the head 3-1 presently gains access. If the result of subtraction is not less than "0", the flow comes to a step #O-9. If it is less than "0", the flow comes to a step #O-7.

Step #O-7: The field flag is set for the purpose of inhibiting the heads from being shifted in the frame mode in the same manner as in the case of the step #D-8.

Step #O-8: The heads 3-1 and 3-2 are shifted outward to an extent corresponding to one track.

Step #O-9: A check is made to see if the number of a track to which the head 3-1 has access as indicated by the register N is equal to the data (I). If so, the flow comes to a step #O-11. If not and the data (I) is larger, the flow comes to a step #O-10.

Step #O-10: The heads 3-1 and 3-2 are shifted inward to the extent corresponding to one track.

Steps #O-11, #O-12 and #O-13: These steps are similar to the steps #D-16, #D-17 and #D-18. Either frame reproduction or field reproduction is automatically performed according to whether the video signal recorded by these steps is a frame video signal or field video signal.

Further, the head 3-1 is controlled by repeating the steps #O-6 to #O-10 to have access to a track programed at the programed track memory.

Steps #O-14: One is subtracted from the register I.

Step #O-15: A programed reproduction-in-process flag is set. With this step performed, the flow can be branched by making a check at the step #K-24 to see if the program reproduction mode flag is set. Next, the flow jumps to the step #K-5.

Therefore, when the subroutine (O) is called at the step #K-2, a check is first made for an actual set state of a reproduction program. Further, a check is made to see if the external trigger mode has been set. If the external trigger mode is found to have been set, the program is executed only once. With the exception of this, the programed reproduction is performed in a repeating manner.

The flow of operation in the external trigger mode is as follows: In this instance, the flow branches from the step #K-15 to a step #K-17'.

Step #K-17': A check is made to find whether a printer connected to the embodiment as an external device is busy (performing a printing action). If so, the flow of operation comes to the step #A-1. If not, it branches out to a step #K-18'.

Step #K-18': A print start signal is sent to the printer. The print start signal can be sent by making high the signal level of a terminal connected to the printer.

Step #K-19': There obtains a wait state for 150 m.sec.

Step #K-20': If the printer is busy, the flow of operation comes to a step #K-21'. If not, the flow branches out to a step #K-24.

Step #K-21': The stop switch 61 is checked for an ON state thereof. If not, the flow comes to the step #K-20'. If the switch 61 is found to be turned on, the flow comes back to the step #A-1.

If the printer which is connected as an external device is found busy in executing the steps #K-17' to #K-21', the flow of operation comes back to the step #A-1 as mentioned above. In that instance, the flow shown in FIG. 16 is repeated until another switch is turned on. During this repeating process, when the start switch 60 is again turned on, the above stated flow of operation is repeated to carry out the step #K-17'.

In case that the printer is not connected as an external device, a terminal which is arranged to receive a signal from the busy signal output terminal of the printer 13' as shown in FIG. 1 opens to have a high level there. This causes the flow of operation to come back to repeat the above stated flow. Therefore, in the event that no external device such as the printer is connected although the external trigger mode is set, the record of the tracks to which the heads 3-1 and 3-2 have access is continuously reproduced and the reproducing tracks are not renewed.

Further, with the printer connected as an external device, if the printer is not busy and the flow proceeds from the step #K-17' to the step #K-18' a printer start action begins when the wait time of 150 m.sec of the step #K-19' elapses after a print start signal is applied to the printer. Then, when the printer thus becomes busy, the steps #K-20' and #K-21' are repeated until either the action of the printer comes to an end or the stop switch 61 is turned on. When the action of the printer comes to an end, the flow branches from the step K-20' to a step #K-24. At this step, a check is made to find if the programed reproduction mode has been set. If so, the flow branches to the step #K-3. If not, it branches to the step #K-6. Further, in case that the stop switch 61 is turned on, the flow of operation is performed in the same manner as described in the foregoing.

When the external trigger mode is selected in the programed reproduction mode, programed reproduction is performed and comes to a stop at the end of one performance of reproduction as mentioned at the step #O-3 in the foregoing.

In accordance with the arrangement of this embodiment, even in case that the programed reproduction mode is not set while the external trigger mode has been selected, the provision of the step #K-10 brings a reproducing operation to a stop when the records of the tracks are reproduced one after another once from the tracks accessed by the heads 3-1 and 3-2 to the last track. Therefore, in the external trigger mode, reproduction comes to a stop irrespective as to whether the programed reproduction is set or not set. Therefore, with a printer used as an external triggering device, printing is performed only once.

In cases other than the external trigger mode, after reproduction is performed once in the predetermined sequence, reproduction is again performed from the beginning irrespective as to whether the programed reproduction mode is set or not set. Therefore, with the exception of the external trigger mode, the so-called endless reproduction can be performed as the reproduction is thus arranged to be repeated in the predetermined sequence.

While the printer is described by way of example as an external triggering device usable in combination with the embodiment, the external device is not limited to a printer but may be a device having an electrically transmitting function or a device for processing a reproduced signal.

Subroutine (R):

In case that the ID signal is to be set, the flow of operation is performed in the following manner:

In the subroutine (A), when some of the ten-key switches 63 to 72 is turned on, the flow of operation branches off to the subroutine (R) which is as shown in FIG. 19.

Step #R-1: If the PB mode flag is set, the flow branches off to a step #R-10 and comes back to the flow of the subroutine (A). With the exception of the recording mode, therefore, substantially nothing is performed in this subroutine even with any of the ten-key switches turned on. However, if the PB mode flag is not set, i.e., in the event of the recording mode, the flow of operation proceeds to a step #R-2. Step #R-2: A check is made to see if there obtains the ID signal setting mode in which the ID signal is superimposed on the video signal and is monitored. The method for setting that mode will be later described in detail with reference to FIG. 20. If the apparatus is not in that mode, the flow branches off to a step #R-10 and comes back to the step #A-1 of the flow of FIG. 6A. If the apparatus is in that mode, the flow proceeds to a step #R-3. Step #R-3: The CPU 40 reads from the register P of the RAM 27 data indicative of a set position in which the set ID signal is to be displayed on the monitor. Then, the data corresponding to some of the ten-key switches 63 to 72 which have been turned on is written in the address of the RAM 27 corresponding to the set position. The CPU 40 then controls the character generator 84 to have the data displayed on the monitor 13 according to the read set position. Step #R-4: The flow of operation waits until the ten-key switch turns off. When the switch which has been on comes to turn off, the flow proceeds to a step #R-5. Step #R-5: In the ID signal, the setting positions for the data other than the data for year, month and day are 11 points from 0 to 10 as shown in FIG. 21(a). Therefore, if the data of the register P is equal to 11, the flow comes to a step #R-6. If not, it comes to a step #R-7. Step #R-6, the register P is set at 0 and the data setting position is thus initialized. Step #R-7: One is added to the value of the register P. The data setting position is shifted to a next position. Step #R-7-1: The data in the positions stored at the register P blinks. Step #R-8: A check is made to see if the ten-key switches 63–72 are in their ON state. If so, the flow branches off to the step #R-3 and the ID data set by the ten-key switches through the flow as described in the foregoing is displayed on the monitor 13. If not, the flow proceeds to a step #R-9. Step #R-9: A check is made to see if any switch other than the ten-key switches 63 to 72 is in an ON state. If not, the flow comes to the step #R-8. If so, the flow comes to a step #R-11. Step #R-11: The register P in the ID data setting position is set at 0 to initialize the ID data setting position and the flow comes to a step #R-9-1. Step #R-9-1: The ID data display on the monitor stops blinking. The flow comes to a step #R-10. Step #R-10: The flow comes back to the subroutine (A).

As mentioned in the foregoing, in case that the PB mode flag is not set and that the apparatus is in the ID data setting mode, i.e., the mode in which the set ID data can be monitored, the CPU 40 controls the character generator 84, every time some of the ten-key switches 63 to 72 turns on, to have the data corresponding to that switch generated in the position determined by the register P.

Figure 20:
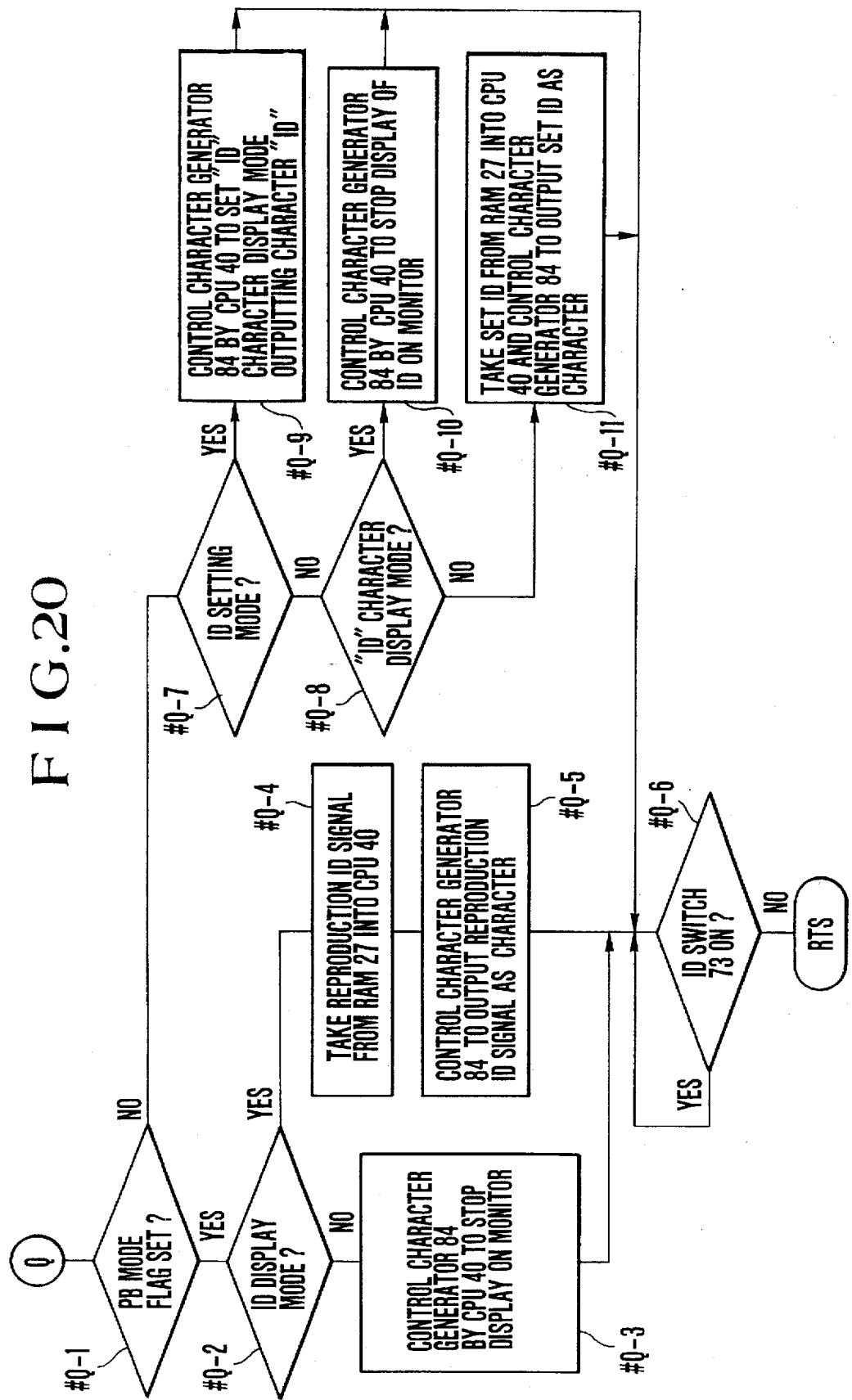

Subroutine (Q):

The ID switch 73 is arranged as follows: When the switch 73 is turned on in the subroutine (A), a subroutine (Q) which is as shown in FIG. 20 is called. In the subroutine (Q): Step #Q-1: a check is made to see if the PB mode flag is set. If so, the flow comes to a step #Q-2. If not, it branches off to a step #Q-7. Step #Q-2: A check is made for an ID display mode, i.e. a mode in which the ID data (or signal) is displayed on the monitor in a state of being superimposed on the video signal. If the apparatus is found to be in the ID display mode, the flow comes to a step #Q-4. If not, it proceeds to a step #Q-3. Step #Q-3: The CPU 40 controls the character generator 84 to bring to a stop the display of the ID data being produced from the generator. The flow then comes to a step #Q-6. Step #Q-4: The CPU 40 takes in the reproduced ID data from the RAM 27. The flow proceeds to a step #Q-5. Step #Q-5: The CPU 40 controls on the basis of the reproduced ID signal the character generator 84 to have the reproduced ID signal data produced from the generator 84 in the form of a character pattern as shown in FIG. 21(a). The flow of operation then proceeds to a step #Q-6. Step #Q-6: The flow waits when the switch 73 is on and proceeds to a next step coming back to the subroutine (A) when the switch 73 turns off. Step #Q-7: In case that the PB mode flag is not set and there obtains the recording mode, a check is made for the ID setting mode, i.e., the mode in which the ID signal is produced from the character generator 84 in the form of a character pattern superimposed on the video signal. If the apparatus is in that mode, the flow comes to a step #Q-9. If not, it proceeds to a step #Q-8. A step #Q-8: A check is made to see if characters "ID" are produced from the character generator 84. If so, the flow comes to a step #Q-10. If not, it comes to a step #Q-11. Step #Q-9: The CPU controls the character generator 84 to stop the ID data from being displayed and to have a two character pattern "ID" generated from the character generator 84 as shown in FIG. 21(b) and to have a mode of displaying the character pattern "ID". The flow then comes to the step #Q-6. In other words, when the ID switch 73 is turned on in the ID setting mode, there is set the character "ID" display mode.

Figure 21C:
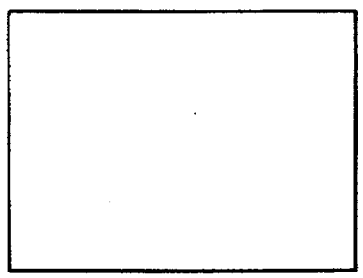

Step #Q-10: The CPU 40 controls the character generator 84 to bring the whole character pattern display to a stop as shown in FIG. 21(c). The flow then comes to the step #Q-6. Step #Q-11: The flow comes to this step when the apparatus is not in the ID setting mode nor in the character "ID" display mode. In other words, there obtains a mode of stopping the ID data from being displayed. Therefore, the CPU 40 takes in the set ID data from the RAM 27. The CPU 40 then controls the character generator 84 to have the set ID data produced from the character generator 84 in the form of a character pattern as shown in FIG. 21(a). In other words, the ID setting mode is obtained by this step. The flow then comes to the step #Q-6.

As described above, the ID data display mode changes every time the ID switch 73 turns on. Namely, in the case of the reproduction mode, the ID display mode in which the reproduced ID data is displayed on the monitor in a state of being superimposed on the video signal and the ID non-displaying mode in which the reproduced ID data is not displayed are alternately obtained every time the ID switch 73 is operated. More specifically stated, the ID display mode of FIG. 21(a) and the ID non-displaying mode of FIG. 21(c) are alternately repeated. In case of the recording mode, the ID data setting mode in which all the ID data to be set are all displayed, the character "ID" display mode in which only the character pattern of "ID" is displayed and another mode in which the ID data is not displayed on the monitor are arranged to obtain repeatedly in rotation every time the ID switch 73 turns on. In other words, the modes as represented by FIGS. 21(a), 21(b) and 21(c) are repeatedly changed from one over to another. The arrangement for displaying the ID data in the recording mode is further described as follows: When the video signal is recorded in the mode which is shown in FIG. 21(a) or 21(b), the ID data signal which is modulated into a DPSK signal and is recorded in a state of being superimposed on the video signal at the step #N-5 or #N-6 as shown in FIG. 12. Further, when the video signal is recorded in the mode of FIG. 21(c), the ID data is not recorded. However, the data which indicates that the video signal is on the inner side or outer side of frame recording or recorded in the field recording mode is always recorded along with the video signal.

In short, this specific embodiment is arranged to permit change-over of the ID data display on the monitor 13 by selecting the number of times for which the ID switch is pushed irrespective as to whether the apparatus is in the recording mode or in the reproduction mode.

In recording the ID signal along with the video signal, this embodiment has, as described in the foregoing, tow different modes of displaying the ID data. One is the ID data setting mode in which a display is made as shown in FIG. 21(a) and the other the character "ID" display mode in which a display is made as shown in FIG. 21(b). The reason for this is as follows: It is possible to set a date including the year, month and day or 11 digits as the ID signal data. However, as shown in FIG. 21(a), it takes a considerably large area on the picture plane of the monitor 13 to completely display the whole ID data. The complete display of the ID data thus might prevent adequate observation of the image display on the monitor. However, this problem can be solved by selecting the other display mode available as shown in FIG. 21(b).

In the reproduction mode, with the mode shown in FIG. 21(a) or 21(b) having been set by the ID switch 73 in the recording mode, the ID signal data recorded along with the video signal is arranged to bin the feed in the following manner: When the head is shifted to a new track in the reproduction mode, the ID signal data recorded in the track is reproduced on the monitor 13. More specifically, after demodulation by the data demodulator 12 of FIG. 1, the reproduced ID data is read out by the CPU 40. The CPU 40 then drives the character generator 84 to have the ID data displayed on the monitor 13. In this instance, the ID data read by the CPU 40 is retained at the RAM 27. The method of displaying this ID data is as described in the foregoing with reference to FIG. 21(a). In the case of this embodiment, the character data retained at the RAM 27 can be displayed in the following two different modes I) and II):

I) A display of the set ID data when it is reproduced including only a date consisting of the year, month and day. This is called a first display mode.

II) A display of the set ID data when it is reproduced including some numerical data in addition to data of a date. This is called a second display mode.

Figure 22A:
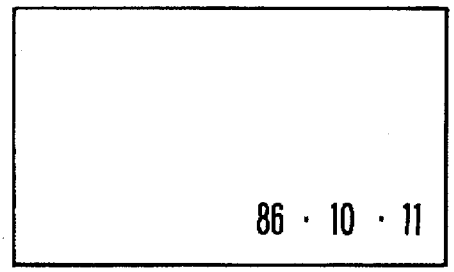
Figure 22B:
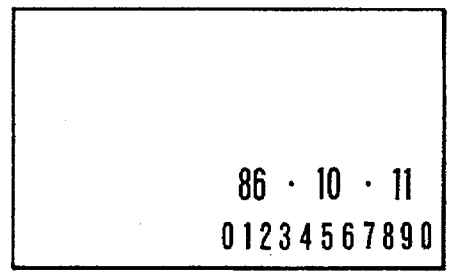

The first ID data display mode is as shown in FIG. 22(a) while the second mode is as shown in FIG. 22(b). As shown, in the first mode, only the date is displayed in the lower right-hand side corner on the monitor. In the second mode, the date and the numerical data are displayed together at the lower right-hand corner. Since the display is made always in the lower right-hand corner of the picture plane of the monitor, the possibility of hindering the display of the video signal can be minimized. The arrangement to have the display made in the lower right corner may be changed to have it in any other corner of the picture plane.

To perform the display action, the output signal of the data demodulator 12 of FIG. 1 is read out by the CPU 40 and, after that, a character is generated after confirming that no data other than the data of date is set. The CPU 40 is arranged to have the character generated in different positions for the first and second modes as described in Para. I) and II) above.

In case where some data other than the data of date is found not to have been recorded by this apparatus, the data is displayed also in the manner as shown in FIG. 22(b). Such data is distinguishable with a known check code recorded as the ID data.

Subroutine (S):

In case that a date is to be set as the ID data, the embodiment operates as follows: When the year setting switch 74 is turned on in the subroutine (A), the flow of operation jumps to a subroutine (S) shown in FIG. 23.

Step #S-1: If the PB mode flag is set, the flow comes to a step #S-14 to return to the flow of the subroutine (A). If not, it proceeds to a step #S-2. Step #S-2: A check is made to see if there obtains the mode of having the ID data superimposed on the video signal and produced either to the monitor or the printer. If not, the flow comes to the step #S-14 to come back to the subroutine (A). If there obtains that mode, it proceeds to a step #S-3. Step #S-3: The place of the tenth digit in the year setting position on the monitor 13 blinks. This means that a character in the position of a reference numeral (1) in FIG. 24 blinks. In that instance, the CPU 40 controls the character generator 84 to have the character of this position either generated or not generated. This is accomplished by a well known interrupt method. Following this, the flow comes to a step #S-4. #S-4: The flow waits until the switch 74 is turned off. With the switch 74 turned off, the flow comes to a step #S-5. Step #S-5: A check is made to see if some of the ten-key switches 63 to 72 is turned on. If so, the flow proceeds to a step #S-6. If not, it comes to a step #S-12. Step #S-6: The CPU 40 writes input data obtained by the ten-key switch into the RAM 27. The CPU 40 controls the character generator 84 to have a character pattern generated in the year setting position indicated by the reference numeral (1) in FIG. 24. The flow then proceeds to a step #S-7. Step #S-7: The unit digit which is in the year setting position is caused to blink. This means that a character in a position (2) shown in FIG. 24 blinks. This blinking action is performed with the character generator 84 controlled by the CPU 40. Step #S-8: The flow of operation waits until the ten-key switch is turned off. With the ten-key switch turned off, the flow proceeds to a step #S-9. Step #S-9: A check is made to see if any of the ten-key switches is in its ON state. If so, the flow proceeds to a step #S-10. If not, it comes to a step #S-13. Step #S-10: With the ten-key switch turned on, the CPU 40 writes data received from the ten-key switch into the RAM 27. The CPU 40 then controls the character generator 84 to have a character pattern generated in the position (2) of FIG. 24 which is the unit digit in the year setting part. The flow then proceeds to a step #S-11. Step #S-11: The character in the year setting part is stopped from blinking with the character generator 84 controlled by the CPU 40. This informs the operator of the end of the year setting action. The flow then comes to a step #S-14. Step #S-12: If none of the ten-key switches are found in their ON states at the step #S-5, a check is made for any switch other than the ten-key switches that is in its ON state. If no switch is found on, the flow branches off to the step #S-5 to repeat the steps #S-5 and #S-12. If any of other switches is found on, the flow comes to the step #S-11. Step #S-13: A check is made for the ON state of any switch other than the ten-key switches. If no switch is found on, the flow branches off to the step #S-9. If any switch is found on, the flow comes to the step #S-11. Thus, the steps #S-9 and #S-13 are repeated until some switch other than the ten-key switches comes to turn on. Meanwhile, the character in the year setting part continues to blink to urge the operator to finish his or her year setting action being performed with the ten-key switches. Step #S-14: In case that the PB mode flag is set and if the embodiment is in the ID data setting mode, the flow of operation comes back to the subroutine (A) from this step when the blinking of the character is brought to a stop by the step #S-11.

Figure 25:
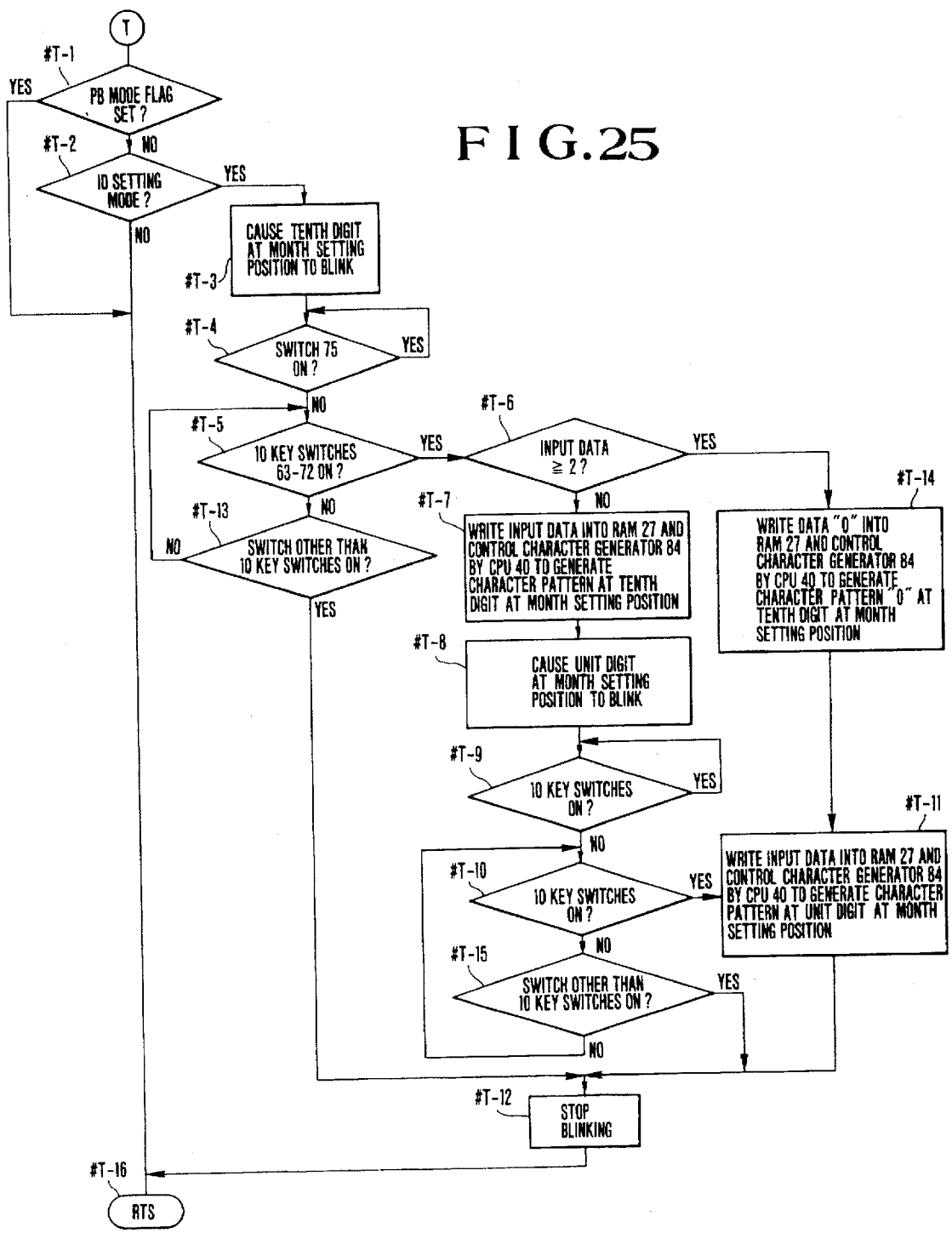

As mentioned in the foregoing, with the year setting switch 74 turned on, the place of the tenth digit in the year setting position first begins to blink to inform the operator of a data setting position. Then, a figure is obtained from the ten-key switch arrangement. By this, the character generator 84 is caused to generate this input data in the form of a character pattern in the blinking position. Meanwhile, the CPU 40 keeps this input data at the RAM 27. Upon completion of setting the tenth digit, the place of the unit digit in the year setting position begins to blink and then the applicable data is likewise set in this position. The year setting mode comes to an end upon completion of the unit digit setting action. The flow of operation then comes back to the subroutine (A). However, this flow may be changed to come under that condition to a subroutine (T) to enter a month setting mode as follows:

Subroutine (T):

Referring to FIG. 25, the details of the month data setting operation are as follows: When the switch 75 is turned on in the flow of the subroutine (A), the subroutine (T) is called and there obtains the month data setting mode.

Figure 24:
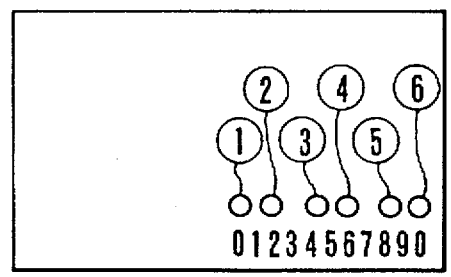
Figure 23:
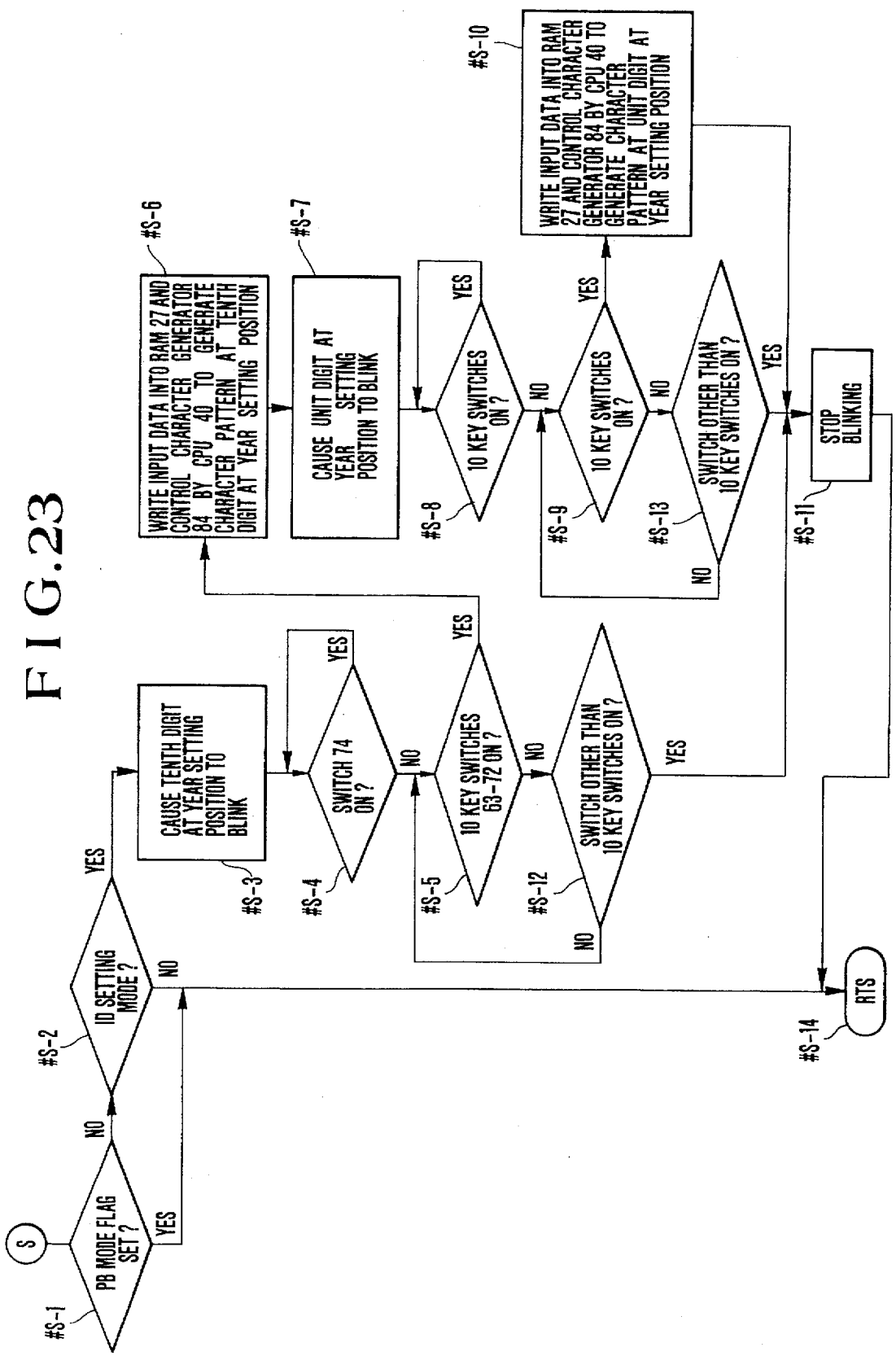

Step #T-1: If the PB mode flag is set, the flow of operation comes to a step #T-16 and comes back to the subroutine (A). If not, the flow proceeds to a step #T-2. Step #T-2: A check is made for the ID setting mode of producing the ID data to the monitor or the printer in the state of being superimposed on the video signal. If the apparatus is not in this mode, the flow comes to the step #T-16 for coming back to the subroutine (A). If the apparatus is in this mode, the flow proceeds to a step #T-3. Step #T-3: The place of the tenth digit in a month setting position on the monitor is caused to blink. This means that the character in a position (3) as shown in FIG. 24 blinks. This blinking action is brought about by the control of the CPU 40 over the character generator 84 alternately allowing and not allowing the generation of the applicable character. The flow then proceeds to a step #T-4. Step #T-4: The flow waits until the month setting switch 75 is turned off. When the switch 75 is turned off, the flow proceeds to a step #T-5.

Step #T-5: A check is made to see if some of the ten-key switches is in an ON state. If so, the flow proceeds to a step #T-6. It not, it shifts to a step #T-13. Step #T-6: A check is made to see if data at "2" or more than "2" has been supplied by means of the ten-key switches. If so, the flow shifts to a step #T-14. If not, it proceeds to a step #T-7. The flow is arranged to branch out at this step for the purpose of accepting any unit digit only when the initial input figure is "1" or "0" in the case of the month setting mode.

Step #T-7: The CPU 40 writes the input data into the RAM 27 and, at the same time, controls the character generator 84 to have a character pattern generated in a position (3) of FIG. 24, i.e. in the position blinked at the step #T-3. The flow then proceeds to a step #T-8. Step #T-8: The place of a unit digit in the month setting position is blinked. This means that a character in a position (4) of FIG. 24 is caused to blink. The flow then proceeds to a step #T-9. Step #T-9: The flow waits until the ten-key switch turns off. When the ten-key switch turns off, the flow proceeds to a step #T-10. Step #T-10: A check is made to see if some of the ten-key switches is on. If so, the flow proceeds to a step #T-11. If not, it comes to a step #T-15. Step #T-11: The CPU 40 writes into the RAM 27 the data received from the ten-key switches at the step #T-5 or #T-10. The CPU 40 then controls the character generator 84 to have a character generated in a position (4) of FIG. 24 which is the place of the unit digit in the month setting position. The flow then proceeds to a step #T-12. Further, in case that the flow branches from a step #T-14 to this step, the data received from the ten-key switch at the step #T-5 is displayed in the place of the unit digit while "0" is displayed in the place of the tenth digit when the steps #T-14 and #T-11 are executed. Step #T-12: The data in the month setting position is stopped from blinking to indicate the end of the month setting process. The flow then comes to a step #T-16. Step #T-13: The flow branches off to this step when none of the ten-key switches are found in their ON states at the step #T-5. A check is made to see if any switch other than the ten-key switches is on. If not, the flow of operation comes to the step #T-12. In other words, the steps #T-5 and #T-13 are repeated until the ten-key switch or some other switch turns on. The flow branches off to the step #T-6 when the ten-key switch turns on or to the step #T-12 when some other switch turns on.

Step #T-14: The flow comes to this step when the input data is found to be at least "2" at the step #T-6. The CPU 40 writes data of "0" into the RAM 27 and controls the character generator 84 to have a character pattern of "0" generated in the place of the tenth digit in the month setting position. Step #T-15: A check is made to see if any switch other than the ten-key switches is on. If not, the flow comes to the step #T-10. If so, it comes to the step #T-12. Step #T-16: The flow comes back to the subroutine (A).

As mentioned in the foregoing, the place of the tenth digit in the month setting position first blinks when the switch 75 turns on. This indicates the position in which the data coming from the ten-key switch is to be set. If the data is "2" or more than "2", "0" is automatically set in the place of the tenth digit while the data received is set in the place of the unit digit. In case that the data received does not exceed "1", the data is of course set in the place of the tenth digit. Then, the blinking position shifts to the place of the unit digit. After that, data received next is of course set in the place of the unit digit. Therefore, in accordance with the arrangement of this embodiment, no value exceeding "2" is set in the place of tenth digit in the month setting process. This simplifies the month setting process.

At the step #T-3, only the place of the tenth digit is caused to blink. This arrangement, however, may be changed to blink both the places of the tenth and unit digits. Further, in the case of this embodiment, the flow is arranged to come back to the subroutine (A) upon completion of the process of setting data in the place of the unit digit. However, this arrangement may be changed to have the flow of operation proceed directly to a subroutine (U) for a day setting process as shown in FIG. 26 without coming back to the subroutine (A).

Figure 26:
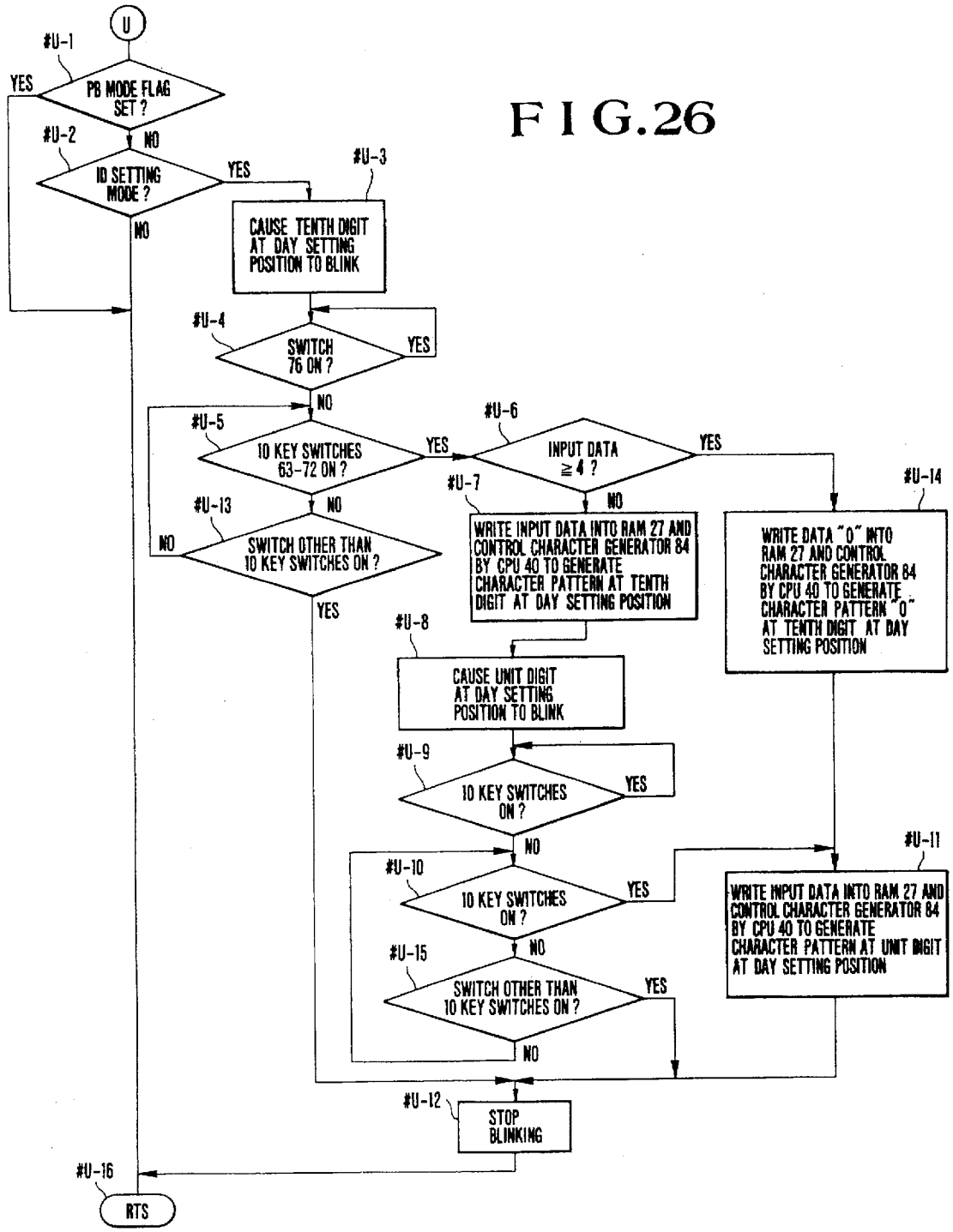

Subroutine (U):

Referring to FIG. 26, the details of the process of setting the data of day are as follows: In the flow of the subroutine (A), when the switch 76 is turned on, a day data setting mode is called. The flow then jumps to the subroutine (U). In the subroutine (U):

Step #U-1: If the PB mode flag is set, the flow jumps to a step #U-16 to come back to the subroutine (A). If not, it proceeds to a step #U-2. Step #U-2: A check is made to see if there obtains the ID data setting mode, i.e. the mode in which the ID data is produced at the monitor or the printer in a state of being superimposed on the video signal. If not, the flow comes to the step #U-16 to come back to the subroutine (A). In the case of this mode, the flow proceeds to a step #U-3. Step #U-3: The place of a tenth digit in a day setting position on the monitor is blinked. In other words, a character in a position (5) as shown in FIG. 24 blinks. The blinking action is accomplished by the control of the CPU 40 over the character generator 84 allowing and not allowing it to generate the character. The flow then proceeds to a step #U-4. Step #U-4: The flow of operation waits until the day setting switch 76 turns off. When the switch 76 turns off, the flow proceeds to a step #U-5. Step #U-5: A check is made to see if any of the ten-key switches 63 to 72 is in its ON state. If so, the flow proceeds to a step #U-6. If not, it comes to a step #U-13. Step #U-6: A check is made to see if an input data from the ten-key switch is "4" or more than "4". If so, the flow comes to a step #U-14. If not, it proceeds to a step #U-7. In other words, in setting the day, the flow is arranged to branch out according to the figure set at this step for the purpose of accepting a figure for the place of the unit digit only when the initially received figure is "3", "2", "1" or "0".

Step #U-7: The CPU 40 writes the input data into the RAM 27 and controls the character generator 84 to have a character pattern generated in the position (5) of FIG. 24, i.e., in the place blinked at the step #U-3. The flow proceeds to a step #U-8. Step #U-8: The place of the unit digit in the day setting position is blinked. In other words, a character in a position (6) of FIG. 24 blinks. The flow then proceeds to a step #U-9. Step #U-9: The flow waits until the ten-key switch is turned off. When the ten-key switch turns off, the flow proceeds to a step #U-10. Step #U-10: A check is made to see if the ten-key switch is on. If so, the flow proceeds to a step #U-11. If not, it comes to a step #U-15. Step #U-11: The CPU 40 writes data received from the ten-key switch at the step #U-10 into the RAM 27 and controls the character generator 84 to have a character pattern generated in the position (6) of FIG. 24. The flow then proceeds to a step #U-12. Further, in case that the flow has branched off from the step #U-14 to this step, the input data received from the ten-key switch at the step #U-5 is displayed in the place of the unit digit while "0" is displayed in the place of the tenth digit.

Step #U-12: The data in the day setting position stops blinking and thus indicates the end of the day setting process. The flow then comes to the step #U-16.

Step #U-13: The flow comes to this step from the step #U-5 when none of the ten-key switches are found not in their ON states at the step #U-5. At this step #U-13, a check is made to see if any switch other than the ten-key switch is in an ON state. If not, the flow comes to the step #U-5. If so, it comes to the step #U-12. In other words, the steps #U-5 and #U-13 are repeated until either the ten-key switch or some other switch comes to turn on. The flow comes to the step #U-6 when some of the ten-key switches turns on or comes to the step #U-12 when some other switch turns on. Step #U-14: The flow comes to this step from the step #U-6 when the input data is found at the step #U-6 to be "4" or greater than "4". Here, the CPU 40 writes "0" into the RAM 27 and controls the character generator 84 to have a character pattern of "0" generated in the place of the tenth digit in the day setting position. The flow comes to the step #U-11. Step #U-15: A check is made to see if any switch other than the ten-key switches is in an ON state. If not, the flow comes to the step #U-10. If so, it comes to the step #U-12. Step #U-16: The flow comes back to the subroutine (A).

As described above, the place of the tenth digit in the day setting position first blinks when the switch 76 is turned on. This indicates the place in which the data coming from the ten-key switch is to be set. If the input data is "4" or greater than "4", "0" is automatically set in the place of the tenth digit and then the input data is set in the place of the unit digit. In the event of input data not exceeding "3", the input data is of course set in the place of the tenth digit and then the blinking position shifts to the place of the unit digit to have next data from the ten-key switch set in the place of the unit digit. The embodiment thus prevents "4" or any value exceeding "4" from being set in the place of the tenth digit in setting the data of day. This arrangement simplifies the day setting process.

While the step #U-3 is arranged to have the place of the tenth digit alone blinked, that step may be changed to have both the places of tenth and unit digits blinked. Further, the blinking arrangement of this embodiment may be replaced with some other setting position indicating method. For example, it may be replaced with a method of changing the luminance or color of the setting place.

Erase Program:

An erasing sequence is as follows: In erasing, the erasing switch 78 and the erasion standby switch 77 are operated. The apparatus is first set into an erasion standby mode by means of the switch 77. Then, the other switch 78 is turned on in carrying out erasion. The erasing process includes a mode in which records in a plurality of tracks are continuously erased and another mode in which the record in a single track is alone erased.

Figure 27:
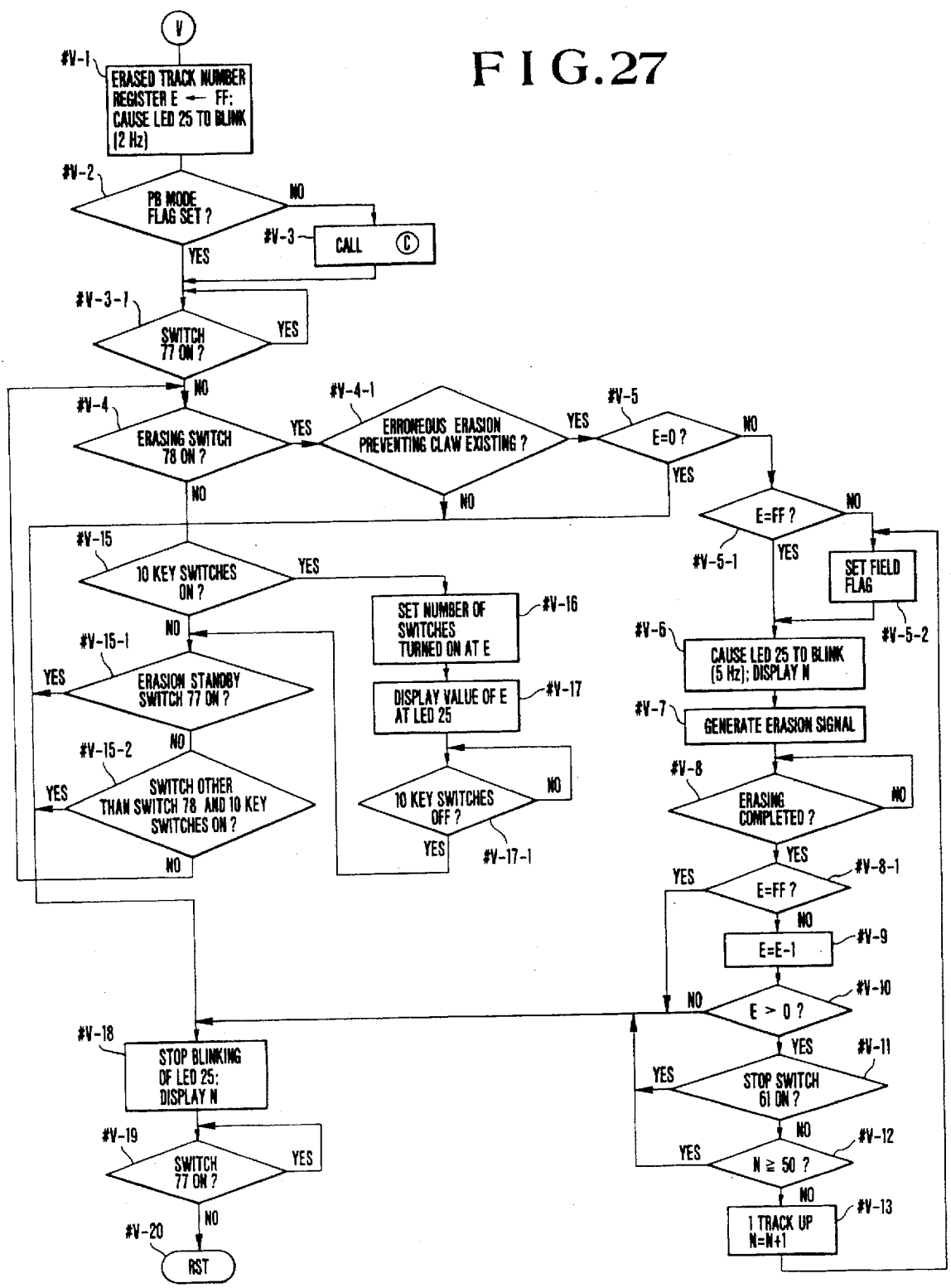

Subroutine (V):

Referring to FIG. 27 which shows a subroutine (V), the details of the above stated erasing operation are as follows: When the switch 77 is turned on in the flow chart of FIG. 6B, the flow of operation calls the subroutine (V) and comes to a step #V-1. At the step #V-1, the apparatus is set in a standby state for erasion. Then, "FF" is set at a buffer memory E which is arranged to store the number of the track to be erased. At the seven-segment LED 25 which is arranged to display a track number in two places displays a number assigned to a track to which the head 3-1 has access in a blinking manner, repeatedly and alternately being lighted up and extinguished in a cycle of about 2 Hz. This enables the operator to know that the apparatus is in the standby mode for erasion.

Unlike the method of using a display element specially for displaying the erasion standby mode, the method of this embodiment not only dispenses with the special display element but also more clearly shows the applicable track number as the track number display device is arranged to show the track number in a different manner in this instance. Further, in this specific embodiment, the erasion standby mode is displayed by blinking the displaying state of the seven-segment LED 25. However, it goes without saying this display element may be replaced with some other display element such as a liquid crystal element. The blinking arrangement also may be replaced with some different arrangement of, for example, changing the color or luminance of the display or changing the shape of the displayed character.

In cases where some display device for displaying information about something other than the track number, such as a number of vacant tracks is provided instead of the track number display device, the above stated erasion standby mode may be displayed by changing the display state of that display device.

After the step #V-1, the flow of operation proceeds to a step #V-2. Step #V-2: A check is made to see if the PB (reproduction) mode flag is set. If so, the flow comes to a step #V-3-1. If not, it proceeds to a step #V-3. Step #V-3: The subroutine (C) which is provided for setting the reproduction mode as mentioned in the foregoing is called. The apparatus is shifted to the reproduction mode. The flow of operation then proceeds to the step #V-4 via the step #V-3-1. Therefore, with the erasion standby switch 77 turned on, there always obtains the reproduction mode and the apparatus is brought into the erasion standby state through the execution of the steps #V-2 and #V-3. Step #V-3-1: After confirmation of the switch 77 being turned off, the flow proceeds to the step #V-4. Step #V-4: A check is made to see if the erasion performing switch 78 is in its ON state. If so, the flow proceeds to a step #V-4-1. If not, it comes to a step #V-15. Step #V-4-1: The branching off destination of the flow is determined at this step by checking with a claw checking switch the casing of the magnetic sheet (not shown) for the presence or absence of a claw initially provided on the casing. This claw is arranged to prevent erroneous erasion. When the claw is broken off, it is impossible to make erasion. Therefore, if the the casing (or jacket) is thus arranged to prevent erroneous erasion, the flow comes to a step #V-18. If not, it proceeds to a step #V-5. Step #V-5: A check is made to see whether the value set at the buffer memory E which is arranged to store an erasing track number is "0" or not. The buffer memory E has been set at "FF" in the step #V-1. However, the set value of the buffer memory is changeable at a step #V-15 as will be described later. At the step #V-5, if the value set at the buffer memory E is found to be "0", the flow comes to the step #V-18. If not, the flow proceeds to a step #V-5-1.

Step #V-5-1: A check is made to see if the value set at the buffer memory E is "FF". If so, the flow proceeds to a step #V-6. If not, it comes to a step #V-5-2. Step #V-5-2: The field reproduction mode is set by setting the field flag. The flow then comes to the step #V-6. Step #V-6: The blinking state of the seven segment LED 25 which is arranged to make a track number display is shifted from the cycle of 2 Hz to a quicker cycle of 5 Hz. In the event of continuous track erasion, the seven-segment LED 25 displays a set number of tracks in place of the number of a track being accessed by the head 3-1 at the step #V-17. Even in that instance, however, the display by the seven-segment LED 25 is automatically changed to the track number display with the step #V-6 executed. Therefore, this step enables the operator to confirm each of the tracks when it is erased during the continuous track erasing process.

Step #V-7: The CPU 40 controls the erase signal generator 85 to cause it to generate an erasion signal. An erasing action is performed in response to this signal. Further, in carrying out the erasing action, at least one of the heads 3-1 and 3-2 is connected to the recording amplifier by controlling the switches SW2 and SW3 of FIG. 1. In this instance, if the field flag is set, i.e., in the case of the field reproduction mode, an erasing current flows only to the head 3-1 to have one track portion of the record erased thereby. However, if the field flag has been cleared to select the frame reproduction mode, erasing currents simultaneously flow to both the heads 3-1 and 3-2 to have one frame portion of the record, i.e., the record in two adjacent tracks erased. Further, in the specific embodiment, the erasing action is performed in the frame mode only when the flow of operation comes from the step #V-5-1 directly to the step #V-6 without coming via the step #V-5-2. In other words, it is only in case that the value of the buffer memory E is found at the step #V-5-1 to be at "FF", that is, in the event of non-selection of the continuous erasion mode. Step #V-8: The flow of operation waits until completion of the erasing action. Upon completion of the erasing action, the flow proceeds to a step #V8-1. Step #V-8-1: A check is made to see if the value set at the buffer memory E is equal to "FF". If so, it indicates a single erasion mode and the flow comes to the step #V-18. If not, it indicates the continuous erasion mode and the flow proceeds to a step #V-9. Step #V-9: One is subtracted from the value set at the buffer memory E. The flow proceed to a step #V-10. Step #V-10: A check is made to see if the value of the buffer memory E is larger than "0". In other words, with the continuous track erasion mode selected, the number of tracks to be erased is detected. If this number is larger than "0", the flow proceeds to #V-11. If not, the flow comes to the step #V-18 on the assumption that the continuous track erasing action has come to an end. Step #V-11: A check is made to see if the stop switch 61 is in an ON state. If so, the flow branches off to the step #V-18. If not, it proceeds to a step #V-12. In other words, in case that the continuous erasion mode is selected and being carried out, the continuous erasing action can be suspended by operating the stop switch 61.

Step #V-12: A check is made to see if the value N stored at the buffer memory is above 50. In other words, a check is made to see if the track being accessed by the head 3-1 is the last track. If so, the flow comes to the step #V-18 to bring the erasing action to an end. If not, the flow proceeds to a step #V-13.

Step #V-13: With this step executed, the track accessing positions of the heads 3-1 and 3-2 are shifted inward to an extent corresponding to one track respectively. At the same time, the track number memory is set at a value N+1. The flow then proceeds to a step #V-5-2. Therefore, in the event of the continuous track erasion mode, the steps #V-5-2 to #V-13 are repeated until either the stop switch 61 is turned on or the record of the innermost track is erased and until the value of the buffer memory E becomes zero, i.e., until the record in the set number of tracks are completely erased.

The step #V-15 and ensuing steps relate to the flow of operation for setting the continuous erasion mode to be carried out as described above.

Step #V-15: A check is made to see if any of the ten-key switches 63 to 72 shown in FIG. 1 is in its ON state. If so, the flow proceeds to a step #V-16. If not, it comes to a step #V-15-1. Step #V-16: The apparatus is brought into the continuous track erasion mode. More specifically, a number supplied from some of the ten-key switches 63 to 72 becomes the number of tracks to be subjected to a continuous erasing action. At the erasing track number buffer memory E, the value of the switch turned on among the ten-key switches is set in the place of the unit digit. Following that, the flow of operation proceeds to a step #V-17. Step #V-17: The value of the buffer memory E is displayed at the seven-segment LED 25 in a manner as shown in FIGS. 28(a) to 28(c). At the step #V-15, the value of one of the ten key switches which is first turned on is set in the place of the unit digit at the step #V-16. Then, at the step #V-17, this value is displayed in the place of the unit digit at the LED 25 as shown in FIG. 28(a). Before the display of FIG. 22(a) is obtained, the track number is displayed at the display device in a blinking manner. Further, the value F set at the buffer memory E is displayed as "0" The blinking display of the step #V-1 is continuously repeated. Therefore, the display "01" which is as shown in FIG. 28(a) also blinks. The flow then proceeds to a step #V-17-1. Step #V-17-1: The flow waits until the ten-key switches turn off. After that, the flow comes to a step #V-15-1. Step #V-15-1: A check is made to see if the erasion standby switch 77 is in an ON state. If so, the flow comes to a step #V-18. If not, if proceeds to a step #V-15-2.

In other words, the erasion standby mode set by turning on the erasion standby switch 77 at the step #V-1 is automatically cancelled by the step #V-18 and ensuing steps after the standby switch 77 is again turned on. This arrangement obviates the necessity of an additional switch otherwise required specially for cancellation of this mode.

Step #V-15-2: A check is made to see if any switch other than the switch 78 and the ten-key switches is in an ON state. If so, the flow branches off to the step #V-18. If not, it branches off to the step #V-4. In other words, the erasion standby mode can be automatically cancelled through the step #V-18 and the steps ensuing it even with a switch other than the ten-key switches turned on. Therefore, the embodiment requires no special switch for cancelling the standby mode. The steps preceding the step #V-4 are repeated when the results of the checks made at the steps #V-15-1 and #V-15-2 are negative. However, if the LED 25 is already displaying "01" as shown in FIG. 28(a), the steps subsequent to the step #V-4 is executed as follows:

When some of the ten-key switches is turned on at the step #V-15, a value supplied from this switch at the next step #V-16 is set in the place of the unit digit at the buffer memory E. Then, a value which is previously set in that place shifts to the place of the tenth digit at the buffer memory E. A value which has been in the place of the tenth digit then disappears.

Assuming that the key switch of "5" is turned on among the ten-key switches, the steps #V-16 and #V-17 are executed to make a display at the seven-segment LED 25 in a manner as shown in FIG. 28(b). In this instance, the value set at the buffer memory E is of course 15. Following this, when "2" is supplied from one of the ten-key switches, the display is made as shown in FIG. 28(c). In the above stated example of display, the LED 25 is caused to make a display with the key switches of "1", "5" and "2" operated one after another among the ten-key switches under the condition of the erasion standby mode. The value displayed coincides with a value set at the buffer memory E. value officially, when a value of "2" or greater than "2" is set by one of the ten-key switches, this setting action is equal to selection of the continuous erasing mode. The set value represents the number of tracks to be subjected to a continuous erasing action. As described in the foregoing, when the value of the buffer memory E is found to be greater than "0" at the step #V-10, the flow of operation proceeds to the step #V-11. If not, the flow branches off to the step #V-18. If the track number N is less than 50, the track number N is increased at the step #V-13 and the flow of operation branches off from the step #V-13 to the step #V-5-2. Then, the step #V-6 and ensuing steps are executed for the continuous erasing action. In other words, if the stop switch 61 is found to be not in an ON state at the step #V-11, the erasing action continues either until the value set at the buffer memory E becomes zero or until it is performed on the 50th track which is the innermost track. After completion of the above stated steps, further steps #V-18 to #V-20 are executed in the following manner:

Step #V-18: The seven-segment LED 25 is stopped from blinking. The track number N is displayed on the display device. The flow then proceeds to a step #V-19. In short, the erasion standby mode is cancelled at the step #V-18. Step #V-19: If the switch 77 is in its ON state, the flow waits. If not, it proceeds to a step #V-20. Step #V-20: The flow comes back to the subroutine (A) which is as shown in FIGS. 6A and 6B.

In carrying out erasion, this embodiment has different modes as mentioned in the foregoing. In one mode, erasion is performed only once. In another, erasion is continuously performed. The latter include a mode in which continuous erasion is performed after designation of the number of tracks to be subjected to the continuous erasing action. In cases where the erasing track number is not set by the ten-key switches, the flow of operation shifts from the step #V-5-1 directly to the step #V-6 without coming through the step #V-5-2 as the buffer memory E is in that instance set at "FF". Therefore, if the field flag is in a cleared state in the erasion standby mode, a two-track portion of the record is erased in a frame mode. If the field flag is set, a one-track portion of the record is erased in the field mode. Thus, in the case of reproduction in the frame mode, a two-track portion of the record being reproduced is erased. In the case of reproduction in the field mode, a one-track portion of the record being reproduced is erased. However, if an erasing track number is set by the ten-key switches, the erasing action is performed always in the field mode, because the flow of operation in that instance proceeds via the step #V-5-2. In the event that "0" is set by the ten-key switches, however, the erasing action is not performed as the flow of operation at the step #V-5 branches off to the step #V-18. Further, if the value set by the ten-key switches is "1" in the frame reproduction mode, only the record in a track on the outer circumferential side of two tracks forming one frame is erased, because the flow of operation finds the field flag in a set state at the step #V-5-2 in this instance.

Generally, an additional video signal or the like is newly recorded often in erased tracks in the case of continuous track erasion. In the case of the embodiment described, the head 3-1 is located on a last erased track when the continuous track erasion comes to an end. Therefore, in the event of recording new information in the erased tracks, the operator is required to operate the track UP and track DOWN switches 54 and 55 to bring the head 3-1 to a track with which the erasing action began. To solve this problem, another flow of operation is arranged as shown in FIG. 29 to automatically cause the head 3-1 to have access to a track from which a continuous track erasing action has begun after completion of the continuous track erasing action. This arrangement greatly enhances the operability of the apparatus. The flow shown in FIG. 29 is arranged to be inserted between the steps #V-18 and #V-19 of FIG. 27.

In executing the subroutine (V), the track number N of a track then accessed is stored at a memory N' at the step #V-1. After that, when the flow of operation comes to the step #V-18 with erasion accomplished through the steps described, the flow of operation shown in FIG. 29 is executed. More specifically, at the step #V-18-1, the number assigned to a track accessed by the head 3-1 is checked for its coincidence with the track number stored in the memory N at the step #V-1. If not, steps #V-18-2 and #V-18-3 are executed to cause the head 3-1 to have access to a next track on the outer circumferential side of the accessed track. At the same time, the memory N' is set at N−1 and the seven-segment LED 25 is caused to display the track number N. The flow then comes back to the step #V-18-1. The steps #V-18-2 and #V-18-3 are thus repeated until the number assigned to the accessed track comes to coincide with the track number stored at the memory N'. When the head 3-1 has access to the erasion starting track, the flow of operation comes from the #V-18-1 to a step #V-19. Then, the step #V-19 and steps following it are executed. Therefore, the flow of operation as shown in FIG. 29 causes the head 3-1 to be automatically brought to the erasion start track upon completion of the erasing action. This obviates the necessity of a manual search for a track at which an erasing action has started before commencement of a next recording action.

Further, it is highly advantageous and effective in preventing any erroneous erasing action to enable the operator to confirm erasing images by reproducing their records for a given period of time and to confirm the operability of the stop switch 61 prior to a continuous erasing action. To realize this function, a step of having a delay time of one sec or thereabout inserted in the subroutine (V) of FIG. 27 after execution of the process of "1 track UP, N=N+1" at the step #V-13 and before execution of the step #V-7 or preferably immediately after the step #V-6. Further, for this purpose, another step may be arranged to be executed during that delay time to make a check to see if the stop switch 61 is in an ON state and, if not, to have the flow proceeds to the step #V-7 or, if so, to have the flow branch off to the step #V-18. The provision of such additional steps enables the operator to confirm the video signal to be erased. Therefore, when any image that is not desired to be erased is reproduced, the continuous reproduction can be suspended by turning the stop switch 61 on. The probability of erroneous erasion thus can be reduced to a minimal rate.

Further, in the case of continuous erasion, the embodiment is arranged to have track portions of the record erased one by one all in the field mode by executing the step #V-5-2 with the flow shifting from the step #V-5-1 to the step #V-5-2 in the subroutine (V). However, for shortening the length of time required for continuous erasion, erasing currents may be allowed to flow simultaneously to the two heads in the frame mode in such a way as to have the erasing action simultaneously performed on two tracks at least once. An example of this arrangement is as described below:

A flow of operation shown in FIG. 30(a) includes the steps to be inserted in between the steps #V-6 and #V-7 of FIG. 27. Another flow shown in FIG. 30(b) includes the steps to be inserted in between the steps #V-11 and #V-12 of FIG. 27. The details of these flows of operation:

After the subroutine (V) of FIG. 27 is executed up to the step #V-6, a step #V-6-1 is executed. At this step, a check is made to see if the erasing track buffer memory E is at a value "2" or greater than that thus indicating the continuous track erasion mode. If so, the flow proceeds to a step #V-6-2. If not, the flow comes to the step #V-7. At the step #V-6-2: The buffer memory E is set at E-1 and the field flag is cleared. The flow comes to the step #V-7. At the step #V-7 (shown in FIG. 27), an erasion signal is generated. In this instance, if the field flag is set, the erasion signal is supplied to one of the heads 3-1 and 3-2 which is used for field reproduction. If the field flag is cleared, the erasion signal is simultaneously supplied to both the heads 3-1 and 3-2. Upon completion of erasion, the steps #V-8 to #V-11 are executed as mentioned in the foregoing. If the continuous erasing action has not been completed, the flow comes from the step #V-11 to a step #V-11-1. At the step #V-11-1, a check is made to see if the field flag is set. If the field flag is set while the continuous track erasion mode is not set, the flow proceeds to the step #V-12 and the flow proceeds in the same manner as stated in the foregoing. Further, in case that the continuous track erasing mode has been set while the field flag is not set at the step #V-11-1, the flow comes to a set #V-11-2 and the memory N is set at N+1 as the erasing action has been performed on a two-track portion of the record at the step #V-7 as mentioned in the foregoing. Then, the heads 3-1 and 3-2 are shifted inward to an extent corresponding to one track width. Following this, the flow comes to the step #V-13. The heads are shifted further inward to the extent of one track width through the steps up to the step #V-13.

With the embodiment arranged as described above, in the case of continuous erasion, the erasing action is performed in the frame mode until the remaining number of continuously erasing tracks becomes one. This arrangement increases the continuous erasing speed. In confirming the erasing record of images prior to erasion in this instance, if the field flag is set after the step #V-6, it is necessary to do field reproduction for a given period of time with each of the heads 3-1 and 3-2 of FIG. 1. Further, in carrying out continuous erasion, selection between a mode in which the erasing images can be confirmed in a reproduced state and another mode in which such confirmation is not allowed may be made possible by omitting the steps #V-2 and #V-3 and by effecting switch-over between the PB mode and the recording mode, because: In case that the non-confirming mode is selected in performing a continuous erasing action with the steps shown in FIGS. 30(a) and 30(b) added to the flow of operation shown in FIG. 27, the continuous erasing action can be accomplished within a minimum length of time. This method is highly advantageous particularly in erasing records from all the tracks.

Subroutine (W):

FIG. 31 shows a subroutine (W) which is to be executed when the all track erasion standby switch 79 is operated. The subroutine (W) is as follows:

Step #W-1: The seven-segment LED 25 is caused to blink at 2 Hz a display "AE" (All-Erase) indicating an all track erasion standby mode. Step #W-2: A check is made to see if the PB mode flag is set. If not, the flow comes to a step #W-3-2. If so, if comes to a step #W-3-1. Step #W-3-1: The PB mode flag is cleared to inhibit a reproducing operation on the magnetic sheet 1. Step #W-3-2: The switch 79 is checked for its OFF state. Upon detection of it, the flow proceeds to a step #W-4. Step #W-4: A check is made to see if the erasing switch 78 is in its ON state. If so, the flow comes to a step #W-9. If not, the flow proceeds to a step #W-5. Step #W-5: A check is made to see if the all track erasion standby switch 79 is in its ON state. If so, the flow comes to a step #W-7. If not, the flow comes to a step #W-6. Step #W-6: A check is made to see if any switch other than the switch 79 is turned on. If so, the flow comes to a step #W-7. If not, the flow comes to the step #W-4. Step #W-7: The LED 25 is stopped from blinking and is caused to display the track number N assigned to a track to which the head 3-1 has access. Step #W-8: The flow waits until the switch 79 turns off. After that, the flow comes back to the subroutine (A). Step #W-9: In case that the erasing switch 78 is found in its ON state at the step #W-4, the flow comes to this step. At this step, a discrimination is made between the presence and absence of an erroneous erasion preventing claw which is not shown. If the claw is found to be present, the flow comes to a step #W-10. If not, it comes to the step #W-7. Step #W-10: A check is made to see if the track number N which is a track number assigned to a track accessed by the head 3-1 is "1". If so, the flow comes to a step #W-12. If not, it comes to a step #W-11. Step #W-11: The heads 3-1 and 3-2 are shifted toward the outer circumference of the magnetic sheet to an extent corresponding to one track width respectively. One is subtracted from the track number N. The flow then comes back to the step #W-10. With the steps #W-10 and #W-11 thus repeatedly executed, when the track number becomes "1", the flow comes to the step #W-12. Step #W-12: The LED 25 is caused to blink the display of the track number N at 5 Hz. This informs the operator of an extent to which the tracks have been erased during the process of the all track erasing action. Step #W-13: The field flag is cleared to obtain the frame mode. Accordingly, both the heads 3-1 and 3-2 are used for erasion.

Steps #W-14 and #W-15: These steps are the same as the steps #V-7 and #V-8. Step #W-16: Since two tracks are being erased without shifting the heads 3-1 and 3-2, these heads are shifted toward the outer circumference of the magnetic sheet to an extent corresponding to two track widths at this step. Further, "2" is added to the track number N. Step #W-17: A check is made to see if the track number N is 50 or greater than 50. If so, the flow comes to the step #W-7.

If not, it branches off to the step #W-12. In the latter case, the steps #W-12 to #W-17 are repeated until completion of the all track erasing process.

As described above, in the all track erasing mode which is obtained by turning on the erasing switch 78 after turning on the all track erasion standby switch 79, the PB mode flag is cleared prior to commencement of the erasing action in such a way as to omit the process of confirming the images to be erased. In addition to that, erasion is arranged to be performed on two tracks at a time by using both the heads 3-1 and 3-2. This method enables the all track erasing action to be accomplished in a much shorter period of time than a method of erasing tracks one by one. Further, in erasing all the tracks, the heads are shifted beforehand to one end part (to the outermost peripheral part in the case of this embodiment) and then shifted toward the opposite end gradually erasing all the tracks. This arrangement ensures that all the tracks can be erased without fail no matter where the head 3-1 may be located in erasing all the tracks.

Further, the LED 25 is arranged to display the number assigned to each track to which the head 3-1 is having access during the process of erasion. This enables the operator to know the degree of progress of the erasing action.

While the magnetic sheet 1 is employed as the recording medium in the case of embodiments described, this invention is applicable also to an optical recording medium, a photo-electro-magnetic recording medium and other recording medium. For such different recording media, the recording means may be replaced with suitable means. For example, an optical head may be used in the event of an optical disc. Further, a solid-state memory such as a semi-conductor memory, Bloch line memory or the like may be employed.

As described in the foregoing, this embodiment has different modes of recording the set ID data along with the video signal including: A mode of recording the set ID data while displaying on the monitor the contents thereof as shown in FIG. 21(a) and another mode of making a display as shown in FIG. 21(b) indicating that the set ID data is recordable along with the video signal without displaying on the monitor the contents of the ID data. When the mode shown in FIG. 21(a) is selected, the display range on the monitor of the contents of the ID data becomes broader. In the event that a display of the ID data would come to hinder a monitoring review of the video signal to be recorded, the mode of FIG. 21(b) is selected in recording the video signal while permitting the ID data to be recorded along with the video signal. This arrangement permits the review on the monitor of the recording video signal without hindrance and thus enhances the operability of the apparatus.

Further, in this embodiment, when the video signal is recorded while the character signal is being monitored in a state of being superimposed on the video signal to be recorded, the supply of the character signal is arranged to be temporarily cut off in synchronism with recording of the video signal (the steps #N-5 and #N-7 of the subroutine (N) of FIG. 12). This arrangement makes the recording action confirmable by a very simple control process. Therefore, the arrangement not only dispenses with any additional display means arranged specially for indicating the execution of the recording action but also enables the operator to confirm the recording action simply by observing the monitor.

This embodiment is arranged to permit confirmation of recording through observation of the monitor by temporarily cutting off the supply of the data signal (or the ID data) superimposed on the video signal as mentioned in the foregoing. This arrangement may be changed to temporarily cut off the video signal instead of the DATA signal. In another conceivable modification, some other signal may be temporarily superimposed on the video signal instead of temporarily cutting off the data signal in attaining the same advantageous effect.

In the case of this embodiment, the data signal is arranged to be displayed in a superimposed state in the lower right corner of the picture plane in either the mode of setting only the data of date or the mode of setting the date data together with other data as shown in FIG. 22(a) or 22(b). That arrangement effectively prevents the superimposed display of data from hindering the review of the recording video signal by the operator.

While the data signal or signals relative to the video signal are arranged in this embodiment to be displayed in the lower right corner of the picture plane, the display position is of course not limited to that particular part.

Further, in this embodiment, the data signals are arranged to include the date data such as year, month and day data and the digits of 11 places for the data relative to the video signal. However, the data relative to the video signal may be replaced by alphabetical letters relative to the video signal. These data may be any other data or characters that can be set by the operator and can be displayed in a superimposed state.

The embodiment, as described in the foregoing, is a recording and/or reproducing apparatus arranged to record or reproduce the data signal along with the video signal. The embodiment is provided with control means which is arranged such that, in recording, the position in which the data signal is displayed in the state of superimposed on the video signal is changed according to the result of determination as to whether or not at least a part of the data signal is to be set and to be included in the display.

In accordance with the arrangement of this embodiment, the data signal which is to be recorded along with the video signal is arranged to be omissible from the display of the video signal on the monitor, so that the video signal to be recorded can be protected from being hidden by a display of the data signal superimposed on the video signal display.

What is claimed is:

1. A recording device for recording on a recording medium a first identification information signal indicative of a first identification information corresponding to an image information signal and a second identification information signal indicative of a second identification information corresponding to said image information signal, said second identification information but different from said first identification information, comprising:

(a) input means for receiving the image information signal, the first identification information signal and the second identification information signal;
    (b) display means for displaying an image corresponding to the signal received by said input means;
    (c) recording means for recording on said recording medium the image information signal, the first identification information signal and the second identification information signal received by the input means; and
    (d) control means for controlling a displaying action of said display means to change, on a display means, a displaying position of a character image corresponding to the first identification information signal, according to whether the first identification information signal is received alone or together with the second identification information signal by the input means.

2. A device according to claim 1, wherein each of said first identification information signal and said second identification information signal is code data corresponding to one of the plurality of kinds of information including those in the year, month, day and in the hour, minute, second corresponding to the image information signal.

* * * * *

UNITED STATES PATENT AND TRADEMARK OFFICE
CERTIFICATE OF CORRECTION

PATENT NO. : 5,719,984
DATED : February 17, 1998
INVENTOR(S) : Yamagata al.

It is certified that error appears in the above-identified patent and that said Letters Patent is hereby corrected as shown below:

Col. 5, line 53, delete "Separated" and insert -- separated --.

Col. 34, line 25, delete "bin the feed" and insert -- be displayed --.

Col. 41, line 32, delete "If so , the" and insert -- If so, the --.

Signed and Sealed this

Twenty-eighth Day of July, 1998

Attest:

BRUCE LEHMAN

Attesting Officer    Commissioner of Patents and Trademarks